(12) United States Patent
Casasanta, III

(10) Patent No.: US 8,947,855 B2
(45) Date of Patent: Feb. 3, 2015

(54) COPOLYMER ELECTROCHEMICAL DOUBLE LAYER CAPACITOR

(75) Inventor: Vincenzo Casasanta, III, Woodinville, WA (US)

(73) Assignee: Empire Technology Development LLC, Wilmington, DE (US)

( * ) Notice: Subject to any disclaimer, the term of this patent is extended or adjusted under 35 U.S.C. 154(b) by 162 days.

(21) Appl. No.: 13/814,504

(22) PCT Filed: Jun. 28, 2012

(86) PCT No.: PCT/US2012/044713
§ 371 (c)(1),
(2), (4) Date: Feb. 6, 2013

(87) PCT Pub. No.: WO2014/003766
PCT Pub. Date: Jan. 3, 2014

(65) Prior Publication Data
US 2014/0002957 A1    Jan. 2, 2014

(51) Int. Cl.
*H01G 9/00* (2006.01)
*H01G 11/62* (2013.01)
*H01G 13/00* (2013.01)
(Continued)

(52) U.S. Cl.
CPC .............. *H01G 11/62* (2013.01); *H01G 13/00* (2013.01); *H01G 9/155* (2013.01); *H01G 9/15* (2013.01); *H01G 9/058* (2013.01); *H01G 9/028* (2013.01);
(Continued)

(58) Field of Classification Search
CPC ......... H01G 9/155; H01G 9/15; H01G 9/058; H01G 9/028; H01G 11/62

USPC ......... 361/502–504, 516–519, 523, 525, 528, 361/529–530
See application file for complete search history.

(56) References Cited

U.S. PATENT DOCUMENTS 5,665,490 A * 9/1997 Takeuchi et al. .............. 429/314
6,031,712 A * 2/2000 Kurihara et al. .............. 361/502
(Continued)

OTHER PUBLICATIONS

Baker, et al., "Electrochemically Induced Charge and Mass Transport in Polypyrrole/Poly(styrenesutfonate) Molecular Composites"; J. Phys. Chem. 9 5 (1991) 4446-4452.
(Continued)

*Primary Examiner* — Nguyen T Ha
(74) *Attorney, Agent, or Firm* — Turk IP Law, LLC

(57) ABSTRACT

Technologies are generally described for electrochemical capacitor devices. Some example electrochemical capacitor devices may include a composite electrode that includes an electrode substrate coupled to a polymeric electrochemical layer. The polymeric electrochemical layer may include: a conductive polymer electrically coupled to the electrode substrate; a solid state, ionically conductive electrolyte polymer; and non-conducting cross-links that covalently link the conductive polymer and the electrolyte polymer. Various example electrochemical capacitor devices may be constructed by laminating two of the composite electrodes against opposing sides of an ionically conducting separator membrane, and contacting the composite electrodes and the separator membrane with a liquid electrolyte. Some example electrochemical capacitor devices may display favorable performance such as symmetric charge storage, non-Faradic charge storage, and/or similar or greater capacity compared to carbon based systems.

27 Claims, 18 Drawing Sheets

(51) Int. Cl.
  *H01G 9/15* (2006.01)
  *H01G 9/04* (2006.01)
  *H01G 9/028* (2006.01)
  *H01G 9/022* (2006.01)
  *H01G 11/26* (2013.01)
  *H01G 11/48* (2013.01)

(52) U.S. Cl.
  CPC .............. *H01G 9/038* (2013.01); *H01G 11/26* (2013.01); *H01G 11/48* (2013.01); *Y02E 60/13* (2013.01)
  USPC ........... 361/502; 361/503; 361/504; 361/512; 361/516; 361/525

(56) References Cited

U.S. PATENT DOCUMENTS

| | | | |
|---|---|---|---|
| 6,096,234 | A | 8/2000 | Nakanishi et al. |
| 6,524,498 | B1 * | 2/2003 | Hata et al. ................ 252/500 |
| 6,862,167 | B1 * | 3/2005 | Banno et al. ............... 361/502 |
| 7,088,572 | B2 * | 8/2006 | Yoshida et al. ............. 361/504 |
| 7,154,737 | B2 * | 12/2006 | Maruo et al. ............... 361/502 |
| 7,170,739 | B1 * | 1/2007 | Arora et al. ................ 361/502 |
| 2003/0026063 | A1 | 2/2003 | Munshi |
| 2005/0019667 | A1 | 1/2005 | Oh et al. |
| 2005/0231892 | A1 | 10/2005 | Harvey |
| 2007/0040145 | A1 | 2/2007 | Muramoto et al. |
| 2010/0002362 | A1 | 1/2010 | Clelland et al. |
| 2011/0164349 | A1 | 7/2011 | Snyder et al. |
| 2012/0156588 | A1 | 6/2012 | Gronwald et al. |

OTHER PUBLICATIONS

Ren, et al., "Ion Transport in Polypyrrole and a Polypyrrole/Polyanion Composite"; J. Phys. Chem. 97 (1993) 5356-5362.

Li, et al., "Ion Transport in a Chemically Prepared Polypyrrole/Poly(styrene-4-sulfonate) Composite"; J. Phys. Chem. B 103, (1999) 10143-10148.

Bhattacharjee, et al., "DLVO Interaction between Rough Surfaces"; Langmuir 14 (1998) 3365-3375.

Deng, et al., "Polymethacrylate Functionalized Polypyrrole Network Films on Indium Tin Oxide: Electropolymerization of a Precursor Polymer and Comonomer"; Chem. Mater. 14 (2002) 4073-4080.

Dong, et al., "Functionalized Polypyrrole Film: Synthesis, Characterization, and Potential Applications in Chemical an Biological Sensors"; ACS App. Mat. and Interfaces 1 (2009) 1599-1606.

Azioune, et al., "Synthesis and Characterization of Active Ester-Functionalized Polypyrrole-Silica Nanoparticles: Application to the Covalent Attachment of Proteins"; Langmuir 20 (2004) 3350-3356.

Maeda, et al., "Synthesis and Characterization of Carboxylic Acid-Functionalized Polypyrrole-Silica Microparticles" s Macromolecules 28 (1995) 2905-2911.

Atanasoska, et al., "XPS Studies on Conducting Polymers: Polypyrrole Films Doped with Perchlorate and Polymeric Anions"; Chem. Mater. 4 (1992) 988-994.

Tadmor, et al., "Debye Length and Double-Layer Forces in Polyelectrolyte Solutions"; Macromolecules 35 (2002) 2380-2388.

Rajendra, et al., "Electrochemical Studies of Polyaniline in a Gel Polymer Electrolyte"; High Energy and High Power Characteristics of a Solkid-State Redox Supercapacitor; Electrochemical and Solid-State Letters, 5 (12) A271-A274, (2002).

Snook, et al., "Conducting-polymer-based supercapacitor devices and electrodes"; Elsevier Journal of Power Sources 196 (2011) 1-12.

Wang, Research progress on a novel conductive polymer—poly(3,4-ethylenedioxythiophene) (PEDOT); Symposia D, E and F from MRS International Materials Research Conference; Journal of Physics: Conference Series 152 (2009) 012023.

International Search Report and Written Opinion issued in application PCT/US12/44713, filed Jun. 28, 2012, issued Sep. 17, 2012 by the ISA of the United States of America.

Kang, J. J. and Fang, S. B., "Synthesis and Ionic Conductivity of Network Polymer Electrolytes with Internal Plasxticizers" Chinese Chemical Letter 15, pp. 87-89, (2004).

* cited by examiner

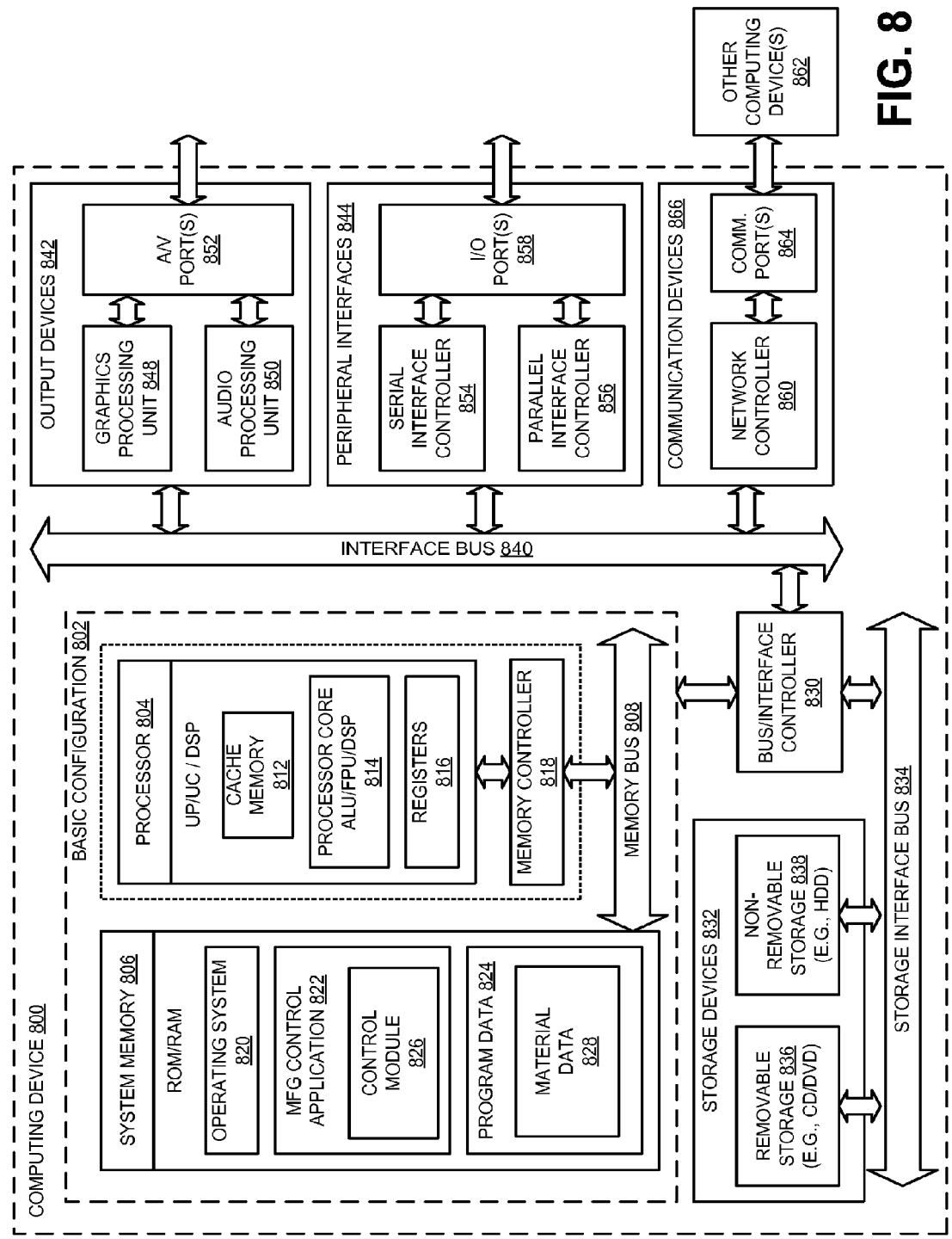

COMPUTER PROGRAM PRODUCT 900

SIGNAL-BEARING MEDIUM 902

904 ONE OR MORE INSTRUCTIONS TO

CONTROL A REAGENT SOURCE TO CONTACT CONDUCTIVE POLYMER MONOMERS TO AN ELECTRODE SUBSTRATE;
    CONTROL AN ELECTROCHEMICAL APPARATUS TO POLYMERIZE CONDUCTIVE POLYMER MONOMERS AT THE ELECTRODE SUBSTRATE TO FORM PRECURSOR CONDUCTIVE POLYMER MOLECULES;
    CONTROL THE REAGENT SOURCE TO PROVIDE A CROSS-LINK PRECURSOR;
    CONTROL A POLYMER APPLICATOR TO CONTACT PRECURSOR ELECTROLYTE POLYMER MOLECULES TO PRECURSOR CONDUCTIVE POLYMER MOLECULES AND THE CROSS-LINK PRECURSOR TO FORM A CROSS-LINKED POLYMER;
    CONTROL A SAMPLE MANIPULATOR TO FORM THE CROSS-LINKED POLYMER WITH THE ELECTRODE SUBSTRATE INTO $1^{ST}$ COMPOSITE ELECTRODE HAVING $1^{ST}$ POLYMERIC ELECTROCHEMICAL LAYER AND A $2^{ND}$ COMPOSITE ELECTRODE HAVING A $2^{ND}$ POLYMERIC ELECTROCHEMICAL LAYER;
    CONTROL THE SAMPLE MANIPULATOR TO PLACE AN ELECTROLYTE MEMBRANE BETWEEN $1^{ST}$ AND $2^{ND}$ COMPOSITE ELECTRODES TO CONTACT $1^{ST}$ AND $2^{ND}$ POLYMERIC ELECTROCHEMICAL LAYERS
    CONTROL AN ELECTROLYTE APPLICATOR TO CONTACT THE ELECTROLYTE MEMBRANE AND $1^{ST}$ AND $2^{ND}$ POLYMERIC ELECTROCHEMICAL LAYERS WITH A FLUID ELECTROLYTE TO FORM THE ELECTROCHEMICAL CAPACITOR.

| COMPUTER-READABLE MEDIUM 906 | RECORDABLE MEDIUM 908 | COMMUNICATIONS MEDIUM 910 |
|---|---|---|

FIG. 9

COPOLYMER ELECTROCHEMICAL DOUBLE LAYER CAPACITOR

CROSS-REFERENCE TO RELATED APPLICATIONS

This Application is the National Stage filing under 35 US.C. §371 of PCT Application No. PCT/US12/44713 filed on Jun. 28, 2012. The disclosure of the PCT Application is hereby incorporated by reference in its entirety.

BACKGROUND

Unless otherwise indicated herein, the materials described in this section are not prior art to the claims in this application and are not admitted to be prior art by inclusion in this section.

Conventional electrochemical double layer capacitors (EDLCs) may include discrete laminated layers such as electrically conductive charge collection electrodes, an ionic conductive electrolyte, and a separator membrane that is ionically conductive, but electrically insulating.

Example components of ELDCs have included high surface area, conductive, porous carbon electrodes; ionic salts in solution as an electrolyte; and a separator membrane of an ionically conductive polymer such as NAFION®. Other examples of ELDCs have employed conductive polymers in the electrodes, either alone or as a composite with conductive carbon or other conductive material. Further examples of ELDCs have employed blends of conductive polymers and polymeric electrolytes to make intermediate layers of a redox based capacitor. Of the electrically conductive polymers, polypyrrole (PPy) has been extensively explored. Various efforts have produced blends of PPy with ionic conductive polymeric electrolytes such as polystyrene sulfonate, polyvinyl alcohol, or polyethylene-glycol. Capacitors generated from such blends may effectively store charge by redox processes in addition to the formation of electrostatic double layers.

Although there have been advances, the present disclosure appreciates that EDLCs that employ conductive polymers may experience undesirable redox effects due to the doping of the mobile ions present in the electrolyte. For example, the described Faradaic processes may lead to asymmetric or irregular charging hysteresis curves, which may reduce the effective capacitor lifetime due to the degradation of reversibility. Such redox degradation may be reduced if the ions of the capacitor electrolyte can be isolated, at least in part, from the conductive polymer chains. Furthermore, separation of ions and counter-ions from the conductive electrodes may be desirable where conductive polymers are employed in non-Faradaic EDLCs.

The present disclosure appreciates that implementing conductive polymers in electrochemical double layer capacitor technology may be a complex undertaking.

SUMMARY

The following summary is illustrative only and is not intended to be in any way limiting. In addition to the illustrative aspects, embodiments, and features described above, further aspects, embodiments, and features will become apparent by reference to the drawings and the following detailed description.

The present disclosure generally describes capacitor devices, as well as systems and methods of making capacitor devices. In some examples, electrochemical capacitor devices comprising conductive polymers are described. In other examples, methods of making electrochemical capacitor devices comprising conductive polymers are described. In still further examples, systems configured to manufacture electrochemical capacitor devices are described. In yet other examples, computer-readable storage media having instructions stored thereon for making an electrochemical capacitor are described.

Some example electrochemical capacitor devices may include a first composite electrode, a first electrode substrate, a second composite and a second electrode substrate. The first composite electrode may have a first polymeric electrochemical layer that is arranged in contact with the first electrode substrate. The second composite electrode may have a second polymeric electrochemical layer that is arranged in contact with the second electrode substrate. In some further example electrochemical devices, an electrolyte membrane may be disposed between the first and second composite electrodes. The electrolyte membrane may have a first surface in contact with the first polymeric electrochemical layer and a second surface in contact with the second polymeric electrochemical layer. In various examples of the electrochemical capacitor devices, each of the first and second polymeric electrochemical layers may independently include a plurality of conductive polymer molecules electrically coupled to the corresponding one of the first electrode substrate or the second electrode substrate. In some examples of the electrochemical capacitor devices, each of the first and second polymeric electrochemical layers may independently include one or more electrolyte polymer molecules disposed among the conductive polymer molecules. In other examples of the electrochemical capacitor devices, each of the first and second polymeric electrochemical layers may independently include one or more unconjugated cross-links corresponding to each of the conductive polymer molecules. In further examples, the conductive polymer molecules may be covalently bonded to at least one of the one or more electrolyte polymer molecules by at least one of the one or more unconjugated cross-links. Various examples of electrochemical capacitor devices may include a fluid electrolyte in contact with the electrolyte membrane, the first polymeric electrochemical layer, and the second polymeric electrochemical layer.

Some example methods of making electrochemical capacitor devices may include providing a first composite electrode, a first electrode substrate, a second composite electrode, a second electrode substrate, and an electrolyte membrane. The first composite electrode may have a first polymeric electrochemical layer that is arranged in contact with the first electrode substrate. The second composite electrode may have a second polymeric electrochemical layer that is arranged in contact with the second electrode substrate. Various example methods of making electrochemical capacitor devices may include contacting a first surface of the electrolyte membrane to the first polymeric electrochemical layer and contacting a second surface of the electrolyte membrane to the second polymeric electrochemical layer such that the electrolyte membrane is disposed between the first and second composite electrodes. In other example methods of making electrochemical capacitor devices, each of the first and second polymeric electrochemical layers may independently include a plurality of conductive polymer molecules electrically coupled to the corresponding one of the first electrode substrate or the second electrode substrate. In some example methods of making electrochemical capacitor devices, each of the first and second polymeric electrochemical layers may independently include one or more electrolyte polymer molecules disposed among the conductive polymer molecules. In further example methods of making electrochemical capacitor devices, each of the first and second polymeric electrochemical layers may independently include one or more unconjugated cross-links corresponding to each of the conductive polymer molecules. Each of the conductive polymer molecules may be covalently bonded to at least one of the one or more electrolyte polymer molecules by at least one of the one or more unconjugated cross-links. Various example methods of making electrochemical capacitor devices may include contacting the electrolyte membrane, the first polymeric electrochemical layer, and the second polymeric electrochemical layer with a fluid electrolyte.

Various example computer-readable storage media having instructions stored thereon for making electrochemical capacitors are described. In some examples, the instructions may be included to control a reagent source to contact one or more conductive polymer monomers to an electrode substrate. In other examples, instructions may be included to control an electrochemical apparatus to electrochemically polymerize the one or more conductive polymer monomers at the electrode substrate sufficient to form a plurality of precursor conductive polymer molecules. Each of the plurality of precursor conductive polymer molecules may be electrically coupled to the electrode substrate. In further examples, instructions may be included to control a reagent source to provide a cross-link precursor with the one or more conductive polymer monomers or to the plurality of precursor conductive polymer molecules. In some examples, instructions may be included to control a polymer applicator to contact one or more precursor electrolyte polymer molecules to the plurality of precursor conductive polymer molecules and the cross-link precursor sufficient to form a cross-linked polymer at the electrode substrate. The cross-linked polymer may include a plurality of conductive polymer molecules that may be electrically coupled to the electrode substrate. The cross-linked polymer may also include one or more electrolyte polymer molecules that may be disposed among the conductive polymer molecules. The cross-linked polymer may also include one or more unconjugated cross-links corresponding to each of the conductive polymer molecules, wherein each of the conductive polymer molecules may be covalently bonded to at least one of the one or more electrolyte polymer molecules by at least one of the one or more unconjugated cross-links. In some examples, instructions may be included to control a sample manipulator to form the cross-linked polymer together with the electrode substrate into a first composite electrode that may include a first polymeric electrochemical layer and a second composite electrode that may include a second polymeric electrochemical layer. In further examples, instructions may be included to control the sample manipulator to contact a first surface of an electrolyte membrane to the first polymeric electrochemical layer. In various examples, instructions may be included to control the sample manipulator to contact a second surface of the electrolyte membrane to the second polymeric electrochemical layer such that the electrolyte membrane is disposed between the first composite electrode and the second composite electrode. In some examples, instructions may be included to control an electrolyte applicator to contact the electrolyte membrane, the first polymeric electrochemical layer, and the second polymeric electrochemical layer with a fluid electrolyte to form the electrochemical capacitor.

Various example systems for preparing electrochemical capacitor devices are described. Some example systems may include a mixing chamber configured to mix solids and liquids. In various example systems, the mixing chamber may be coupled to a reagent source, an electrochemical apparatus, a sample manipulator, and an electrolyte applicator. In further example systems, a controller may be coupled to the mixing chamber, the reagent source; the electrochemical apparatus, the sample manipulator, and the electrolyte applicator. In various example systems, the controller may be configured via executable instructions. In some example systems, the executable instructions may control the reagent source to contact one or more conductive polymer monomers to an electrode substrate in the mixing chamber. In other example systems, the executable instructions may control the electrochemical apparatus to electrochemically polymerize the one or more conductive polymer monomers at the electrode substrate sufficient to form a plurality of precursor conductive polymer molecules. Each of the plurality of precursor conductive polymer molecules may be electrically coupled to the electrode substrate. In further example systems, the executable instructions may control the reagent source to provide a cross-link precursor with the one or more conductive polymer monomers or to the plurality of precursor conductive polymer molecules. In various example systems, the executable instructions may control the polymer applicator to contact one or more precursor electrolyte polymer molecules to the plurality of precursor conductive polymer molecules and the cross-link precursor sufficient to form a cross-linked polymer at the electrode substrate. The cross-linked polymer may include: a plurality of conductive polymer molecules electrically coupled to the electrode substrate; one or more electrolyte polymer molecules disposed among the conductive polymer molecules; and one or more unconjugated cross-links corresponding to each of the conductive polymer molecules. Each of the conductive polymer molecules may be covalently bonded to at least one of the one or more electrolyte polymer molecules by at least one of the one or more unconjugated cross-links. In some example systems, the executable instructions may control the sample manipulator to form the cross-linked polymer together with the electrode substrate into a first composite electrode that may include a first polymeric electrochemical layer and a second composite electrode that may include a second polymeric electrochemical layer. In further example systems, the executable instructions may control the sample manipulator to contact a first surface of an electrolyte membrane to the first polymeric electrochemical layer. In various example systems, the executable instructions may control the sample manipulator to contact a second surface of the electrolyte membrane to the second polymeric electrochemical layer such that the electrolyte membrane is disposed between the first composite electrode and the second composite electrode. In various example systems, the executable instructions may control the electrolyte applicator to contact the electrolyte membrane, the first electrochemical layer, and the second electrochemical layer with a fluid electrolyte to form the electrochemical capacitor.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments arranged in accordance with the disclosure and are, therefore, not to be considered limiting of its scope, the disclosure will be described with additional specificity and detail through use of the accompanying drawings, in which:

FIG. 8 illustrates an example general purpose computing device that may be configured to control the example system of FIG. 6 or similar manufacturing equipment in making electrochemical capacitor devices; and FIG. 9 illustrates a block diagram of an example computer program product that may be configured to control the example system of FIG. 6 or similar manufacturing equipment in making electrochemical capacitor devices;

Figure 1:
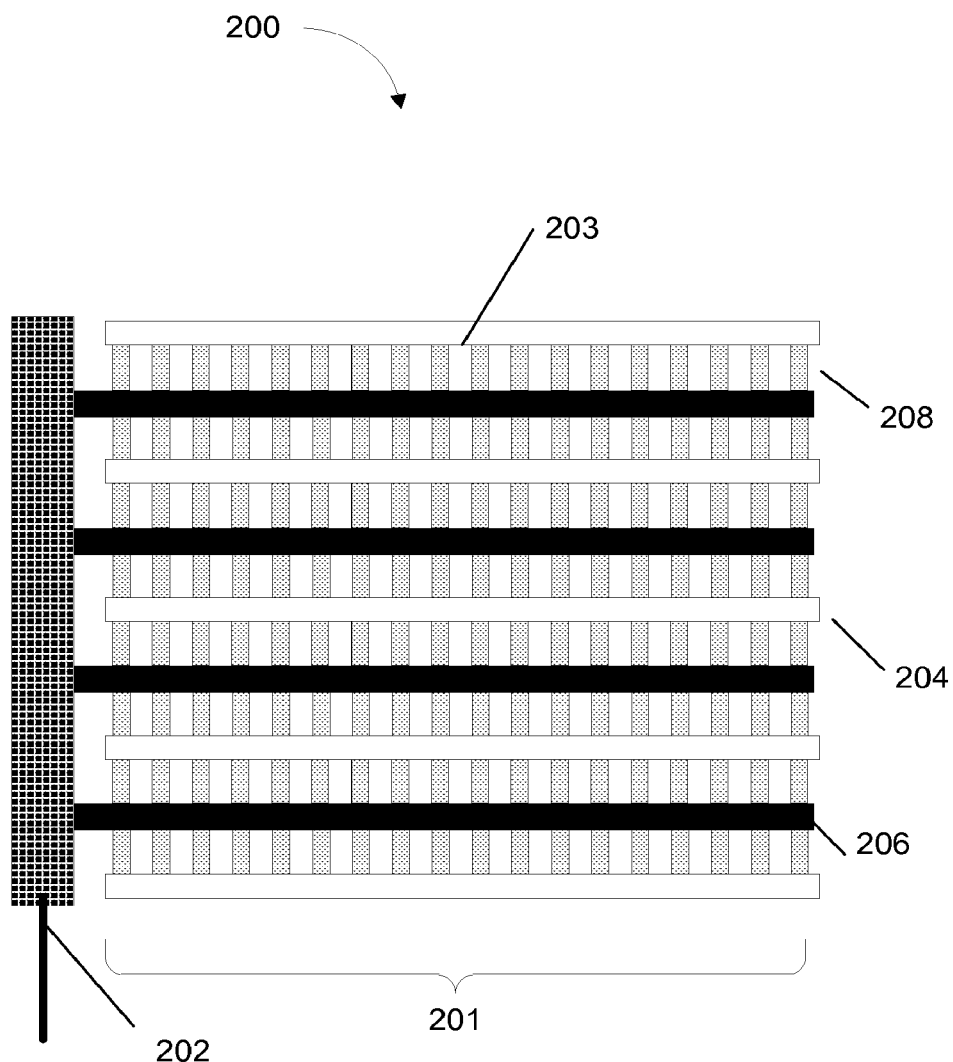
FIG. 1 is a conceptual drawing of an example composite electrode.

all arranged in accordance with at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to compositions, methods, apparatus, systems, devices, and/or computer program products related to electrochemical capacitors.

Briefly stated, some example electrochemical capacitor devices may include a composite electrode that includes an electrode substrate coupled to a polymeric electrochemical layer. The polymeric electrochemical layer may include: a conductive polymer electrically coupled to the electrode substrate; a solid state, ionically conductive electrolyte polymer; and non-conducting cross-links that covalently link the conductive polymer and the electrolyte polymer. Various example electrochemical capacitor devices may be constructed by laminating two of the composite electrodes against opposing sides of an ionically conducting separator membrane, and contacting the composite electrodes and the separator membrane with a liquid electrolyte. Some example electrochemical capacitor devices may display favorable performance such as symmetric charge storage, non-Faradic charge storage, and/or similar or greater capacity compared to carbon based systems.

FIG. 1 is a conceptual drawing of an example composite electrode 200 arranged in accordance with at least some embodiments described herein. In various examples, composite electrodes such as 200 may include a polymeric electrochemical layer 201 arranged in contact with an electrode substrate 202. The polymeric electrochemical layer 201 may include conductive polymer molecules 206 electrically coupled to the electrode 202. Electrolyte polymer molecules 204 may be disposed among the conductive polymer molecules 206. One or more unconjugated cross-links 208 may covalently link the electrolyte polymer molecules 204 to the conductive polymer molecules 206. Also included in various examples is a fluid electrolyte 203 that may be utilized to contact the conductive polymer molecules 206, the electrode 202, the electrolyte polymer molecules 204, and the one or more unconjugated cross-links 208.

Figure 2A:
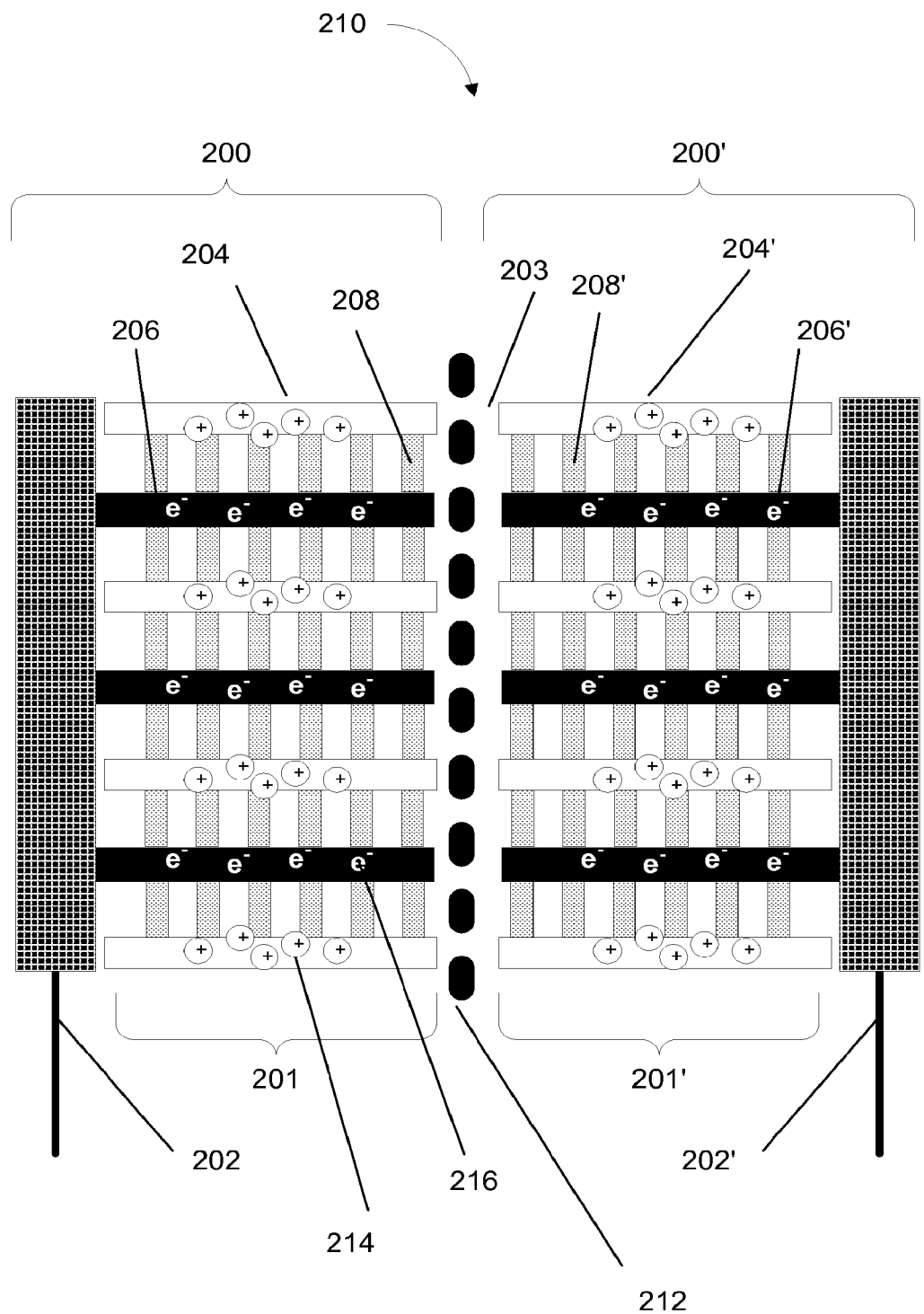
FIG. 2A is a conceptual drawing of an example electrochemical capacitor device that includes two composite electrodes.

FIG. 2A is a conceptual drawing of an example electrochemical capacitor device 210 that may include two composite electrodes 200 and 200', arranged in accordance with at least some embodiments described herein. The two composite electrodes 200 and 200' may be each configured as shown for composite electrode 200 in FIG. 1. In some example electrochemical capacitors 210, the two composite electrodes 200 and 200' may be separated by an ionically conducting, electrically insulating electrolyte membrane 212. The liquid electrolyte 203 disposed among electrochemical layers 201 and 201' may include an ionic electrolyte represented in FIG. 2A by positively charged cations 214 and negatively charged anions 216. Under some examples of charging conditions, the ionic electrolyte may polarize with the positively charged cations 214 associating with the electrolyte polymer molecules 204 and 204', and the negatively charged anions associating with the conductive polymer molecules 206 and 206'. In some examples, the ionic electrolyte represented by positively charged cations 214 and negatively charged anions 216 may correspond to a compound dissolved in the fluid electrolyte 203. In other examples, the fluid electrolyte 203 may be an ionic liquid, the ions of which may be represented by positively charged cations 214 and negatively charged anions 216.

The specific valences, locations, and number of charged species depicted in the FIGs., such as cation 214 and anion 216 in FIG. 2A, are shown for the purpose of illustrating the concept and are not intended to be limiting. For example, the cation 214 may also represent a divalent metal cation such as $Ca^{++}$, $Ba^{++}$, or $Mg^{++}$. Likewise, the locations and numbers of positive or negative charges are shown for the purpose of illustrating the concept and are not intended to be limiting. Furthermore, depending on the electrochemical state of example electrochemical capacitor 210 at any given time, some portion of the species illustrated as charged may exist in other oxidation states, such as a neutral form or a radical form.

Figure 2B:
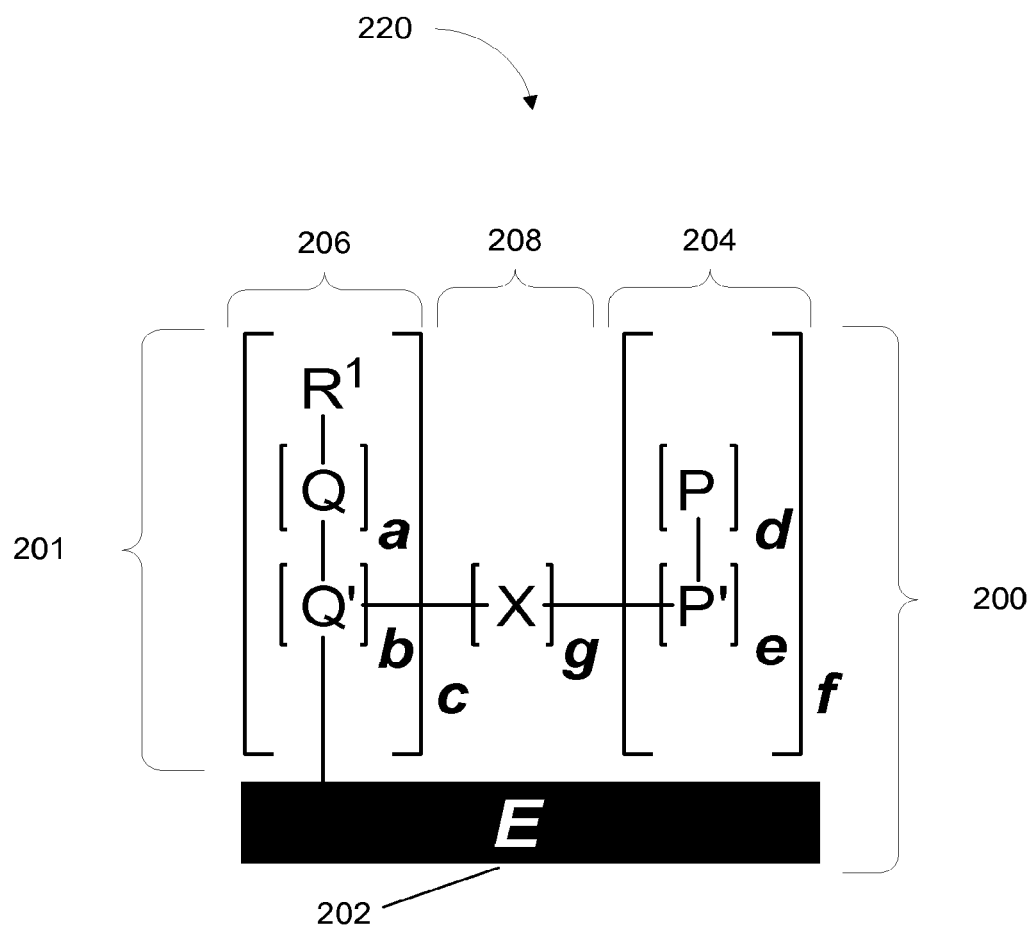
FIG. 2B is a conceptual drawing of the composite electrode showing the polymeric electrochemical layer as a conceptual chemical structure.

FIG. 2B is a conceptual drawing of the composite electrode 200 showing the polymeric electrochemical layer 201 as a conceptual chemical structure 220, arranged in accordance with the present disclosure. Conceptual chemical structure 220 can be arranged in contact with an inner surface E of the electrode substrate 202. The conceptual chemical structure 220 may illustrate various examples of the polymeric electrochemical layer 201, but is not intended to limit other examples of the polymeric electrochemical layer 201.

In chemical structure 220, each of the conductive polymer molecules 206 represented by $R^1$-$[Q]_a$-$[Q']_b$- may include conductive polymer monomer repeat units represented by Q and Q'. The unconjugated cross-links 208 may be represented in chemical structure 220 by unconjugated group X. The conductive polymer monomer repeat units represented by Q' may be distinguished from Q by being covalently bonded to the unconjugated group X. In various examples, the group $R^1$ may be H, alkyl, hydroxy, alkoxy, or aryl.

In chemical structure 220, each of the electrolyte polymer molecules 204 represented by $[P]_d$—$[P']_e$— may include electrolyte polymer monomer repeat units represented by P and P'. The electrolyte polymer monomer repeat units represented by P' may be distinguished from P by being covalently bonded to the unconjugated group X.

Chemical structure 220 illustrated in FIG. 2B includes various non-negative integer values, a, b, c, d, e, f and g, which indicate stoichiometry. For example, chemical structure 220 shows: c instances of the conductive polymer 206, represented by $[R^1$-$[Q]_a$-$[Q']_b]_c$-; g instances of the unconjugated cross-links 208, represented by -$[X]_g$-; and f instances of the electrolyte polymer molecules 204, represented by $[[P]_d$—$[P']_e$—$]_f$.

In various examples, integer a has a value of at least zero, and integer b has a value of at least two. When integer a has a value of zero, each conductive polymer monomer repeat unit in the conductive polymer molecule 206 may be covalently bonded to an unconjugated cross-link 208 as represented by Q'-X. When integer a has a value greater than zero, the conductive polymer molecule 206 may include a conductive polymer monomer repeat units that are uncross-linked. Likewise, in various examples, integer d may have a value of at least zero, and integer e may have a value of at least two. When integer d has a value of zero, each electrolyte polymer monomer repeat unit in the electrolyte polymer molecule 204 may be covalently bonded to an unconjugated cross-link 208 as represented by X—P'. When integer d has a value greater than zero, the electrolyte polymer molecule 206 may include d electrolyte polymer monomer repeat units that are uncross-linked.

In various examples, a may have a first value in a range from about 0 to about 500 and b may have a second value in a range from about 2 to about 1000. In some examples, the sum a+b may have a value in a third range from about 2 to about 1000. In further examples, b/(a+b) may be at least about 0.5. In other examples, a may be zero, and conductive polymer 206 may be a homopolymer of Q'. In further examples, a may be greater than zero, and conductive polymer 206 may be a copolymer of Q and Q'. In various examples, Q and Q' may be arranged in a copolymer sequence that is alternating, periodic, statistical, random, or block.

Likewise, in various examples, integer d may have a value in a range from about 0 to about 500 and integer e may have a value in a range from about 2 to about 1000. In some examples, the sum d+e may have a value in a range from about 2 to about 1000. In further examples, the quotient e/(d+e) may have a value of at least about 0.5. In other examples, integer d has a value of about zero, and electrolyte polymer 204 may be a homopolymer of P'. In some examples, integer d has a value greater than zero, and electrolyte polymer 204 may be a copolymer of P and P'. In further examples, P and P' may be arranged in a copolymer sequence that is alternating, periodic, statistical, random, or block.

In various examples, the values for integers c, f and g may be selected such that the values of b*c, e*f, and g may be substantially the same. In some examples, each of the c-instances of conductive polymer 206 may be cross-linked through the corresponding X to the same or different electrolyte polymer 204 among the f-instances of electrolyte polymer 204.

It should be understood that the polymeric electrochemical layer 201 of the composite electrode 200 may include other chemical structural features in addition to those shown in chemical structure 220. For example, the polymeric electrochemical layer 201 of the composite electrode 200 may also include instances of conductive polymer 206 that are not covalently bonded to the inner surface of electrode 202. In other examples, the polymeric electrochemical layer 201 of the composite electrode 200 may also include one or more of: instances of conductive polymer 206 that are not cross-linked through X to electrolyte polymer 204. In some examples, instances of electrolyte polymer 204 may not be cross-linked through X to conductive polymer 206. In further examples, instances of X may be bonded to only one of conductive polymer 206 or electrolyte polymer 204. In various examples, instances of X may bond the same conductive polymer 206 to itself or another conductive polymer 206. In some examples, instances of X may bond the same electrolyte polymer 204 to itself or another electrolyte polymer 204.

The conductive polymers represented by 206 and 206' may be any suitable conductive polymer or mixture of conductive polymers. As used herein, a "conductive polymer" may be an organic polymer that is an electrical conductor or that may be oxidatively or reductively doped to enter an electrically conducting state. A conductive polymer may be configured to have a conducting state, which may be represented by an electronic structure that includes a conduction band partly filled with electrons. In some examples, a conductive polymer may be electrochemically or chemically doped to form a conducting state. For example, a conductive polymer with a filled conduction band may be oxidatively doped to partly empty the conduction band to permit electrical conductivity. In another example, a conductive polymer with an empty conduction band may be reductively doped to partly fill the empty conduction band to permit electrical conductivity. A conductive polymer in an electrically conducting state may be termed a "conducting polymer". A conductive polymer may be a homopolymer of the same conductive polymer monomer repeat units. A conductive polymer may be a copolymer of two or more conductive polymer monomer repeat units that may be arranged in a copolymer sequence that is alternating, periodic, statistical, random, or block.

Figure 3:
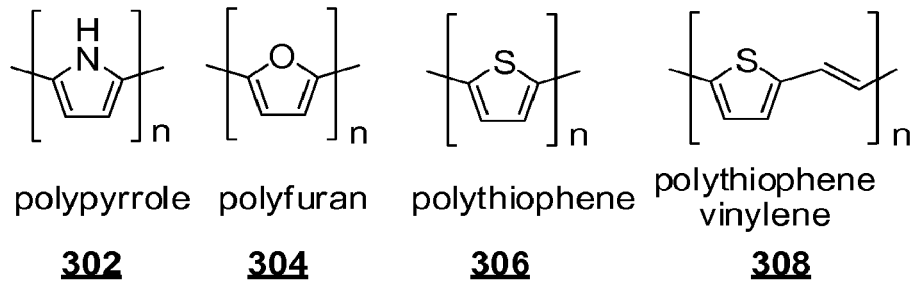
FIG. 3 shows chemical structures representing example conductive polymers.
Figure 3:
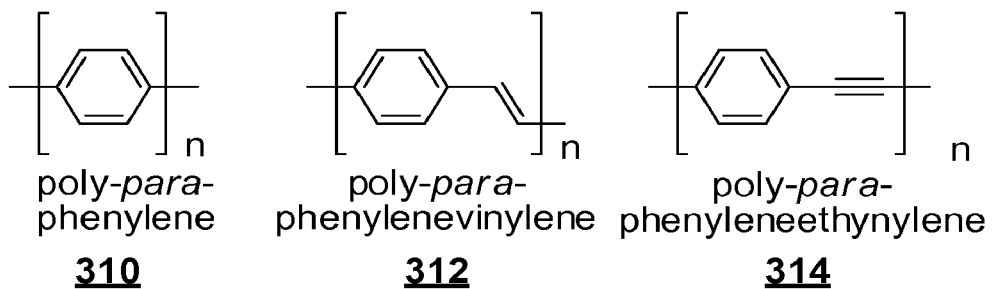
Figure 3:
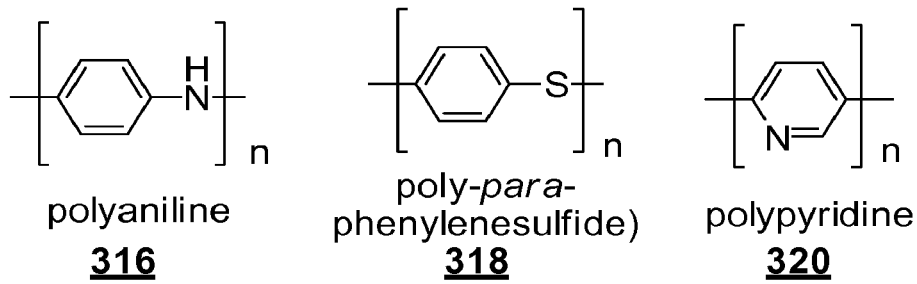
Figure 3:
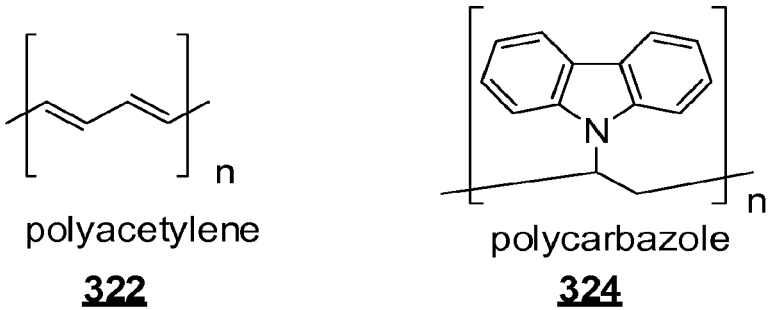

FIG. 3 shows chemical structures representing example conductive polymers, arranged in accordance with at least some embodiments described herein. Example conductive polymers may include, but are not limited to, polypyrrole 302, polyfuran 304, polythiophene 306, polythiophene vinylene 308, poly-para-phenylene 310, poly-para-phenylenevinylene 312, poly-para-phenylene ethynylene 314, polyaniline 316, poly-para-phenylene sulfide 318, polypyridine 320, polyacetylene 322, or polycarbazole 324. Examples of conductive polymer homopolymers may include polypyrrole 302, polyfuran 304, polythiophene 306, poly-para-phenylene 310, polyaniline 316, poly-para-phenylene sulfide 318, poly-pyridine 320, polyacetylene 322, or polycarbazole 324. Examples of conductive polymer copolymers may include block copolymers that may include alternating blocks of one or more repeat units of homopolymers. For example, block copolymers with alternating blocks of single repeat units may include polythiophene vinylene 308 (alternating repeat units of thiophene and polyacetylene), or poly-para-phenylenevinylene 312 (alternating repeat units of para-phenylene and polyacetylene).

In various examples, the conductive polymer 206 may include a polyacetylene (e.g., polyacetylene 322), a polyarylene (e.g., poly-para-phenylene 310), a polyheteroarylene (e.g., polypyrrole 302, or polypyridine 320), a polyvinylarylene (e.g., poly-para-phenylenevinylene 312), a polyvinylheteroarylene (e.g., polythiophene vinylene 308), a polyarylene ethynylene (e.g., poly-para-phenylene ethynylene 314), a polyheteroarylene ethynylene (e.g. polypyridine ethynylene), or a combination or copolymer thereof. In some examples, the conductive polymer may include a polyacetylene, a poly(phenylene vinylene), a poly(fluorene), a polypyrene, a polyazulene, a polynaphthalene, a poly(pyrrole), a polyindole, a polyazepine, a polyaniline, a polypyridine, a poly(thiophene), a poly(thiophene vinylene), a poly(phenylene sulfide), or a combination or copolymer thereof. In some examples of the conductive polymer 206, the conductive polymer monomer repeat units represented by Q and Q' in chemical structure 220 may each be the same or different monomer repeat unit selected from polypyrrole, polythiophene, poly(3,4-ethylenedioxy)thiophene, poly-para-phenylene, poly-para-phenylene vinylene, poly-para-phenylene sulfide, polyaniline, polycarbazole, or polyindole.

In various examples, the electrolyte polymer 204 may include, for example: a poly(oxy)alkylene, a polytetrafluoroethylene:perfluorosulfonic acid copolymer, a sulfonated arylene, a sulfonated polystyrene, a sulfonated poly(tetrafluoroethylene-hexafluoropropylene), a poly(vinylidene fluoride), a sulfonated poly(aryl)siloxane, a sulfonated poly(alkyl)siloxane, a sulfonated polyetheretherketone, a sulfonated polysulfone, a sulfonated polyethersulfone, a polybenzimidazole, a polyimide, a polyphenylene, a poly(4-phenoxybenzoyl-1,4-phenylene), a polybenzimidazole, a polyvinyl alcohol, a polyacrylamide, a polyethylenimine, or a combination thereof. Likewise, in various examples, the groups represented by P and P' may each be a monomer repeat unit of polyethylene oxide, a polytetrafluoroethylene:perfluorosulfonic acid copolymer, a sulfonated polystyrene, a sulfonated poly(tetrafluoroethylene-hexafluoropropylene), a poly(vinylidene fluoride), a sulfonated polyetheretherketone, a sulfonated polysulfone, a sulfonated polyethersulfone, a polyvinyl alcohol, or a polyacrylamide.

As used herein, a copolymer may be a polymer of two or more different monomer repeat units. Polymers described herein may be copolymers with respect to whether the included monomer repeat units are cross-linked or uncross-linked. For example, a conductive copolymer may include uncross-linked pyrrolyl monomer repeat units Q and cross-linked pyrrolyl monomer repeat units Q' that are each bonded to a cross-link group X. Polymers described herein may also be copolymers with respect to whether the included monomer repeat units are different independent of cross-linking status. For example, a conductive copolymer may include thienyl and vinyl monomer repeat units, such as in polythiophene vinylene 308. In various examples, polymers described herein may also be copolymers due to a combination of differing monomer repeat units and differing cross-link status.

In various examples, the electrode substrate 202 employed in composite electrode 200 may be made from any suitable conducting material such as metals or alloys thereof, conductive polymers, or conducting oxides. In some examples, the electrode substrate 202 may include metals or alloys that may include one or more metals such as copper, aluminum, tin, lead, iron, chromium, cobalt, nickel, silver, gold, platinum, palladium, vanadium, manganese, titanium, tungsten, indium, zinc, or cadmium. In some examples, the electrode substrate 202 may be in the form of a sheet, wire, plate, foil, or tape. In some examples, the electrode substrate 202 may include any of the conductive polymers described above for conductive polymer 206. In some examples, the electrode substrate 202 may be coincident with the conductive polymer 206. For example, the electrode substrate 202 may also be conductive polymer 206. In some examples, the electrode substrate 202 may include conducting oxides such as indium tin oxide, aluminum doped zinc oxide, or indium doped cadmium oxide.

In various examples, the two composite electrodes 200 and 200' in electrochemical capacitor 210 may be separated by an ionically conducting, electrically insulating electrolyte membrane 212. The electrolyte membrane 212 may include, for example: a poly(oxy)alkylene, a polytetrafluoroethylene:perfluorosulfonic acid copolymer, a sulfonated arylene, a sulfonated polystyrene, a sulfonated poly(tetrafluoroethylene-hexafluoropropylene), a poly(vinylidene fluoride), a sulfonated poly(aryl)siloxane, a sulfonated poly(alkyl)siloxane, a sulfonated polyetheretherketone, a sulfonated polysulfone, a sulfonated polyethersulfone, a polybenzimidazole, a polyimide, a polyphenylene, a poly(4-phenoxybenzoyl-1,4-phenylene), a polybenzimidazole, a polyvinyl alcohol, a polyacrylamide, a polyethylenimine, or a combination thereof. In particular, electrolyte membrane 212 may include a salt of an ionomer, a polymer that may include both electrically neutral repeat units and ionizable repeat units. Suitable neutral repeat units may include alkyl, alkyl ether, perfluoroalkyl, and perfluoroalkyl ether units. Suitable ionizable repeat units may include sulfonates, phosphates, and carboxylates. Many suitable ionomers are commercially available and may be commonly employed as proton exchange membranes. In various examples, suitable ionomers may include the class of polytetrafluoroethylene:perfluorosulfonic acid copolymers known by the trade name NAFION® (Dupont, Wilmington, Del.). These ionomers may be characterized by a polytetrafluoroethylene backbone substituted with perfluorovinyl ether groups having a terminal sulfonate. One example is tetrafluoroethylene-perfluoro-3,6-dioxa-4-methyl-7-octenesulfonic acid copolymer (CAS Reg. No. 66796-30-3, "NAFION®-H"). The electrolyte membrane 212 may be of the same, similar, or different composition as polymer electrolyte 204.

As used herein, unconjugated cross-links 208, e.g., as represented in chemical structure 220 by group X, are electrically non-conducting chemical chains which covalently bond the groups that are cross-linked. "Unconjugated" means that the chemical chain between the groups that are cross-linked does not include a double bond, a triple bond, or an alternating series of double or triple bonds configured to provide a conductive pathway. Suitable unconjugated cross-links may include, for example, linear or branched alkylene groups, which may be further substituted. In various examples, the cross-links may be unsubstituted alkylene, or alkylene substituted sufficient to facilitate separation between the conductive polymer 206 and electrolyte polymer 204. For example, hydrophobic cross-links such as alkylenes may facilitate separation between the conductive polymer 206 in a charged state and polar or charged electrolyte polymers 204. Also, for example, cross-links such as fluoroalkylenes may facilitate separation between the conductive polymer 206 and electrolyte polymer 204 by providing a fluorous phase. In various examples, unconjugated cross-links 208, e.g., as represented in chemical structure 220 by group X, may be a branched or unbranched $C_2$-$C_{20}$ alkylene, a branched or unbranched $C_2$-$C_{20}$ alkylene ester, a branched or unbranched $C_2$-$C_{20}$ perfluoroalkylene, or a branched or unbranched $C_2$-$C_{20}$ perfluoroalkylene ester.

In various examples, the ionic electrolyte represented by positively charged cations 214 and negatively charged anions 216 may be provided as one or more electrolyte salts. Suitable electrolyte salts may include positively charged cations 214 as metal cations, e.g., an alkali metal cation, an alkaline earth metal cation, or a mixture thereof. In various examples, suitable alkali metals for cations may include lithium, sodium, potassium, rubidium, caesium, or francium. In various examples, suitable alkali earth metals for cations may include beryllium, magnesium, calcium, strontium, barium or radium. Suitable cations for electrolyte salts may include other cations, such as ammonium, tetraalkylammonium, phosphonium, or tetralkylphosphonium, or a combination thereof. Suitable electrolyte salts may include negatively charged anions 216 such as fluoride, chloride, bromide, iodide, carboxylates, trifluoromethanesulfonate, bistrifluoromethanesulfonimidate, fluorosulfate, hexafluorophosphate, perchlorate, tetrafluoroborate, p-toluenesulfonate, p-bromobenzenesulfonate, 2- or 4-nitrobenzenesulfonate, methanesulfonate, trifluoromethanesulfonate, 5-(dimethylamino)naphthalene-1-sulfonate, or nitrate. Suitable carboxylates may include, e.g., acetate, formate, or benzoate. In some examples, the electrolyte salt may include perchlorate or trifluoromethansulfonate anions.

In various examples, the ionic electrolyte represented by positively charged cations 214 and negatively charged anions 216 may be provided in a suspension or solution in a liquid electrolyte. In some examples, the liquid electrolyte may include a polyoxyalkylene, a polyoxyalkylene alcohol, an alkyl ether, a cycloalkyl ether, an alkylene carbonate, a cycloalkylene carbonate, an alkanone, a cycloalkanone, a lactone, or a combination thereof. Suitable polyoxyalkylene or polyoxyalkylene alcohols may include, e.g., polyethylene oxide or polyethylene glycol. Suitable alkyl ethers may include, e.g., diethyl ether or diisopropyl ether. Suitable cycloalkyl ethers may include, for example, tetrahydrofuran, or dioxane. Suitable alkylene or cycloalkylene carbonates may include ethylene carbonate, or propylene carbonate. Suitable alkanones or cycloalkanones may include, e.g., acetone, methyl ethyl ketone, cyclopentanone, or cyclohexanone. Suitable lactones may include beta-propiolactone, gamma-butyrolactone, or delta-valerolactone.

In further examples, the ionic electrolyte represented by positively charged cations 214 and negatively charged anions 216 may include an ionic liquid. Suitable cations for the ionic liquid electrolyte include, for example, 1,3-dialkyl imidazoliums, N-alkyl pyridiniums, N,N-dialkyl pyrrolidiniums, alkyl phosphoniums, alkyl ammoniums, or alkyl sulfoniums. Specific examples of cations for the ionic liquid electrolyte may include 1-butyl-3-methylimidazolium, 1-butylpyridinium, N-methyl-N-butyl pyrrolidinium, or tetrabutylammonium. Suitable anions for the ionic liquid electrolyte may include, for example, fluoride, chloride, bromide, iodide, carboxylates, trifluoromethanesulfonate, bistrifluoromethanesulfonimidate, fluorosulfate, hexafluorophosphate, perchlorate, tetrafluoroborate, p-toluenesulfonate, p-bromobenzenesulfonate, 2- or 4-nitrobenzenesulfonate, methanesulfonate, trifluoromethanesulfonate, 5-(dimethylamino)naphthalene-1-sulfonate, or nitrate. Suitable carboxylates may include, e.g., formate, acetate, or benzoate. In some examples, the electrolyte salt may include perchlorate or trifluoromethansulfonate anions. Specific examples of ionic liquid electrolytes may include, but are not limited to:1-butyl-2,3-dimethylimidazolium tetrafluoroborate, 1-butyl-1-methylpyrrolidinium bis(trifluoromethyl sulfonyl) imide, 1-dodecyl-3-methylimidazolium iodide, 1-ethyl-2,3-dimethylimidazolium trifluoromethane sulfonate, 1-ethyl-3-methylimidazolium dicyanamide, 1-ethyl-3-methylimidazolium nitrate, 1-ethyl-3-methylimidazolium tetrafluoroborate, 1-ethyl-3-methylimidazolium thiocyanates, sulfonate, 1-ethyl-3-methylimidazolium trifluoromethane sulfonate, methyl-trioctylammonium bis (trifluoromethyl sulfonyl)imide, tetrabutylammonium bis (trifluoromethylsulfonyl)imide, tetraethylammonium trifluoromethanesulfonate, triethylsulfonium bis (trifluoromethylsulfonyl) imide, tetrabutylammonium bromide, tetrabutylphosphonium tetrafluoroborate, 1-butyl-3-methylimidazolium bis (trifluoromethyl sulfonyl) imide, 1-butyl-3-methylpyridinium bis(trifluoromethylsulfonyl) imide, 1,2-dimethyl-3-propylimidazolium bis(trifluoromethylsulfonyl) imide, 1,2-dimethyl-3-propylimidazolium tris (trifluoromethylsulfonyl) methide, 1-ethyl-3-methylimidazolium bis (pentafluoroethylsulfonyl) imide, 1-ethyl-3-methylimidazolium bis (trifluoromethylsulfonyl) imide, or 3-methyl-1-propylpyridinium bis (trifluoromethylsulfonyl) imide (Sigma-Aldrich, St. Louis, Mo.).

Figure 4A:
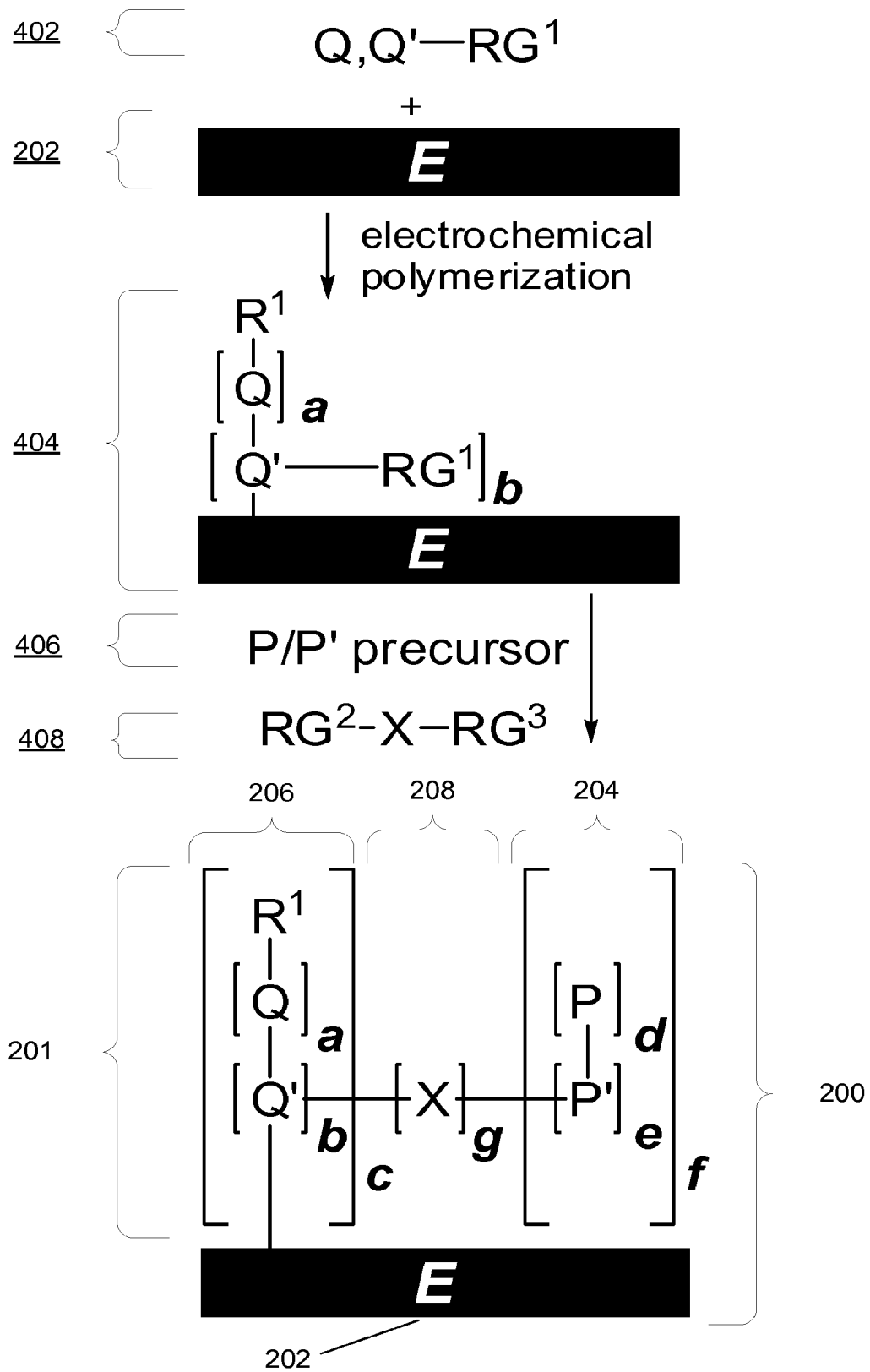
FIG. 4A is a conceptual scheme showing an example method of electrochemical polymerization and cross-linking.

FIG. 4A is a conceptual scheme showing an example method of electrochemical polymerization and cross-linking, arranged in accordance with at least some embodiments described herein. FIG. 4A depicts forming the polymeric electrochemical layer 201 in contact with an electrode substrate 202. Compound 402, which may include conductive polymer monomer repeat unit Q' bonded to a reactive group $RG^1$, may be subjected to electrochemical polymerization. In some examples, the electrochemical polymerization may be conducted in the presence of a conductive polymer monomer repeat unit Q, which may be the same or different compared to Q'. The electrochemical polymerization couples electrode substrate 202 to a conductive polymer functionalized with $RG^1$ as shown in structure 404. Structure 404 may then be reacted with cross-linking agent 408 and electrolyte polymer precursors 406 to form the polymeric electrochemical layer 201. In the scheme shown in FIG. 4A, the reaction of structure 404 with compounds 406 and 408 may be conducted stepwise or simultaneously. For example, a stepwise approach may react $RG^1$ of structure 404 first with $RG^2$ of compound 408, followed by reaction of $RG^3$ with P' during polymerization of P and P'.

As used herein, reactive groups such as $RG^1$ and $RG^2$ are groups that may be reacted to form the indicated bond between Q' and X. In various examples, $RG^1$ and $RG^2$ may be selected from terminal alkyne, alkynyl halide, F, Cl, Br, I, mesylate, triflate, nonaflate, nosylate, brosylate, tosylate, boranes, boronic acid, boronic acid esters (e.g., boronic acid pinacol ester), potassium trifluoroborane, stannanes (e.g., tributyl tin), organosilanes (e.g., trimethyl silyl) fluorosilanes (e.g., trifluorosilyl), alkoxysilanes (e.g., trimethoxy silyl) hydroxysilanes (e.g., dimethyl silanol), ketones (e.g., —$COCH_3$), aldehyde, carboxylate, —OH, magnesium halide, zinc halide, thioesters, primary or secondary amines, or hydroxylamines. For example, $RG^1$ and $RG^2$ may be selected to participate in any known coupling reaction, for example: Suzuki coupling of halides and boronates; Stille coupling of halides and stannanes; Buchwald-Hartwig cross coupling of halides and amines; Buchwald coupling of chloro/bromo/iodo fluroalkyls and organosilyls; Chan-Lam coupling of boronates/stannanes/siloxanes with N—H/O—H groups; Fukuyama coupling of thioesters with organozinc to form ketones; Glaser or Hay coupling of terminal alkynes; Hiyama coupling of halides and organosilanes/fluorosilanes/alkoxysilanes; Grignard coupling of carbonyl and halide groups; Hiyama-Denmark coupling of halides and organosilanols; Kumada or Negishi coupling of two halides; Nozaki-Hiyama coupling of carbonyls and halides; or Sonogashira coupling of halides and terminal alkynes. In various examples, such coupling reactions may be mediated by a metal catalyst that includes one of palladium, platinum, nickel, copper, zinc, magnesium, chromium, or rhodium. In some examples, such coupling reactions may be tolerant of replacement with certain groups which behave similarly. For example, some coupling reactions which employ halides such as Cl, Br, or I, e.g., the Hiyama coupling, may be conducted with psuedohalides such as mesylate, triflate, nonaflate, nosylate, brosylate, or tosylate. In other examples, some coupling reactions which cite boronates may employ boranes, boronic acid, boronic acid esters, potassium trifluoroborane, stannanes, organosilanes, fluorosilanes, or alkoxysilanes. Other suitable coupling reactions may include esterification and amino alkylation.

As used herein, reactive groups such as $RG^3$ are groups that may be reacted to form the indicated bond between X and P'. In various examples, $RG^3$ may react with the monomer employed to form electrolyte polymer 204. For example, electrolyte polymer 204 may be formed as polyethylene oxide via ring-opening polymerization of ethylene oxide. $RG^3$ may be an ethylene oxide or glycidyl group and may copolymerize with the ethylene oxide to bond X to electrolyte polymer 204. In another example, electrolyte polymer 204 may be formed by a radical polymerization using monomeric precursors having polymerizable alkene groups. For example, a radical copolymerization may be employed for preparing polymer electrolytes of the class of polytetrafluoroethylene:perfluorosulfonic acid copolymers known by the trade name NAFION® (Dupont, Wilmington, Del.). A radical copolymerization may be conducted using a tetrafluoroethylene and a perfluorooxyalkylene sulfonate to form a polytetrafluoroethylene:perfluorosulfonic acid copolymer. $RG^3$ may be an alkene group such as vinyl that may copolymerize in the radical polymerization to bond X to electrolyte polymer 204. See also FIG. 5. In other examples, P' may be provided with a reactive group $RG^{1'}$ which may independently take any of the values provided herein for $RG^1$ and $RG^2$. Likewise, in some examples, $RG^3$ may independently take any of the values provided herein for $RG^1$ and $RG^2$ in a coupling reaction. In various examples, the P' and X may then be coupled by any of the coupling reactions described herein for coupling $Q'$-$RG^1$ and $RG^2$-X.

Figure 4B:
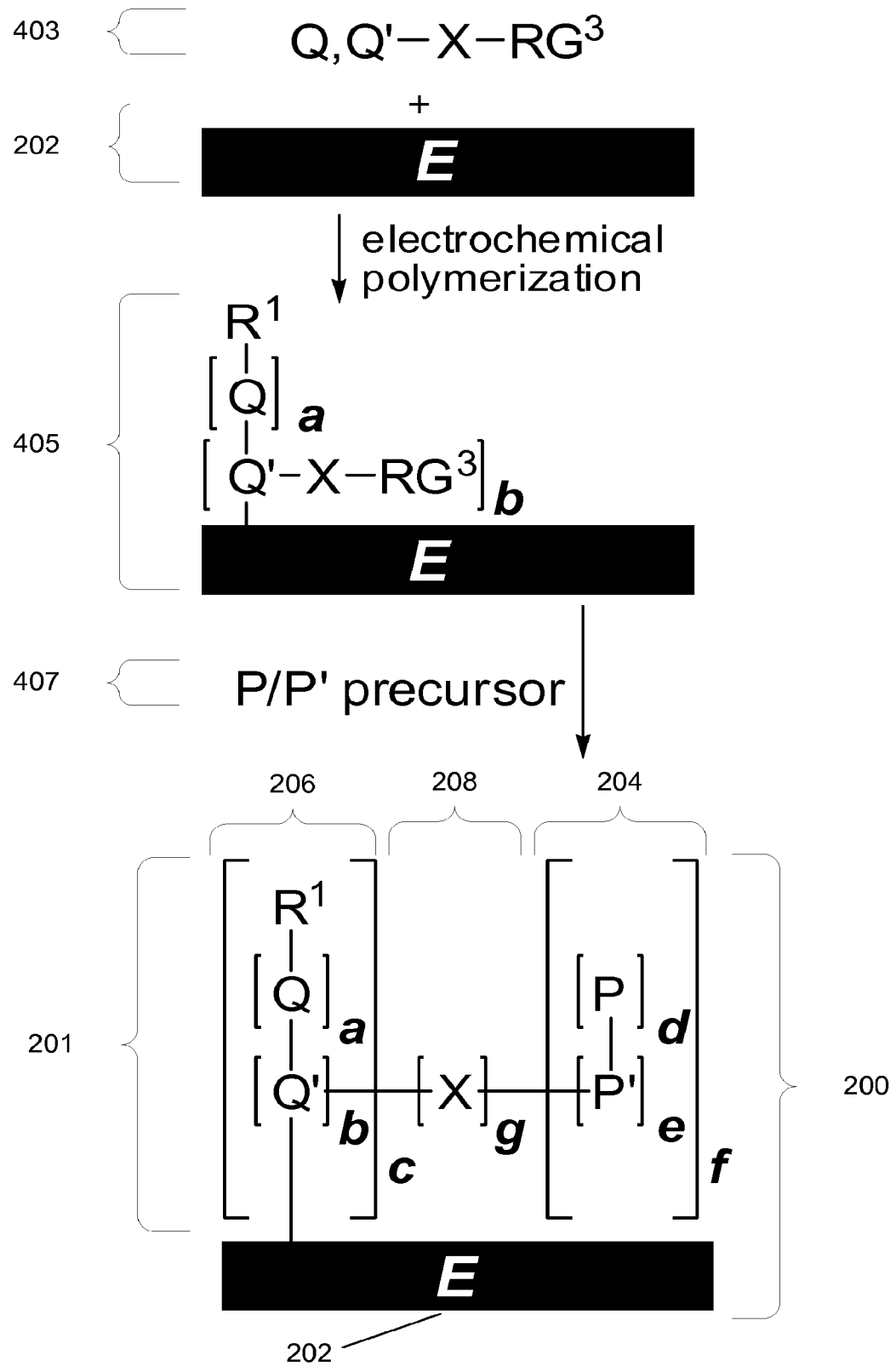
FIG. 4B is a conceptual scheme showing a further example of electrochemical polymerization and cross-linking.

FIG. 4B is a conceptual scheme showing a further example of electrochemical polymerization and cross-linking, arranged in accordance with at least some embodiments described herein. FIG. 4B depicts a further example method of forming the polymeric electrochemical layer 201 in contact with an electrode substrate 202. Compound 403, which may include conductive polymer monomer repeat unit Q' bonded to aliphatic cross-link X and reactive group $RG^3$, may be subjected to electrochemical polymerization. In some examples, the electrochemical polymerization may be conducted in the presence of a conductive polymer monomer repeat unit Q, which may be the same or different compared to Q'. The electrochemical polymerization couples electrode substrate 202 to a conductive polymer functionalized with $RG^3$ as shown in structure 405. Structure 405 may then be reacted with compounds 407 to form the polymeric electrochemical layer 201 in contact with the electrode substrate 202.

FIGS. 4C, 4D, 4E, 4F, 4G, 4H, and 4I show specific examples of the general polymerizations outlined in FIG. 4A and FIG. 4B, arranged in accordance with at least some embodiments described herein.

Figure 4C:
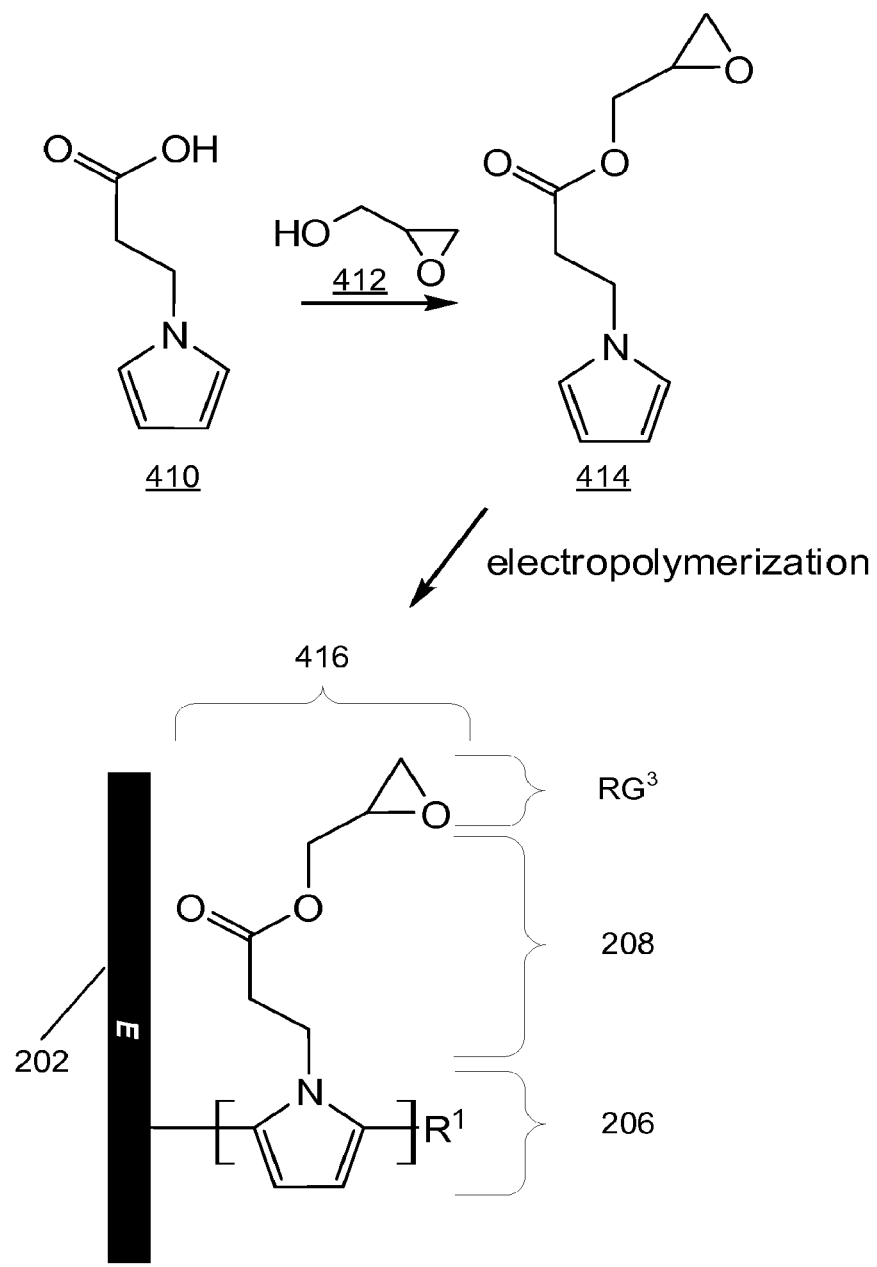
FIG. 4C is a conceptual scheme showing an example of synthesis and electrochemical polymerization of a glycidyl substituted pyrrole monomer.

FIG. 4C is a conceptual scheme showing an example of synthesis and electrochemical polymerization of a glycidyl substituted pyrrole monomer, arranged in accordance with at least some embodiments described herein. FIG. 4C shows an esterification reaction of 3-(N-pyrrolyl)propionic acid 410 with glycidyl alcohol 412 that may form the corresponding glycidyl ester, oxiran-2-ylmethyl 3-(1H-pyrrol-1-yl)propanoate 414. Compound 414 may then be electrochemically polymerized at the inner surface of electrode substrate 202 to form glycidyl-functionalized conductive polymer 416, poly(oxiran-2-ylmethyl 3-(1H-pyrrol-1-yl)propanoate). In various examples, the glycidyl-functionalized conductive polymer 416 may include polypyrrole as the conductive polymer region 206, —$CH_2CH_2C(O)O$— as the nonconductive linker region 208, and glycidyl as reactive group $RG^3$.

Figure 4D:
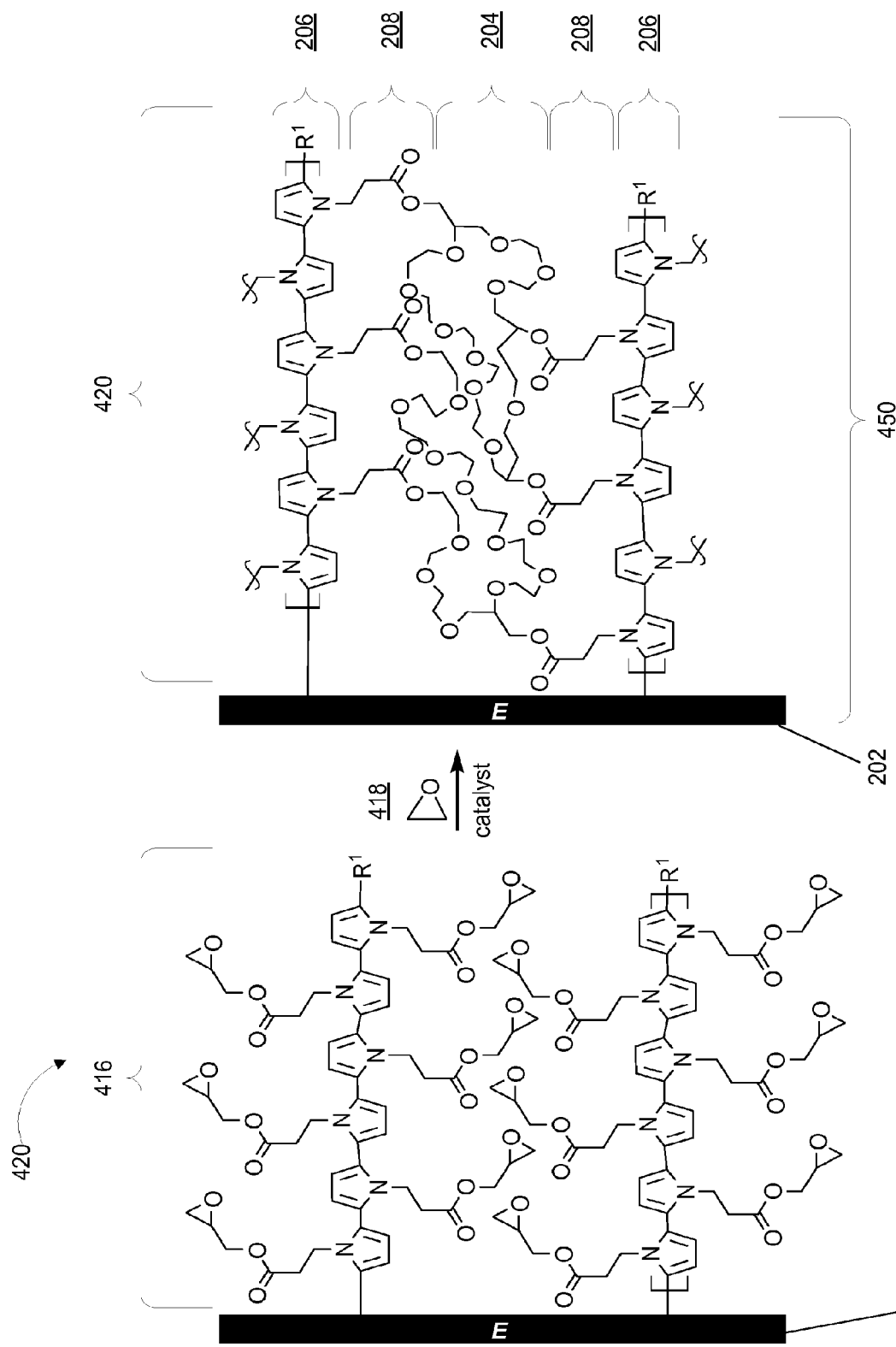
FIG. 4D is a conceptual scheme showing an example of cross-linking the electrochemically polymerized layer of FIG. 4C.

FIG. 4D is a conceptual scheme showing an example of cross-linking the electrochemically polymerized layer of FIG. 4C, arranged in accordance with at least some embodiments described herein. FIG. 4D shows a cross-linking reaction of glycidyl-functionalized conductive polymer 416, poly(oxiran-2-ylmethyl 3-(1H-pyrrol-1-yl)propanoate) with ethylene oxide 418 and an epoxidation catalyst to form a polymer electrochemical layer 420. Polymer electrochemical layer 420 is a specific example of the polymeric electrochemical layer 201. Polymer electrochemical layer 420 may include polypyrrole as the conductive polymer region 206, —$CH_2CH_2C(O)O$— as the nonconductive linker region 208, and polyethylene oxide as the polymer electrolyte region 204. In various examples, the reaction depicted in FIG. 4D may produce a composite electrode 450.

Figure 4E:
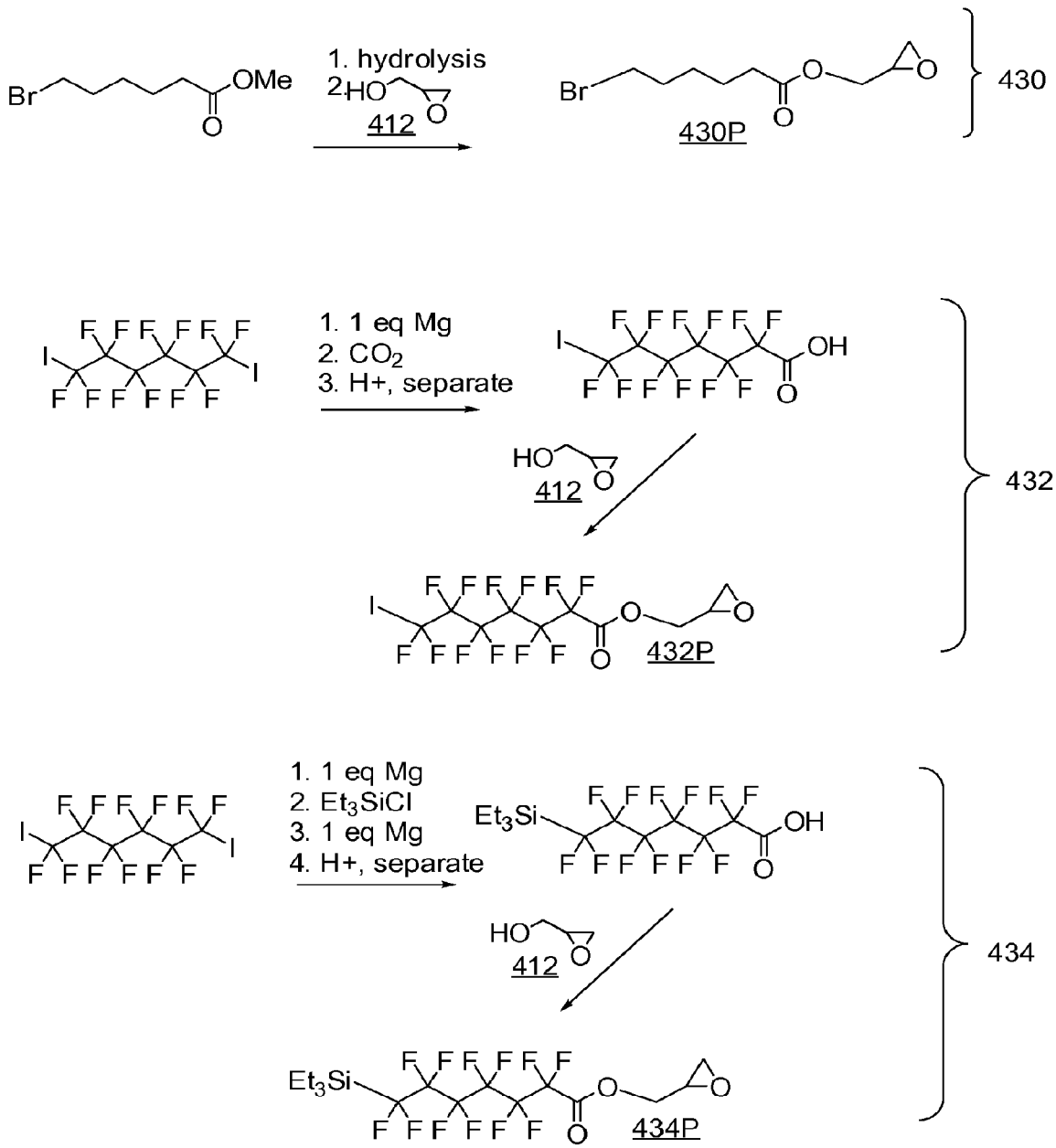
FIG. 4E is a conceptual scheme showing the synthesis of various cross-linkers.

FIG. 4E is a conceptual scheme showing example syntheses of various cross-linkers, arranged in accordance with at least some embodiments described herein. FIG. 4E shows example Reaction Schemes 430, 432, and 434 for preparing, respectively, glycidyl-containing precursors 430P, 432P, and 434P. For example, as shown in Reaction Scheme 430, the compound 6-bromo hexanoic acid, methyl ester ([14273-90-6], Sigma Aldrich, St. Louis, Mo.) may be hydrolyzed to 6-bromo hexanoic acid and then coupled with glycidyl alcohol 412 to form 6-bromo hexanoic acid, glycidyl ester 430P. As shown in Reaction Scheme 432, compound 1,6-diiodo perfluoro hexane ([375-80-4], Sigma Aldrich, St. Louis, Mo.) may be reacted with one equivalent of magnesium, followed by reaction with carbon dioxide, quenching, and separation to afford the carboxyl intermediate, and then coupled with glycidyl alcohol 412 to form 7-iodo heptanoic acid, glycidyl ester 432P. As shown in Reaction Scheme 434, compound 1,6-diiodo perfluoro hexane may also be reacted with two equivalents of magnesium, followed by reaction with one equivalent of triethyl silyl chloride and one equivalent of carbon dioxide, quenching, and separation to afford the carboxyl intermediate, and then coupled with glycidyl alcohol 412 to form 7-(triethylsilyl) perfluoroheptanoic acid, glycidyl ester 434P.

Figure 4F:
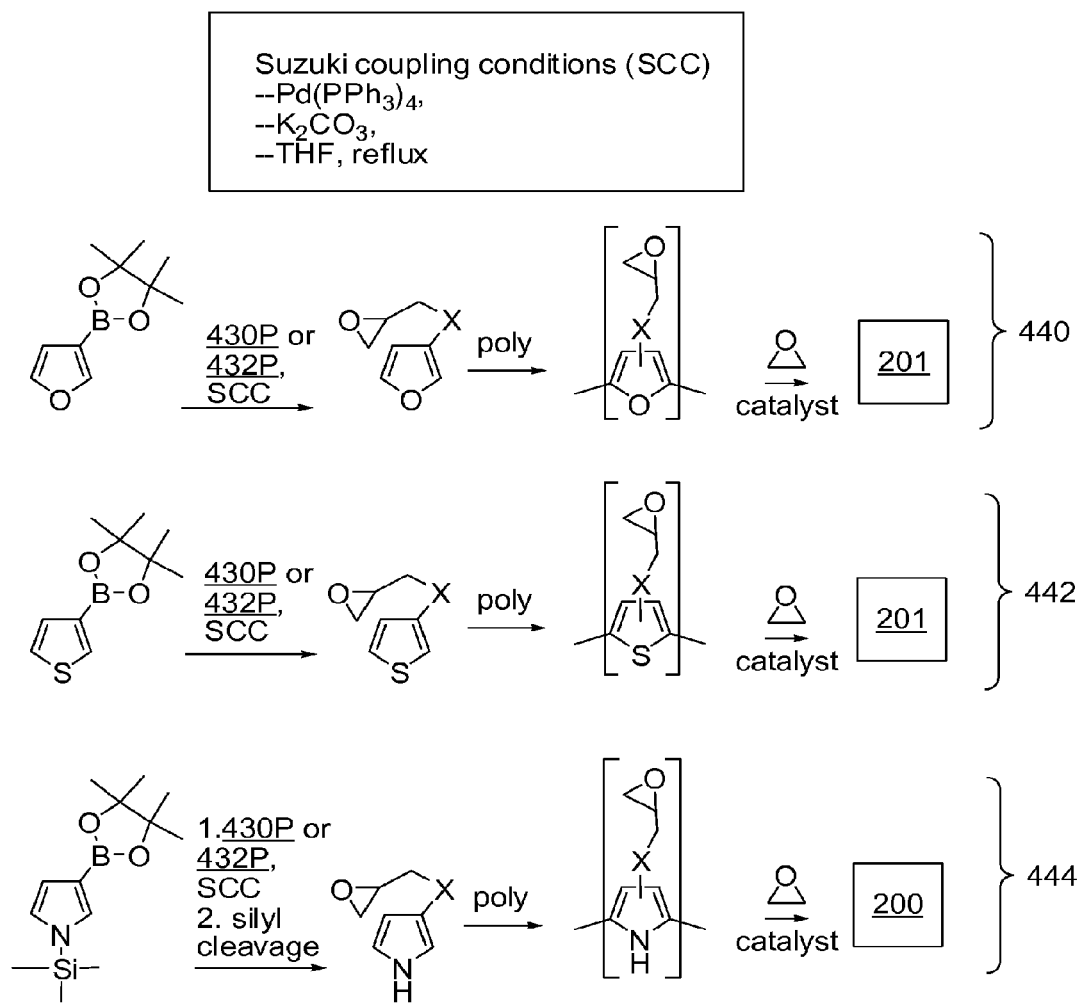
FIG. 4F is a conceptual scheme showing example syntheses of various glycidyl substituted conductive polymers.

FIG. 4F is a conceptual scheme showing example syntheses of various glycidyl substituted conductive polymers, arranged in accordance with at least some embodiments described herein. FIG. 4F shows the use of Suzuki coupling conditions that may be used to incorporate glycidyl-containing precursors 430P and 432P into conductive polymers and conductive polymer precursors. For example, monomers for polymerization to conductive polymers may be first substituted with glycidyl-containing precursors 430P and 432P, and then polymerized according to known chemical or electrochemical polymerization methods. In various examples, glycidyl-containing precursors 430P and 432P may be coupled to aryl or heteroaryl monomers of conductive polymers via tetrakis-triphenyl phosphine palladium catalyzed cross-coupling of corresponding bromo and boronate-ester substituted precursors using the well known Suzuki coupling reaction (Reaction Schemes 440, 442, and 444). For example, in Reaction Scheme 440, furan substituted with a boronate ester may be coupled with glycidyl-containing precursors 430P or 432P under Suzuki coupling conditions to form the glycidyl-substituted furan intermediate, which may be polymerized at electrode substrate 202 according to known chemical or electrochemical polymerization methods, as demonstrated in FIG. 4C for glycidyl-substituted pyrrole monomer 414. Subsequently, ethylene oxide 418 may be added as demonstrated in FIG. 4D to form the polymeric electrochemical layer 201 at composite polymeric electrode 450.

Figure 4G:
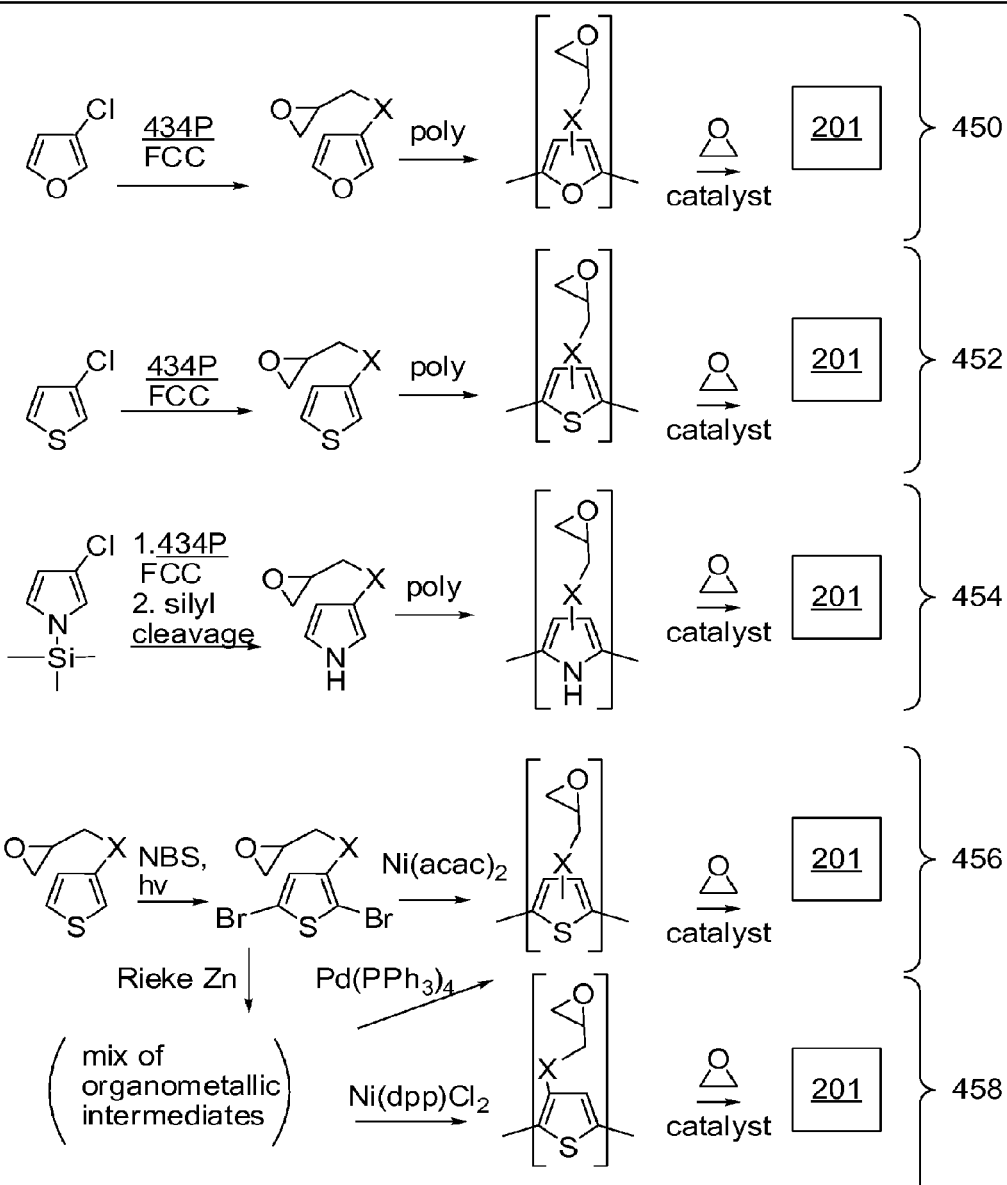
FIG. 4G is a conceptual scheme showing further example syntheses of various glycidyl substituted conductive polymers.

FIG. 4G is a conceptual scheme showing further example syntheses of various glycidyl substituted conductive polymers, arranged in accordance with at least some embodiments described herein. FIG. 4G shows Buchwald fluoroalkyl coupling conditions that may be used to incorporate glycidyl-containing precursor 434P into conductive polymers and conductive polymer precursors. In various examples, the fluoroalkyl coupling conditions may include about 1 equivalent of a palladium catalyst such as [(allyl)PdCl$_2$] or Pd(dba)$_2$; 1.5 equivalents of a hindered phosphine catalyst such as BrettPhos (dicyclohexyl(2',4',6'-triisopropyl-3,6-dimethoxybiphenyl-2-yl)phosphine) or RuPhos (dicyclohexyl(2',6'-diisopropoxybiphenyl-2-yl)phosphine); and two equivalents of potassium fluoride; all stirred in dioxane for about 6-24 hours under pressure at a temperature of between about 100° C. and about 150° C. Some example fluoroalkyl coupling conditions may provide coupling of a trialkyl silyl perfluoroalkane such as 7-(triethylsilyl) perfluoroheptanoic acid, glycidyl ester 434P with aryl chlorides, such as 3-chloro furan, 3-chloro thiophene, or 3-chloro-N-trimethylsilyl pyrrole. The resulting monomers may be polymerized at electrode substrate 202 according to known chemical or electrochemical polymerization methods, for example, as demonstrated in FIG. 4C for glycidyl-substituted pyrrole monomer 414. Subsequently, ethylene oxide 418 may be added as demonstrated in FIG. 4D to form the polymeric electrochemical layer 201 at composite polymeric electrode 450.

Figure 4H:
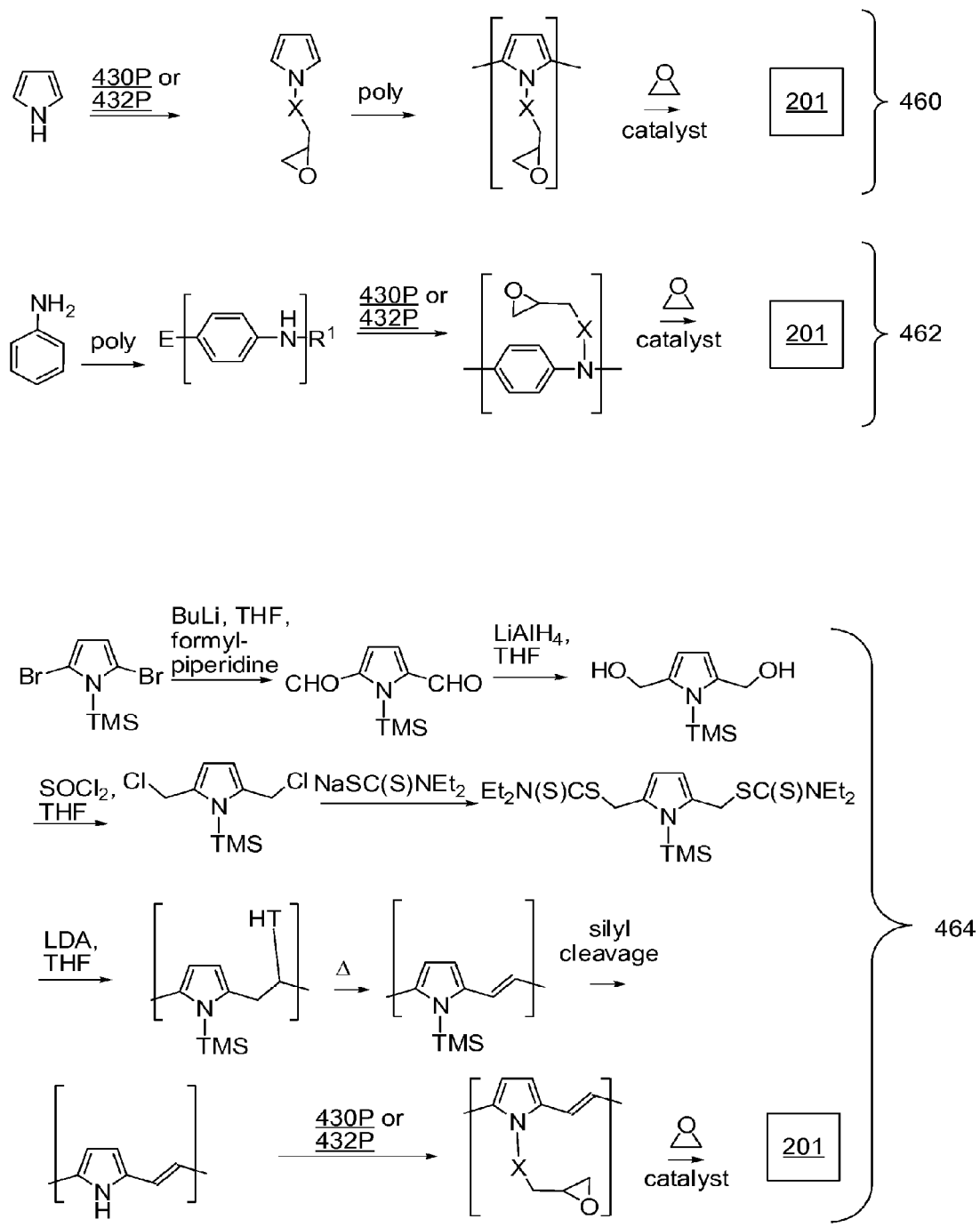
FIG. 4H is a conceptual scheme showing additional example syntheses of various glycidyl substituted conductive polymers.
Figure 4I:
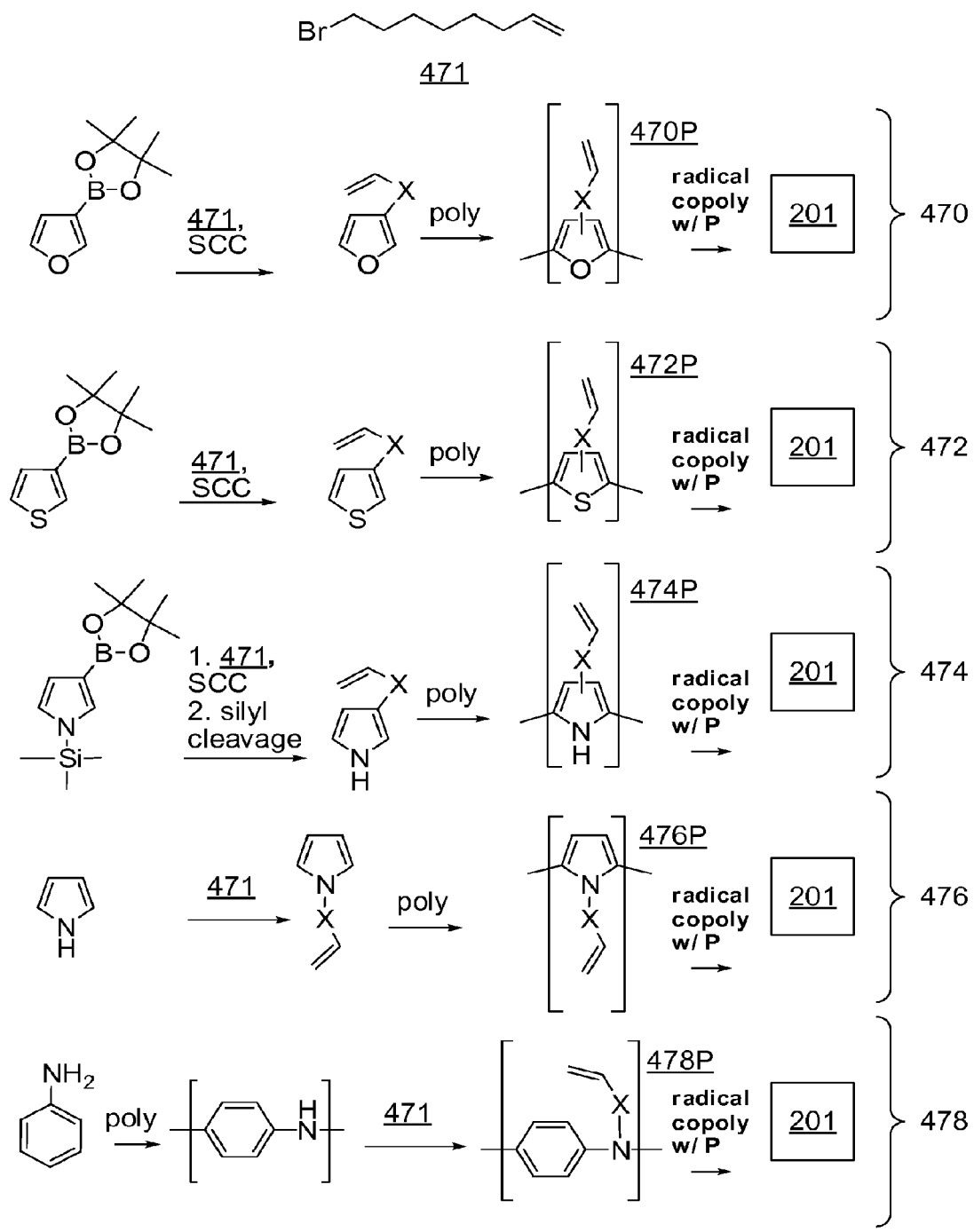
FIG. 4I is a conceptual scheme showing example syntheses of various vinyl substituted conductive polymers.

In various examples, suitable starting materials for reactions described in FIG. 4F, FIG. 4G, and FIG. 4I may include halo or borate/boronic ester substituted derivatives of conductive polymer monomers. Halogen derivatives of conductive polymer monomers may also be synthesized by irradiating an unsubstituted conductive polymer monomer in the presence of a halogen radical source, e.g., N-bromo-succinimide or N-chloro-succinimide. Boronate ester substituted derivatives may also be synthesized by reaction of the corresponding halo derivative with pinacol borane in the presence of palladium dichloride.

Many thiophenes, furans, and pyrroles may be polymerized to their corresponding conductive polymers using standard electrochemical methods. In some instances, electrochemical polymerization of some 3-substituted thiophenes, furans, and pyrroles has been reportedly hindered due to steric effects. Fortunately, many known chemical methods may provide effective regio-random and regio-regular polymerization of 3-substituted thiophenes, furans, and pyrroles. Examples adapted from known chemical methods are shown in FIG. 4G in Reaction Schemes 456 and 458. For example, irradiation of 3-substituted thiophenes in the presence of two equivalents of N-bromo-succinimide may produce 2,5-dibromo-3-substituted thiophenes. These 2,5-dibromo-3-substituted thiophenes may be polymerized directly using nickel acetoacetate as a catalyst, which may form corresponding regio-random polymers. In other examples, 2,5-dibromo-3-substituted thiophenes may be treated with the material known as "Rieke zinc" to form a mixture of organometallic isomers. Regio-random polymerization of the mix of organometallic isomers may be accomplished using a catalytic amount of tetrakis-triphenyl phosphine palladium. Regio-regular polymerization of the mix of organometallic isomers may be accomplished using a catalytic amount of 1,2-bis (diphenylphosphino)ethane nickel(II) chloride. These and other chemically synthesized polymers may be coupled to the electrode substrate 202 as follows: a small amount of electrochemically polymerized conductive polymer is formed at electrode substrate 202, and may be brominated by irradiation in the presence of N-bromo-succinimide. The chemical polymerizations described for 2,5-dibromo-3-substituted thiophenes in Reaction Schemes 456 and 458 may then be carried out in the presence of the brominated electrochemically polymerized conductive polymer at electrode substrate 202.

FIG. 4H is a conceptual scheme showing additional example syntheses of various glycidyl substituted conductive polymers, arranged in accordance with at least some embodiments described herein. FIG. 4H, Reaction Scheme 460 shows that monomers with primary or secondary amines such as pyrrole may be N-substituted using glycidyl-containing precursors 430P and 432P. In further examples, FIG. 4E, Reaction Scheme 462 shows that polymers with primary or secondary amines such as polyaniline may be N-substituted using glycidyl-containing precursors 430P and 432P. In Reaction Schemes 460 and 462, the N-substituted monomers may further be polymerized to the corresponding N-substituted polymers via electrochemical polymerization, as demonstrated in FIG. 4C for glycidyl-substituted pyrrole monomer 414. Subsequently, ethylene oxide 418 may be added as demonstrated in FIG. 4D to form the polymeric electrochemical layer 201 at composite polymeric electrode 450.

FIG. 4I is a conceptual scheme showing example syntheses of various vinyl substituted conductive polymers, arranged in accordance with at least some embodiments described herein. FIG. 4I, Reaction Scheme 464 depicts an example synthesis of substituted poly arylene vinylene or heteroarylene vinylenes adapted from various known routes. In some examples, 3-substituted 2,5 dibromo thiophene (obtained as shown in Reaction Scheme 456) may be converted to the 2,5-diformyl compound by reaction with butyllithium followed by formylpiperidine. The 2,5-diformyl compound may be reduced using lithium aluminum hydride to give the 2,5-dimethanol compound. The 2,5-dimethanol derivative may be converted to the corresponding 2,5-dichloromethyl compound with thionyl chloride. The 2,5-dichloromethyl compound may be reacted with sodium diethyldithiocarbamato trihydrate to form the corresponding 2,5-bis diethyldithiocarbamato derivative. The 2,5-bis diethyldithiocarbamato derivative may be polymerized in a regio-specific manner with lithium isopropyl amide to form an initial polymer with a diethyldithiocarbamato substituent. Subsequent thermolysis of the initial polymer generates, for example, substituted thiophene vinylene. Subsequently, ethylene oxide 418 may be added as demonstrated in FIG. 4D to form the polymeric electrochemical layer 201 at composite polymeric electrode 450.

FIG. 4I shows the incorporation of alkene groups as an alternative to glycidyl groups. For example, in Reaction Schemes 470, 472, and 474, Suzuki coupling conditions may be employed to couple 8-bromo octane 471 ([2695-48-9], Sigma-Aldrich, St. Louis Mo.) into conductive polymers and conductive polymer precursors as shown. In further examples, Reaction Schemes 476 and 478 show that routine amine alkylation conditions may be employed to couple 8-bromo octane 471 into amine-containing conductive polymers and conductive polymer precursors, such as pyrrole->polypyrrole and polyaniline as shown. The resulting alkene-functionalized conductive polymers may then be included in any radical copolymerization reaction suitable for preparing polymer electrolyte 204.

Figure 5:
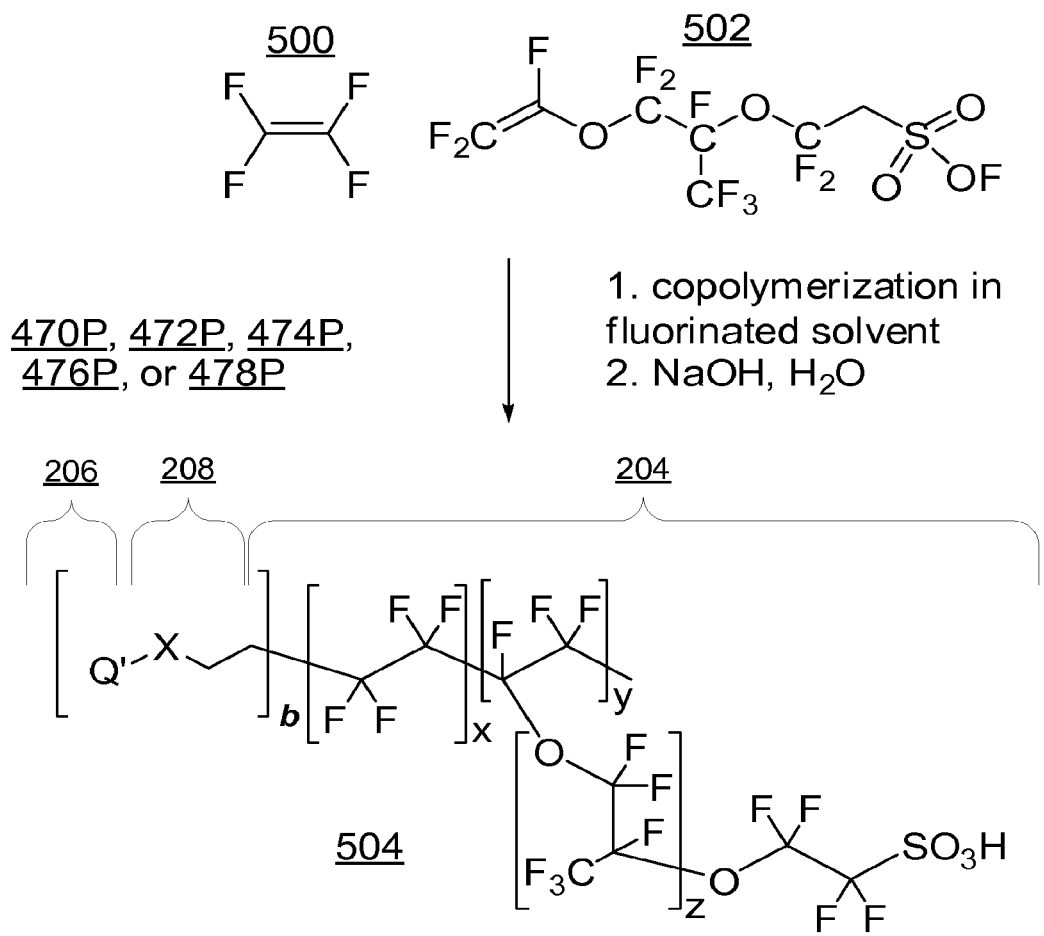
FIG. 5 is a conceptual scheme showing an example radical copolymerization.
Figure 5:
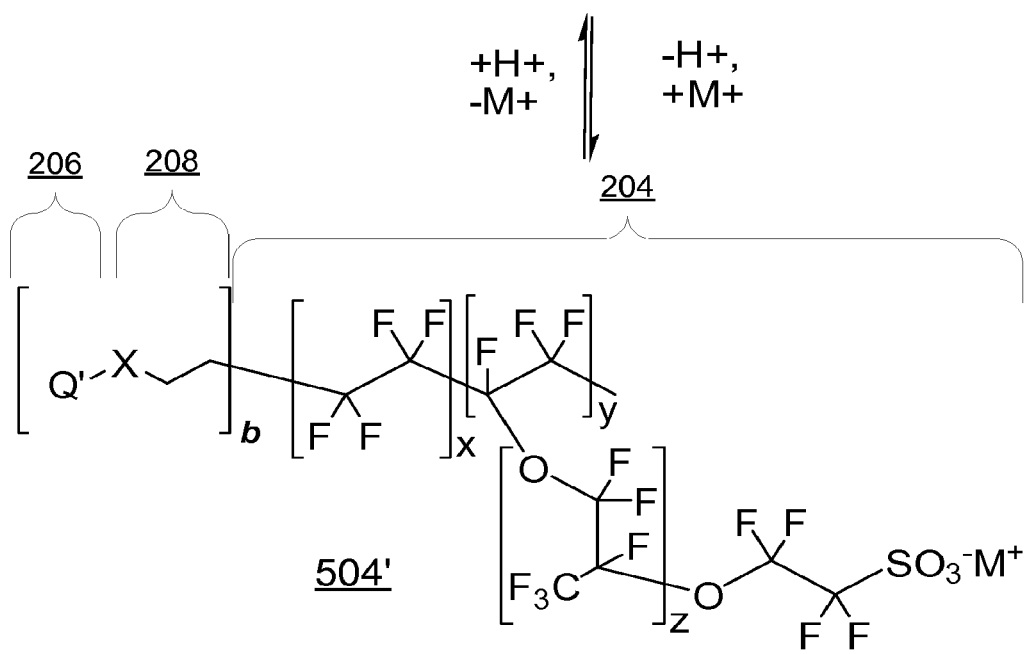

FIG. 5 is a conceptual scheme showing an example radical copolymerization, arranged in accordance with at least some embodiments described herein. FIG. 5 shows a radical copolymerization that may be employed for preparing polymer electrolytes of the class of polytetrafluoroethylene:perfluorosulfonic acid copolymers known by the trade name NAFION® (Dupont, Wilmington, Del.). These ionomers may be characterized by a polytetrafluoroethylene backbone substituted with perfluorovinyl ether groups having a terminal sulfonate. FIG. 5 shows that radical copolymerization may be conducted in the presence of alkene-substituted conductive polymers. An example polymerization may include tetrafluoroethylene 500, perfluorooxyalkylene sulfonate 502, and an alkene-substituted conductive polymer, such as the products 470P, 472P, 474P, 476P, or 478P of Reaction Schemes 470, 472, 474, 476, or 478, respectively, from FIG. 4I. The fluorosulfonate groups may be hydrolyzed to sulfonic acid groups using sodium hydroxide and water to produce composite ionomer 504, which may interconvert with its salt form 504'. In various examples, composite ionomer 504/504' may be described in three parts as shown in FIG. 5: conductive polymer 204, nonconductive linker 208, and ionomer polymer electrolyte 206.

Figure 6:
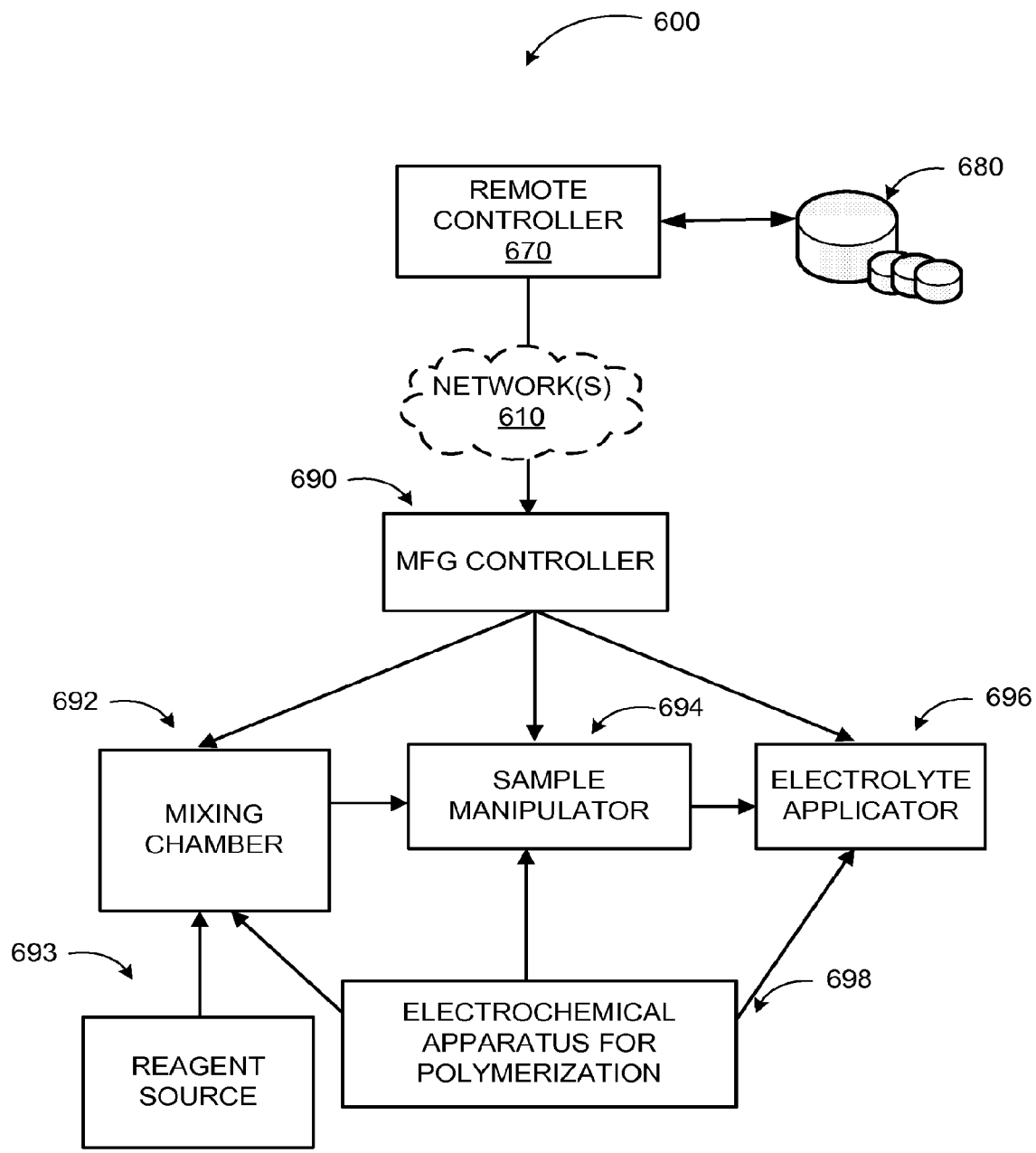
FIG. 6 is a block diagram of an example system that may be configured to manufacture electrochemical capacitor devices.

Example embodiments may also include systems configured for making composite electrodes and electrochemical capacitor devices. FIG. 6 is a block diagram of an example system 600 that may be configured for making electrochemical capacitor devices as described herein, in accordance with at least some embodiments described herein. As illustrated in FIG. 6, a manufacturing controller 690 may be coupled to the machines that may be used to carry out the operations described in FIG. 7, for example, a mixing chamber 692, a reagent source 693, a sample manipulator 694, an electrolyte applicator machine 696, and/or an optional electrochemical apparatus for polymerization 698.

In various examples, mixing chamber 692 may include one or more mixing functions, such as mechanical stirring, ultrasonication for dissolving and/or reacting the conductive polymer 206, the polymer electrolyte 204, the nonconductive linker 208, or precursors thereof.

In some examples, sample manipulator 693 may include one or more application functions, e.g., for applying the solutions of polymers or precursors thereof to electrode substrate 202 to form a thin film. Sample manipulator 693 may also include cutting, bending, or other functions suitable for forming the composite electrodes 200 and 200'.

In other examples, mixing chamber 692, sample manipulator 693, and reagent source 694 may be configured alone or in any combination to coat polymers, crosslinks, or precursors thereof on a surface such as electrode substrate 202. Such coating may be conducted, e.g., by spin coating, dip coating, spray coating, and so on, depending on the coating functionality provided by mixing chamber 692, sample manipulator 693, and reagent source 694. In other examples, system 600 may form a layer or article, e.g., by extrusion, co-extrusion, or injection molding, depending on the extrusion or molding functionality provided by mixing chamber 692, sample manipulator 693, and reagent source 694.

In further examples, electrolyte applicator 696 may be configured alone or in any combination with mixing chamber 692 and sample manipulator 693 to contact a liquid electrolyte to composite electrodes 200 or 200' or other features of the electrochemical capacitor devices as described herein.

In various examples, optional electrochemical apparatus 698 may be configured in some examples to electrochemically polymerize the monomeric precursors to form the conductive polymer 206.

In some examples, manufacturing controller 690 may be operated by human control, by a remote controller 670 via network 610, or by machine executed instructions such as might be found in a computer program. Data associated with controlling the different processes of making the electrochemical capacitor may be stored at and/or received from data stores 680.

Example embodiments may also include methods of making composite electrodes and electrochemical capacitor devices as described herein. These methods may be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. The various human operators need not be collocated with each other, and instead each operated can be located about one or more machines that perform a portion of the operations. In other examples, the human interaction may be automated such as by pre-selected criteria that may be machine automated.

Figure 7:
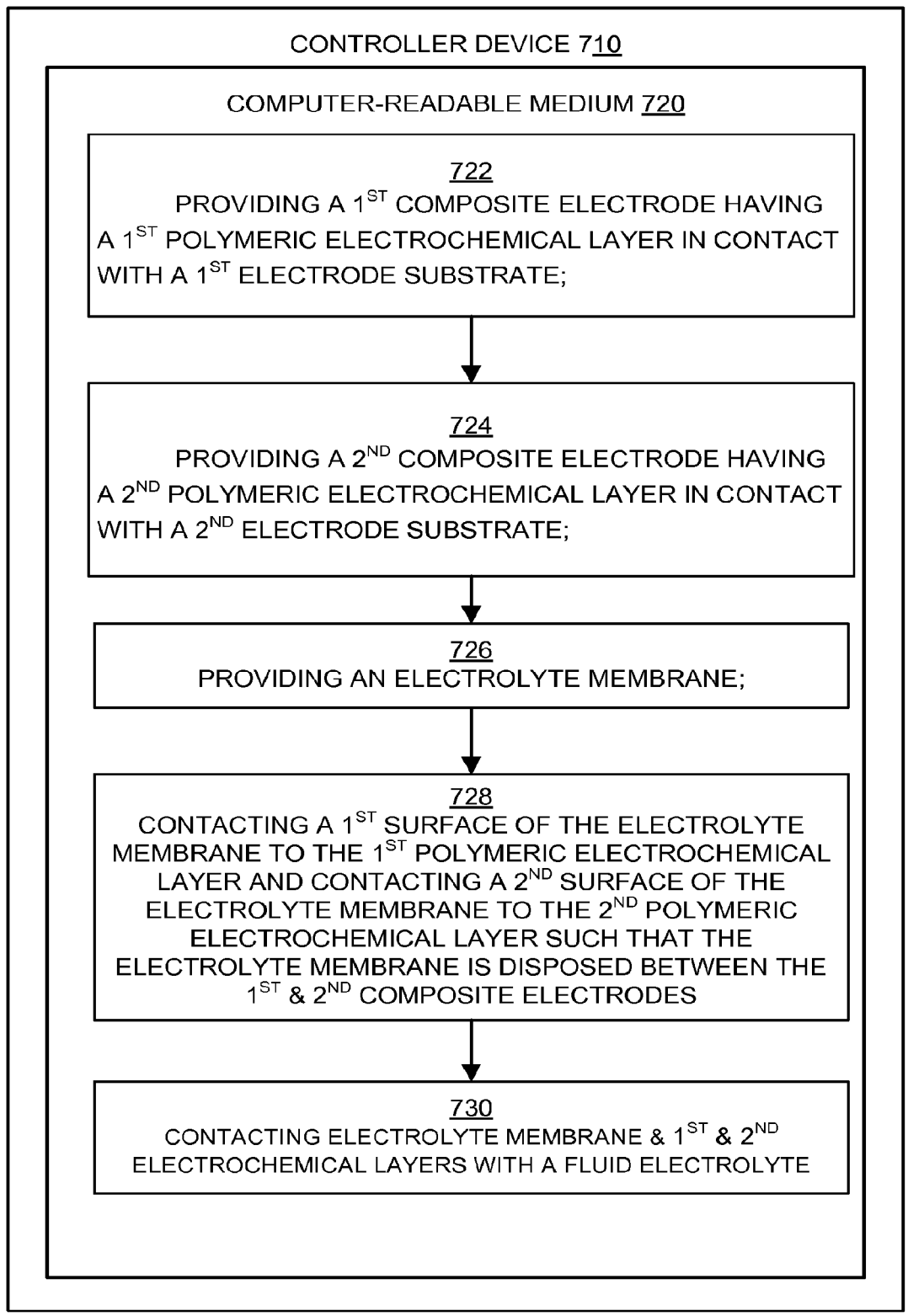
FIG. 7 is a flow diagram showing example operations that may be used in making electrochemical capacitor devices.

FIG. 7 is a flow diagram showing various methods or processes that may be used in making an electrochemical capacitor devices such as example electrochemical capacitor device 210, in accordance with at least some embodiments described herein. A process of making an electrochemical capacitor as described herein may include one or more operations, functions or actions as is illustrated by one or more of blocks 722, 724, 726, 728 and/or 730. An example method of making an electrochemical capacitor as described herein may be controlled by a computing device such as device 800 in FIG. 8 or a special purpose controller such as manufacturing controller 690 of FIG. 6. Controller device 710 may be embodied as computing device 800, manufacturing controller 690, or similar devices configured to execute instructions stored in computer-readable medium 720 for controlling the performance of the method.

Some example methods may begin with operation 722, "PROVIDING A 1ST COMPOSITE ELECTRODE HAVING A 1ST POLYMERIC ELECTROCHEMICAL LAYER IN CONTACT WITH A 1ST ELECTRODE SUBSTRATE". Operation 722 may be performed, for example, by sample manipulator 693 in mixing chamber 692. At operation 722, manufacturing controller 690 may instruct machine 692 with parameters regarding, for example, the extent of mechanical stirring or ultrasonication by elapsed time for polymers or precursors thereof being mixed and formed. Operation 722 may be continued until a predetermined condition may be satisfied. A "predetermined condition" may include one or more of, e.g., a mixing time sufficient to dissolve at least a portion of the polymers or precursors thereof; a viscosity corresponding to dissolution of at least a portion of the polymers or precursors thereof; a visual or spectroscopic indicator corresponding to formation of the polymeric electrochemical layer 201 at the electrode substrate 202. In some examples, operation 722 may be conducted in conjunction with polymerization. For example, one or more reagents such as the monomeric precursors of the conductive polymer 206, the polymer electrolyte 204, or the nonconductive linker 208 may be contacted to the electrode substrate 202 for chemical or electrochemical polymerization Operation 722 may be followed by operation 724, "PROVIDING A 2ND COMPOSITE ELECTRODE HAVING A 2ND POLYMERIC ELECTROCHEMICAL LAYER IN CONTACT WITH A 2ND ELECTRODE SUBSTRATE". Operation 724 may be the same as or different from operation 722. For example, in manufacturing an electrochemical capacitor where the $1^{st}$ and $2^{nd}$ composite electrodes are the same, operations 722 and 724 may be coincident. In other examples, in manufacturing an electrochemical capacitor where the $1^{st}$ and $2^{nd}$ composite electrodes are of different composition, operations 722 and 724 may be conducted separately using the principles outlined for operation 722. Where the $1^{st}$ and $2^{nd}$ composite electrodes are of different composition, the details of operations 722 and 724 may differ according to the nature of the different composite electrodes. For example, the $1^{st}$ and $2^{nd}$ composite electrodes may employ different polymer precursors and different solvents for polymerization.

Operations 722 and 724 may be followed by operation 726, "PROVIDING AN ELECTROLYTE MEMBRANE". At operation 724, electrolyte membranes such as 212 may be provided as preformed articles or as coatable or polymerizable solutions. In some examples, electrolyte membranes such as 212 may be polymerized in situ as described for polymerizations in conjunction with operations 722 and 724.

Operations 722, 724 and/or 726 may be followed by operation 728, "CONTACTING 1ST SURFACE OF ELECTROLYTE MEMBRANE TO 1ST POLYMERIC ELECTROCHEMICAL LAYER & CONTACTING 2ND SURFACE OF ELECTROLYTE MEMBRANE TO 2ND POLYMERIC ELECTROCHEMICAL LAYER WHEREBY ELECTROLYTE MEMBRANE IS DISPOSED BETWEEN 1ST & 2ND COMPOSITE ELECTRODES". At operation 728, electrolyte membranes such as 212 may be contacted as preformed articles, or coated as solutions to contact the polymeric electrochemical layers. Suitable coating techniques can include one or more of: melt processing; solvent evaporation; reduced pressure solvent evaporation; spin coating; dip coating; spray coating; solvent casting; doctor blading; removal of solvent under supercritical conditions; polymerization in situ from precursors of the polymer; curing or cross-linking the polymer in situ; or mechanical layering of electrolyte membrane 212 as a preformed article.

Operation 728 may be followed by operation 730, "CONTACTING ELECTROLYTE MEMBRANE & 1ST & 2ND ELECTROCHEMICAL LAYERS WITH A FLUID ELECTROLYTE". Suitable electrolyte contacting techniques for operation 730 may include, for example, contacting polymer composite electrodes 200 and 200' and electrolyte membrane 212 with a liquid electrolyte. Suitable electrolyte contacting techniques may also include, for example, co-extruding, contacting, or sequentially layering. In further examples, operation 730 may include one or more of: melt processing; solvent evaporation; reduced pressure solvent evaporation; spin coating; dip coating; spray coating; solvent casting; doctor blading; removal of solvent under supercritical conditions; polymerization in situ from precursors of the polymer; curing or cross-linking the polymer in situ; depending on the nature of membrane electrolyte 212.

The operations included in the process of FIG. 7 described above are for illustration purposes. A process of making an example electrochemical capacitor as described herein may be implemented by similar processes with fewer or additional operations. In some examples, the operations may be performed in a different order. In some other examples, various operations may be eliminated. In still other examples, various operations may be divided into additional operations, or combined together into fewer operations. Although illustrated as sequentially ordered operations, in some implementations the various operations may be performed in a different order, or in some cases various operations may be performed at substantially the same time.

One additional consideration for making conductive polymer 206 and polymer electrolyte 204 may include various mixing techniques for dispersing the described components, such as conductive polymer monomers Q and Q', polymer electrolyte monomers P and P', precursors of nonconductive linking group X, or liquid electrolyte components. Such components may be dispersed in a solution or liquid of the polymer or a polymer precursor. The dispersal methods may include mechanical techniques, for example, stirring or mechanical ball milling the components to be dispersed in combination with the polymer. The dispersal methods may also include, for example, ultrasonication of the components in contact with the polymers. In various examples, the dispersal method (e.g., ultrasonication) may be followed immediately by the polymer forming method (e.g., spin coating) to avoid settling of the dispersed components.

FIG. 8 illustrates an example general purpose computing device that may be used to control the example system 600 of FIG. 6 or similar manufacturing equipment in making electrochemical capacitor devices, in accordance with at least some embodiments described herein. In a basic configuration 802, computing device 800 typically may include one or more processors 804 and a system memory 806. A memory bus 808 may be used for communicating between processor 804 and system memory 806.

Depending on the desired configuration, processor 804 may be of any type including but not limited to a microprocessor (µP), a microcontroller (µC), a digital signal processor (DSP), or any combination thereof. Processor 804 may include one more levels of caching, such as a level cache memory 812, a processor core 814, and registers 816. Example processor core 814 may include an arithmetic logic unit (ALU), a floating point unit (FPU), a digital signal processing core (DSP Core), or any combination thereof. An example memory controller 818 may also be used with processor 804, or in some implementations memory controller 815 may be an internal part of processor 804.

Depending on the desired configuration, system memory 806 may be of any type including but not limited to volatile memory (such as RAM), non-volatile memory (such as ROM, flash memory, etc.) or any combination thereof. System memory 806 may include an operating system 820, one or more manufacturing control applications 822, and program data 824. Manufacturing control application 822 may include a control module 826 that may be arranged to control automated machine 600 of FIG. 6 and any other processes, methods and functions as discussed above. Program data 824 may include, among other data, material data 828 for controlling various aspects of the automated machine 600. This described basic configuration 802 is illustrated in FIG. 8 by those components within the inner dashed line.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices may include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 806, removable storage devices 836 and non-removable storage devices 838 may be examples of computer storage media. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 866 to basic configuration 802 via bus/interface controller 830. Example output devices 842 include a graphics processing unit 848 and an audio processing unit 850, which may be configured to communicate to various external devices such as a display or speakers via one or more AN ports 852. Example peripheral interfaces 544 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 866 may include a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a physical server, virtual server, a computing cloud, or a hybrid device that include any of the above functions. Computing device 800 may also be implemented as a personal computer including both laptop computer and non-laptop computer configurations. Moreover computing device 800 may be implemented as a networked system or as part of a general purpose or specialized server.

Networks for a networked system including computing device 800 may comprise any topology of servers, clients, switches, routers, modems, Internet service providers, and any appropriate communication media (e.g., wired or wireless communications). A system according to embodiments may have a static or dynamic network topology. The networks may include a secure network such as an enterprise network (e.g., a LAN, WAN, or WLAN), an unsecure network such as a wireless open network (e.g., IEEE 802.11 wireless networks), or a world-wide network such (e.g., the Internet). The networks may also comprise a plurality of distinct networks that may be adapted to operate together. Such networks may be configured to provide communication between the nodes described herein. By way of example, and not limitation, these networks may include wireless media such as acoustic, RF, infrared and other wireless media. Furthermore, the networks may be portions of the same network or separate networks.

FIG. 9 illustrates a block diagram of an example computer program product that may be configured to control the example system of FIG. 6 or similar manufacturing equipment in making electrochemical capacitor devices, in accordance with at least some embodiments described herein. In some examples, as shown in FIG. 9, computer program product 900 may include a signal bearing medium 902 that may also include machine readable instructions 904 that, when executed by, for example, a processor, may provide the functionality described above with respect to FIG. 6 through FIG. 8. For example, referring to processor 690, one or more of the tasks shown in FIG. 9 may be undertaken in response to instructions 904 conveyed to the processor 690 by medium 902 to perform actions associated with making an example electrochemical capacitor as described herein. Some of those instructions may include, for example, one or more instructions to: control a reagent source to contact conductive polymer monomers to an electrode substrate; control an electrochemical apparatus to polymerize conductive polymer monomers at the electrode substrate to form precursor conductive polymer molecules; control the reagent source to provide a cross-link precursor; control a polymer applicator to contact precursor electrolyte polymer molecules to precursor conductive polymer molecules and the cross-link precursor to form a cross-linked polymer; control a sample manipulator to form the cross-linked polymer with the electrode substrate into $1^{st}$ composite electrode having $1^{st}$ polymeric electrochemical layer and a $2^{nd}$ composite electrode having a $2^{nd}$ polymeric electrochemical layer; control the sample manipulator to place an electrolyte membrane between $1^{st}$ and $2^{nd}$ composite electrodes to contact $1^{st}$ and $2^{nd}$ polymeric electrochemical layers; and/or control an electrolyte applicator to contact the electrolyte membrane and $1^{st}$ and $2^{nd}$ polymeric electrochemical layers with a fluid electrolyte to form the electrochemical capacitor.

In some implementations, signal bearing medium 902 depicted in FIG. 9 may encompass a computer-readable medium 906, such as, but not limited to, a hard disk drive, a Compact Disc (CD), a Digital Versatile Disk (DVD), a digital tape, memory, etc. In some implementations, signal bearing medium 902 may encompass a recordable medium 908, such as, but not limited to, memory, read/write (R/W) CDs, R/W DVDs, etc. In some implementations, signal bearing medium 902 may encompass a communications medium 910, such as, but not limited to, a digital and/or an analog communication medium (e.g., a fiber optic cable, a waveguide, a wired communications link, a wireless communication link, etc.). For example, computer program product 900 may be conveyed to the processor 904 by an RF signal bearing medium 902, where the signal bearing medium 902 may be conveyed by a wireless communications medium 910 (e.g., a wireless communications medium conforming with the IEEE 802.11 standard). While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks may be performed by remote processing devices that may be linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for providing a configuration environment, which may facilitate configuration of software/hardware products and services for a variety of purposes. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

In various examples, electrochemical capacitor devices may include: a first composite electrode, a first electrode substrate, a second composite and a second electrode substrate. The first composite electrode may have a first polymeric electrochemical layer that is arranged in contact with the first electrode substrate. The second composite electrode may have a second polymeric electrochemical layer that is arranged in contact with the second electrode substrate. In some further example electrochemical devices, an electrolyte membrane may be disposed between the first and second composite electrodes. The electrolyte membrane may have a first surface in contact with the first polymeric electrochemical layer and a second surface in contact with the second polymeric electrochemical layer. In various examples of the electrochemical capacitor devices, each of the first and second polymeric electrochemical layers may independently include a plurality of conductive polymer molecules electrically coupled to the corresponding one of the first electrode substrate or the second electrode substrate. In some examples of the electrochemical capacitor devices, each of the first and second polymeric electrochemical layers may independently include one or more electrolyte polymer molecules disposed among the conductive polymer molecules. In other examples of the electrochemical capacitor devices, each of the first and second polymeric electrochemical layers may independently include one or more unconjugated cross-links corresponding to each of the conductive polymer molecules. In further examples, the conductive polymer molecules may be covalently bonded to at least one of the one or more electrolyte polymer molecules by at least one of the one or more unconjugated cross-links. Various examples of electrochemical capacitor devices may include a fluid electrolyte in contact with the electrolyte membrane, the first polymeric electrochemical layer, and the second polymeric electrochemical layer.

In some example electrochemical capacitor devices, the first polymeric electrochemical layer and the second polymeric electrochemical layer may be of substantially similar composition. In some examples, each of the plurality of conductive polymer molecules may include one of: a polyacetylene, a polyarylene, a polyheteroarylene, a polyvinylarylene, a polyvinylheteroarylene, a polyarylene vinylene, a polyheteroarylene vinylene, a polyarylene ethynylene, a polyheteroarylene ethynylene, or a copolymer thereof. In other examples, at least one of the plurality of conductive polymer molecules may include a polyacetylene, a poly(phenylene vinylene), a poly(fluorene), a polypyrene, a polyazulene, a polynaphthalene, a poly(pyrrole), a polyindole, a polyazepine, a polyaniline, a polypyridine, a poly(thiophene), a poly(thiophene vinylene), a poly(phenylene sulfide), or a copolymer thereof. In further examples, each of the plurality of conductive polymer molecules may include between 2 monomer repeat units and 2000 monomer repeat units. In some other examples, at least about 50% of the monomer repeat units included in the plurality of conductive polymers may each be covalently bonded by one of the one or more unconjugated cross-links to at least one of the one or more electrolyte polymer molecules.

In other example electrochemical capacitor devices, the plurality of conductive polymer molecules, the one or more electrolyte polymer molecules, and the one or more unconjugated cross-links may together form an interpenetrating polymer network in each of the first and second polymeric electrochemical layers. In some examples, the plurality of conductive polymer molecules, the one or more electrolyte polymer molecules, and the one or more unconjugated cross-links may together form a single polymeric phase in each of the first and second polymeric electrochemical layers. In further examples, at least a portion of the plurality of conductive polymer molecules may be covalently bonded to the corresponding first or second electrode.

In further example electrochemical capacitor devices, each unconjugated cross-link may be a branched or unbranched $C_2$-$C_{20}$ alkylene, a branched or unbranched $C_2$-$C_{20}$ alkylene ester, a branched or unbranched $C_2$-$C_{20}$ perfluoroalkylene, or a branched or unbranched $C_2$-$C_{20}$ perfluoroalkylene ester. In some examples, the one or more polymer electrolyte molecules may include one of: a poly(oxy)alkylene, a polytetrafluoroethylene-perfluorosulfonic acid copolymer, a sulfonated arylene, a sulfonated polystyrene, a sulfonated poly(tetrafluoroethylene-hexafluoropropylene), a poly(vinylidene fluoride), a sulfonated poly(aryl)siloxane, a sulfonated poly(alkyl)siloxane, a sulfonated polyetheretherketone, a sulfonated polysulfone, a sulfonated polyethersulfone, a polybenzimidazole, a polyimide, a polyphenylene, a poly(4-phenoxybenzoyl-1,4-phenylene), a polybenzimidazole, a polyvinyl alcohol, a polyacrylamide, a polyethylenimine, or a combination thereof. In further examples, the electrolyte membrane may include one of: a poly(oxy)alkylene, a polytetrafluoroethylene:perfluorosulfonic acid copolymer, a sulfonated arylene, a sulfonated polystyrene, a sulfonated poly(tetrafluoroethylene-hexafluoropropylene), a poly(vinylidene fluoride), a sulfonated poly(aryl)siloxane, a sulfonated poly(alkyl)siloxane, a sulfonated polyetheretherketone, a sulfonated polysulfone, a sulfonated polyethersulfone, a polybenzimidazole, a polyimide, a polyphenylene, a poly(4-phenoxybenzoyl-1,4-phenylene), a polybenzimidazole, a polyvinyl alcohol, a polyacrylamide, a polyethylenimine, or a combination thereof.

In various example electrochemical capacitor devices, the fluid electrolyte may include one of: a polyoxyalkylene, a polyoxyalkylene alcohol, an alkyl ether, a cycloalkyl ether, an alkylene carbonate, a cycloalkylene carbonate, an alkanone, a cycloalkanone, a lactone, an ionic liquid, or a combination thereof. In some examples, the fluid electrolyte may include an anion of fluoride, chloride, bromide, iodide, carboxylate, trifluoromethanesulfonate, bistrifluoromethanesulfonimidate, fluorosulfate, hexafluorophosphate, perchlorate, tetrafluoroborate, p-toluenesulfonate, nitrate, or a combination thereof. In other examples, each of the first and second electrode substrates may include one or more of aluminum, copper, gold, silver, nickel, platinum, or palladium.

In some example electrochemical capacitor devices, the first and second composite electrodes may each be independently represented by structural formula 220 depicted in FIG. 2B. In some examples represented by structural formula 220, E may represent the inner surface of the first or second electrode. In other examples, $R^1$ may be H, alkyl, hydroxy, alkoxy, or aryl. In further examples, X may be a branched or unbranched $C_2$-$C_{20}$ alkylene, a branched or unbranched $C_2$-$C_{20}$ alkylene ester, a branched or unbranched $C_2$-$C_{20}$ perfluoroalkylene, or a branched or unbranched $C_2$-$C_{20}$ perfluoroalkylene ester. In some other examples, Q and Q' may each be a monomer repeat unit of polypyrrole, polythiophene, poly(3,4-ethylenedioxy)thiophene, poly-para-phenylene, poly-para-phenylene vinylene, poly-para-phenylene sulfide, polyaniline, polycarbazole, or polyindole. In various examples, P and P' may each be a monomer repeat unit of polyethylene oxide, a polytetrafluoroethylene:perfluorosulfonic acid copolymer, a sulfonated polystyrene, a sulfonated poly(tetrafluoroethylene-hexafluoropropylene), a poly(vinylidene fluoride), a sulfonated polyetheretherketone, a sulfonated polysulfone, a sulfonated polyethersulfone, a polyvinyl alcohol, or a polyacrylamide.

In other examples represented by structural formula 220, a, b, c, d, e, f and g may have nonnegative integer values. In some examples, integer a may have a value that ranges from 0 to 500 and integer b may have a value that ranges from 2 to 1000 such that a+b may have a value that ranges from 2 to 1000 and b/(a+b) may have a value that is at least about 0.5. In other examples, when integer a may have a value that is greater than zero, Q and Q' may be arranged in a copolymer sequence that is alternating, periodic, statistical, random, or block. In other examples, integer d may have a value that ranges from 0 to 500 and integer e may have a value that ranges from 2 to 1000 such that d+e may have a value that ranges from 2 to 1000 and d/(d+e) may have a value that is at least about 0.5. In further examples, integers c, f and g may have values selected such that b*c, e*f, and g may have the same value. In some examples, when integer d may have a value that is greater than zero, P and P' may be in a copolymer sequence that is alternating, periodic, statistical, random, or block. In various examples, integer a may have a value that ranges from 0 to 100 and integer b may have a value that ranges from 2 to 1000, such that a+b may have a value that ranges from 2 to 1000 and b/(a+b) may have a value that is at least about 0.9. In some examples, P and P' may each be a monomer repeat unit of polyethylene oxide.

In further example electrochemical capacitor devices, the first and second composite electrodes may each be represented at least in part by structural formula 450, depicted in FIG. 4D. In various examples represented by structural formula 450, E may represent the inner surface of the first or second electrode, and $R^1$ may be H, alkyl, hydroxy, alkoxy, or aryl.

Various example methods of making electrochemical capacitor devices may include providing a first composite electrode, a first electrode substrate, a second composite electrode, a second electrode substrate, and an electrolyte membrane. The first composite electrode may have a first polymeric electrochemical layer that is arranged in contact with the first electrode substrate. The second composite electrode may have a second polymeric electrochemical layer that is arranged in contact with the second electrode substrate. Various example methods of making electrochemical capacitor devices may include contacting a first surface of the electrolyte membrane to the first polymeric electrochemical layer and contacting a second surface of the electrolyte membrane to the second polymeric electrochemical layer such that the electrolyte membrane is disposed between the first and second composite electrodes. In other example methods of making electrochemical capacitor devices, each of the first and second polymeric electrochemical layers may independently include a plurality of conductive polymer molecules electrically coupled to the corresponding one of the first electrode substrate or the second electrode substrate. In some example methods of making electrochemical capacitor devices, each of the first and second polymeric electrochemical layers may independently include one or more electrolyte polymer molecules disposed among the conductive polymer molecules. In further example methods of making electrochemical capacitor devices, each of the first and second polymeric electrochemical layers may independently include one or more unconjugated cross-links corresponding to each of the conductive polymer molecules. Each of the conductive polymer molecules may be covalently bonded to at least one of the one or more electrolyte polymer molecules by at least one of the one or more unconjugated cross-links. Various example methods of making electrochemical capacitor devices may include contacting the electrolyte membrane, the first polymeric electrochemical layer, and the second polymeric electrochemical layer with a fluid electrolyte.

In some example methods of making electrochemical capacitor devices, providing the first composite electrode and the second composite electrode may include electrochemically polymerizing one or more conductive polymer monomers at the first electrode substrate or the second electrode substrate to form a plurality of precursor conductive polymer molecules electrically coupled to the corresponding one of the first electrode substrate or the second electrode substrate. Some example methods may also include providing one or more precursor electrolyte polymer molecules and providing a cross-link precursor. Further example methods may include reacting the cross-link precursor, the one or more precursor electrolyte polymer molecules, and the plurality of precursor conductive polymer molecules to covalently bond each of the conductive polymer molecules to at least one of the one or more electrolyte polymer molecules by at least one of the one or more unconjugated cross-links.

In other example methods of making electrochemical capacitor devices, the one or more conductive polymer monomers may be represented by Q-$RG^1$. In some example methods, Q may be aryl, heteroaryl, aryl vinylene, heteroaryl vinylene, alkylene, aryl sulfide, or aryl amine In other example methods, $RG^1$ may be a terminal alkyne, an alkynyl halide, F, Cl, Br, I, mesylate, triflate, nonaflate, nosylate, brosylate, tosylate, borane, boronic acid, a boronic acid ester, boronic acid, a boronic acid ester, potassium trifluoroborane, a stannane, an organosilane, a fluorosilane, an alkoxysilane, a hydroxysilane, a ketone, an aldehyde, a carboxylate, —OH, magnesium halide, zinc halide, a thioester, a primary or secondary amine, a hydroxylamine, or a protected derivative thereof.

In further example methods of making electrochemical capacitor devices, the one or more precursor electrolyte polymer molecules may each be represented by P'—$RG^{1'}$. In some example methods, P' may be a monomer of poly(oxy)alkylene, polytetrafluoroethylene: perfluorosulfonic acid copolymer, sulfonated arylene, sulfonated polystyrene, sulfonated poly(tetrafluoroethylene-hexafluoropropylene), poly(vinylidene fluoride), sulfonated poly(aryl)siloxane, sulfonated poly(alkyl)siloxane, sulfonated polyetheretherketone, sulfonated polysulfone, sulfonated polyethersulfone, polybenzimidazole, polyimide, polyphenylene, poly(4-phenoxybenzoyl-1,4-phenylene), polybenzimidazole, polyvinyl alcohol, polyacrylamide, or polyethylenimine, or a copolymer thereof. In other example methods, $RG^{1'}$ may be an alkene, an ethylene oxide, a glycidyl, a terminal alkyne, an alkynyl halide, F, Cl, Br, I, mesylate, triflate, nonaflate, nosylate, brosylate, tosylate, borane, boronic acid, a boronic acid ester, boronic acid, a boronic acid ester, potassium trifluoroborane, a stannane, an organosilane, a fluorosilane, an alkoxysilane, a hydroxysilane, a ketone, an aldehyde, a carboxylate, —OH, magnesium halide, zinc halide, a thioester, a primary or secondary amine, a hydroxylamine, or a protected derivative thereof.

In various example methods of making electrochemical capacitor devices, the cross-link precursor may be represented by $RG^2$-X-$RG^3$. In some example methods, X may be an unconjugated cross-link comprising a branched or unbranched $C_2$-$C_{20}$ alkylene, a branched or unbranched $C_2$-$C_{20}$ alkylene ester, a branched or unbranched $C_2$-$C_{20}$ perfluoroalkylene, or a branched or unbranched $C_2$-$C_{20}$ perfluoroalkylene ester. In other example methods, $RG^2$ may be a terminal alkyne, an alkynyl halide, F, Cl, Br, I, mesylate, triflate, nonaflate, nosylate, brosylate, tosylate, borane, boronic acid, a boronic acid ester, boronic acid, a boronic acid ester, potassium trifluoroborane, a stannane, an organosilane, a fluorosilane, an alkoxysilane, a hydroxysilane, a ketone, an aldehyde, a carboxylate, —OH, magnesium halide, zinc halide, a thioester, a primary or secondary amine, a hydroxylamine, or a protected derivative thereof. In further example methods, $RG^3$ may be an alkene, an ethylene oxide, a glycidyl, a terminal alkyne, an alkynyl halide, F, Cl, Br, I, mesylate, triflate, nonaflate, nosylate, brosylate, tosylate, borane, boronic acid, a boronic acid ester, boronic acid, a boronic acid ester, potassium trifluoroborane, a stannane, an organosilane, a fluorosilane, an alkoxysilane, a hydroxysilane, a ketone, an aldehyde, a carboxylate, —OH, magnesium halide, zinc halide, a thioester, a primary or secondary amine, a hydroxylamine, or a protected derivative thereof.

In some example methods of making electrochemical capacitor devices, providing the first composite electrode and the second composite electrode may include providing one or more conductive polymer monomers each substituted with a cross-link precursor. Some example methods may include electrochemically polymerizing the one or more conductive polymer monomers effective to form a plurality of precursor conductive polymer molecules that are electrically coupled to the corresponding one of the first electrode substrate or the second electrode substrate, and substituted with the cross-link precursor. Other example methods may include providing one or more monomer precursors of the one or more electrolyte polymer molecules. Further example methods may include polymerizing the monomer precursors of the one or more electrolyte polymer molecules in the presence of the precursor conductive polymer molecules substituted with the cross-link precursor such that each of the conductive polymer molecules is covalently bonded to at least one of the one or more electrolyte polymer molecules by at least one of the one or more unconjugated cross-links.

In other example methods of making electrochemical capacitor devices, each of the one or more conductive polymer monomers substituted with the cross-link precursor may be represented by Q-X-$RG^3$. In some example methods, Q may be aryl, heteroaryl, aryl vinylene, heteroaryl vinylene, alkylene, aryl sulfide, or aryl amine In other example methods, X may be an unconjugated cross-link comprising a branched or unbranched $C_2$-$C_{20}$ alkylene, a branched or unbranched $C_2$-$C_{20}$ alkylene ester, a branched or unbranched $C_2$-$C_{20}$ perfluoroalkylene, or a branched or unbranched $C_2$-$C_{20}$ perfluoroalkylene ester. In further example methods. $RG^3$ may be an alkene, an ethylene oxide, a glycidyl, a terminal alkyne, an alkynyl halide, F, Cl, Br, I, mesylate, triflate, nonaflate, nosylate, brosylate, tosylate, borane, boronic acid, a boronic acid ester, boronic acid, a boronic acid ester, potassium trifluoroborane, a stannane, an organosilane, a fluorosilane, an alkoxysilane, a hydroxysilane, a ketone, an aldehyde, a carboxylate, —OH, magnesium halide, zinc halide, a thioester, a primary or secondary amine, a hydroxylamine, or a protected derivative thereof.

In further example methods of making electrochemical capacitor devices, each of the plurality of precursor conductive polymer molecules that are electrically coupled to the corresponding one of the first electrode substrate or the second electrode substrate may be represented by structural formula 405, depicted in FIG. 4B. In some examples of structural formula 405, E may represent the inner surface of the first electrode substrate or the second electrode substrate. In other examples of structural formula 405, each R may be independently H or alkyl. In further examples of structural formula 405, each X may be an unconjugated cross-link comprising a branched or unbranched $C_2$-$C_{20}$ alkylene, a branched or unbranched $C_2$-$C_{20}$ alkylene ester, a branched or unbranched $C_2$-$C_{20}$ perfluoroalkylene, or a branched or unbranched C2-C20 perfluoroalkylene ester. In various examples of structural formula 405, each Q may be pyrrolyl, thienyl, 3,4-ethyenedioxy thienyl, para-phenylene, para-phenylene vinylene, para-phenylene sulfide, aniline, carbazolyl, or indolyl. In some examples of structural formula 405, $[Q]_a$-$[Q-X-RG^3]_b$ may represent a copolymer of [Q] and [Q-X-$RG^3$] having a structural sequence that is alternating, periodic, statistical, random, or block, wherein a is an integer that ranges in value from 0 to 500 and b is an integer that ranges in value from 2 to 1000, such that a+b has a value that ranges from 2 to 1000 and b/(a+b) has a value that is at least about 0.5. In other examples of structural formula 405, $RG^3$ may be an alkene, an ethylene oxide, a glycidyl, a terminal alkyne, an alkynyl halide, F, Cl, Br, I, mesylate, triflate, nonaflate, nosylate, brosylate, tosylate, borane, boronic acid, a boronic acid ester, boronic acid, a boronic acid ester, potassium trifluoroborane, a stannane, an organosilane, a fluorosilane, an alkoxysilane, a hydroxysilane, a ketone, an aldehyde, a carboxylate, —OH, magnesium halide, zinc halide, a thioester, a primary or secondary amine, a hydroxylamine, or a protected derivative thereof.

In various example methods of making electrochemical capacitor devices, each of the plurality of conductive polymer molecules may include one of a polyacetylene, a polyarylene, a polyheteroarylene, a polyvinylarylene, a polyvinylheteroarylene, a polyarylene vinylene, a polyheteroarylene vinylene, a polyarylene ethynylene, a polyheteroarylene ethynylene, or a copolymer thereof. In some examples, each of the plurality of conductive polymer molecules includes between 2 monomer repeat units and 2000 monomer repeat units. In other examples, at least about 50% of the monomer repeat units included in the plurality of conductive polymers may each be covalently bonded by one of the one or more unconjugated cross-links to at least one of the one or more electrolyte polymer molecules. In further examples, the plurality of conductive polymer molecules, the one or more electrolyte polymer molecules, and the one or more unconjugated cross-links may together form an interpenetrating polymer network in each of the first and second polymeric electrochemical layers. In various examples, the plurality of conductive polymer molecules, the one or more electrolyte polymer molecules, and the one or more unconjugated cross-links may together form a single polymeric phase in each of the first and second polymeric electrochemical layers. In some examples, at least a portion of the plurality of conductive polymer molecules may be covalently bonded to the corresponding one of the first electrode substrate or the second electrode substrate.

In some example methods of making electrochemical capacitor devices, the electrolyte membrane may include one of a poly(oxy)alkylene, a polytetrafluoroethylene:perfluorosulfonic acid copolymer, a sulfonated arylene, a sulfonated polystyrene, a sulfonated poly(tetrafluoroethylene-hexafluoropropylene), a poly(vinylidene fluoride), a sulfonated poly(aryl)siloxane, a sulfonated poly(alkyl)siloxane, a sulfonated polyetheretherketone, a sulfonated polysulfone, a sulfonated polyethersulfone, a polybenzimidazole, a polyimide, a polyphenylene, a poly(4-phenoxybenzoyl-1,4-phenylene), a polybenzimidazole, a polyvinyl alcohol, a polyacrylamide, a polyethylenimine, or a combination thereof. In some examples, the fluid electrolyte may include one of a polyoxyalkylene, a polyoxyalkylene alcohol, an alkyl ether, a cycloalkyl ether, an alkylene carbonate, a cycloalkylene carbonate, an alkanone, a cycloalkanone, a lactone, an ionic liquid, or a combination thereof. In other examples, the fluid electrolyte may include an anion that is one of fluoride, chloride, bromide, iodide, carboxylate, trifluoromethanesulfonate, bistrifluoromethanesulfonimidate, fluorosulfate, hexafluorophosphate, perchlorate, tetrafluoroborate, p-toluenesulfonate, nitrate, or a combination thereof. In further examples, each of the first and second electrode substrates comprise one or more of aluminum, copper, gold, silver, nickel, platinum, or palladium.

In other example methods of making electrochemical capacitor devices, the first and second polymeric electrochemical layers may each be independently represented by structural formula 220 depicted in FIG. 2B. In some examples represented by structural formula 220, E may represent the inner surface of the first or second electrode. In other examples, $R^1$ may be H, alkyl, hydroxy, alkoxy, or aryl. In further examples, X may be a branched or unbranched $C_2$-$C_{20}$ alkylene, a branched or unbranched $C_2$-$C_{20}$ alkylene ester, a branched or unbranched $C_2$-$C_{20}$ perfluoroalkylene, or a branched or unbranched $C_2$-$C_{20}$ perfluoroalkylene ester. In some other examples, Q and Q' may each be a monomer repeat unit of polypyrrole, polythiophene, poly(3,4-ethylenedioxy)thiophene, poly-para-phenylene, poly-para-phenylene vinylene, poly-para-phenylene sulfide, polyaniline, polycarbazole, or polyindole. In various examples, P and P' may each be a monomer repeat unit of polyethylene oxide, a polytetrafluoroethylene:perfluorosulfonic acid copolymer, a sulfonated polystyrene, a sulfonated poly(tetrafluoroethylene-hexafluoropropylene), a poly(vinylidene fluoride), a sulfonated polyetheretherketone, a sulfonated polysulfone, a sulfonated polyethersulfone, a polyvinyl alcohol, or a polyacrylamide. In various examples represented by structural formula 220, a, b, c, d, e, f and g may have nonnegative integer values. In some examples, integer a may have a value that ranges from 0 to 500 and integer b may have a value that ranges from 2 to 1000 such that a+b may have a value that ranges from 2 to 1000 and b/(a+b) may have a value that is at least about 0.5. In other examples, when integer a may have a value that is greater than zero, Q and Q' may be arranged in a copolymer sequence that is alternating, periodic, statistical, random, or block. In other examples, integer d may have a value that ranges from 0 to 500 and integer e may have a value that ranges from 2 to 1000 such that d+e may have a value that ranges from 2 to 1000 and d/(d+e) may have a value that is at least about 0.5. In further examples, integers c, f and g may have values selected such that b*c, e*f, and g may have the same value. In some examples, when integer d may have a value that is greater than zero, P and P' may be in a copolymer sequence that is alternating, periodic, statistical, random, or block. In various examples, integer a may have a value that ranges from 0 to 100 and integer b may have a value that ranges from 2 to 1000, such that a+b may have a value that ranges from 2 to 1000 and b/(a+b) may have a value that is at least about 0.9. In some examples, P and P' may each be a monomer repeat unit of polyethylene oxide.

In further example methods of making electrochemical capacitor devices, the first and second composite electrodes may each be represented at least in part by structural formula 450, depicted in FIG. 4D. In various examples represented by structural formula 450, E may represent the inner surface of the first or second electrode, and $R^1$ may be H, alkyl, hydroxy, alkoxy, or aryl.

Various example computer-readable storage media having instructions stored thereon for making electrochemical capacitors are described. In some examples, the instructions may control a reagent source to contact one or more conductive polymer monomers to an electrode substrate. In other examples, the instructions may control an electrochemical apparatus to electrochemically polymerize the one or more conductive polymer monomers at the electrode substrate sufficient to form a plurality of precursor conductive polymer molecules. Each of the plurality of precursor conductive polymer molecules may be electrically coupled to the electrode substrate. In further examples, the instructions may control a reagent source to provide a cross-link precursor with the one or more conductive polymer monomers or to the plurality of precursor conductive polymer molecules. In some examples, the instructions may control a polymer applicator to contact one or more precursor electrolyte polymer molecules to the plurality of precursor conductive polymer molecules and the cross-link precursor sufficient to form a cross-linked polymer at the electrode substrate. The cross-linked polymer may include a plurality of conductive polymer molecules that may be electrically coupled to the electrode substrate. The cross-linked polymer may also include one or more electrolyte polymer molecules that may be disposed among the conductive polymer molecules. The cross-linked polymer may also include one or more unconjugated cross-links corresponding to each of the conductive polymer molecules, wherein each of the conductive polymer molecules may be covalently bonded to at least one of the one or more electrolyte polymer molecules by at least one of the one or more unconjugated cross-links. In some examples, the instructions may control a sample manipulator to form the cross-linked polymer together with the electrode substrate into a first composite electrode that may include a first polymeric electrochemical layer and a second composite electrode that may include a second polymeric electrochemical layer. In further examples, the instructions may control the sample manipulator to contact a first surface of an electrolyte membrane to the first polymeric electrochemical layer. In various examples, the instructions may control the sample manipulator to contact a second surface of the electrolyte membrane to the second polymeric electrochemical layer such that the electrolyte membrane is disposed between the first composite electrode and the second composite electrode. In some examples, the instructions may control an electrolyte applicator to contact the electrolyte membrane, the first polymeric electrochemical layer, and the second polymeric electrochemical layer with a fluid electrolyte to form the electrochemical capacitor.

In other examples of the computer-readable storage media having instructions stored thereon for making electrochemical capacitors, the one or more conductive polymer monomers may be substituted with the cross-link precursor. In some examples, instructions may also be included to control the reagent source to contact the one or more conductive polymer monomers substituted with the cross-link precursor to the electrode substrate. In other examples, instructions may also be included to control the electrochemical apparatus to electrochemically polymerize the one or more conductive polymer monomers substituted with the cross-link precursor such that the plurality of precursor conductive polymer molecules are substituted with the cross-link precursor. In further examples, instructions may also be included to control the polymer applicator to contact the one or more precursor electrolyte polymer molecules to the plurality of precursor conductive polymer molecules substituted with the cross-link precursor such that the cross-linked polymer is formed at the electrode substrate.

In further examples of the computer-readable storage media instructions may also be included to control the reagent source to contact a cross-link catalyst to the cross-link precursor. In some examples, instructions may also be included to control the polymer applicator to contact the one or more precursor electrolyte polymer molecules to the plurality of precursor conductive polymer molecules, the cross-link precursor, and the cross-link catalyst sufficient to catalytically form the cross-linked polymer at the electrode substrate.

Various example systems for preparing example electrochemical capacitor devices are described. Some example systems may include a mixing chamber configured to mix solids and liquids. In various example systems, the mixing chamber may be coupled to a reagent source, an electrochemical apparatus, a sample manipulator, and an electrolyte applicator. In further example systems, a controller may be coupled to the mixing chamber, the reagent source, the electrochemical apparatus, the sample manipulator, and the electrolyte applicator. In various example systems, the controller may be configured via executable instructions. In some example systems, the executable instructions may control the reagent source to contact one or more conductive polymer monomers to an electrode substrate in the mixing chamber. In other example systems, the executable instructions may control the electrochemical apparatus to electrochemically polymerize the one or more conductive polymer monomers at the electrode substrate sufficient to form a plurality of precursor conductive polymer molecules. Each of the plurality of precursor conductive polymer molecules may be electrically coupled to the electrode substrate. In further example systems, the executable instructions may control the reagent source to provide a cross-link precursor with the one or more conductive polymer monomers or to the plurality of precursor conductive polymer molecules. In various example systems, the executable instructions may control the polymer applicator to contact one or more precursor electrolyte polymer molecules to the plurality of precursor conductive polymer molecules and the cross-link precursor sufficient to form a cross-linked polymer at the electrode substrate. The cross-linked polymer may include: a plurality of conductive polymer molecules electrically coupled to the electrode substrate; one or more electrolyte polymer molecules disposed among the conductive polymer molecules; and one or more unconjugated cross-links corresponding to each of the conductive polymer molecules. Each of the conductive polymer molecules may be covalently bonded to at least one of the one or more electrolyte polymer molecules by at least one of the one or more unconjugated cross-links. In some example systems, the executable instructions may control the sample manipulator to form the cross-linked polymer together with the electrode substrate into a first composite electrode that may include a first polymeric electrochemical layer and a second composite electrode that may include a second polymeric electrochemical layer. In further example systems, the executable instructions may control the sample manipulator to contact a first surface of an electrolyte membrane to the first polymeric electrochemical layer. In various example systems, the executable instructions may control the sample manipulator to contact a second surface of the electrolyte membrane to the second polymeric electrochemical layer such that the electrolyte membrane is disposed between the first composite electrode and the second composite electrode. In various example systems, the executable instructions may control the electrolyte applicator to contact the electrolyte membrane, the first electrochemical layer, and the second electrochemical layer with a fluid electrolyte to form the electrochemical capacitor.

In some example systems for preparing example electrochemical capacitor devices, the one or more conductive polymer monomers may be substituted with the cross-link precursor and the controller may be further configured via the executable instructions to control the reagent source to contact the one or more conductive polymer monomers substituted with the cross-link precursor to the electrode substrate. In some examples, the controller may be further configured via the executable instructions to control the electrochemical apparatus to electrochemically polymerize the one or more conductive polymer monomers substituted with the cross-link precursor such that the plurality of precursor conductive polymer molecules are substituted with the cross-link precursor. In other examples, the controller may be further configured via the executable instructions to control the polymer applicator to contact the one or more precursor electrolyte polymer molecules to the plurality of precursor conductive polymer molecules substituted with the cross-link precursor such that the cross-linked polymer is formed at the electrode substrate.

In other example systems for preparing example electrochemical capacitor devices, the controller may be further configured via the executable instructions to control the reagent source to contact a cross-link catalyst to the cross-link precursor. In some examples, the controller may be further configured via the executable instructions to control the polymer applicator to contact the one or more precursor electrolyte polymer molecules to the conductive polymer, the cross-link precursor, and the cross-link catalyst sufficient to catalytically form the cross-linked polymer at the electrode substrate.

The terms "a" and "an" as used herein mean "one or more" unless the singular is expressly specified. For example, reference to "a base" may include a mixture of two or more bases, as well as a single base.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to, plus or minus 10% of the particular term.

As used herein, the terms "optional" and "optionally" mean that the subsequently described circumstance may or may not occur, so that the description includes instances where the circumstance occurs and instances where it does not.

As used herein, "substituted" refers to an organic group as defined below (e.g., an alkyl group) in which one or more bonds to a hydrogen atom contained therein may be replaced by a bond to non-hydrogen or non-carbon atoms. Substituted groups also include groups in which one or more bonds to a carbon(s) or hydrogen(s) atom may be replaced by one or more bonds, including double or triple bonds, to a heteroatom. A substituted group may be substituted with one or more substituents, unless otherwise specified. In some embodiments, a substituted group may be substituted with 1, 2, 3, 4, 5, or 6 substituents. Examples of substituent groups include: halogens (i.e., F, Cl, Br, and I); hydroxyls; alkoxy, alkenoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; or nitriles (i.e., CN). A "per"-substituted compound or group is a compound or group having all or substantially all substitutable positions substituted with the indicated substituent. For example, 1,6-diiodo perfluoro hexane indicates a compound of formula $C_6F_{12}I_2$, where all the substitutable hydrogens have been replaced with fluorine atoms.

Substituted ring groups such as substituted cycloalkyl, aryl, heterocyclyl and heteroaryl groups also include rings and ring systems in which a bond to a hydrogen atom may be replaced with a bond to a carbon atom. Substituted cycloalkyl, aryl, heterocyclyl and heteroaryl groups may also be substituted with substituted or unsubstituted alkyl, alkenyl, and alkynyl groups as defined below.

Alkyl groups include straight chain and branched chain alkyl groups having from 1 to 12 carbon atoms, and typically from 1 to 10 carbons or, in some examples, from 1 to 8, 1 to 6, or 1 to 4 carbon atoms. Examples of straight chain alkyl groups include groups such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. Representative substituted alkyl groups may be substituted one or more times with substituents such as those listed above and include, without limitation, haloalkyl (e.g., trifluoromethyl), hydroxyalkyl, thioalkyl, aminoalkyl, alkylaminoalkyl, dialkylaminoalkyl, alkoxyalkyl, or carboxyalkyl.

Cycloalkyl groups include mono-, bi- or tricyclic alkyl groups having from 3 to 12 carbon atoms in the ring(s), or, in some embodiments, 3 to 10, 3 to 8, or 3 to 4, 5, or 6 carbon atoms. Exemplary monocyclic cycloalkyl groups include, but are not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments, the number of ring carbon atoms ranges from 3 to 5, 3 to 6, or 3 to 7. Bi- and tricyclic ring systems include both bridged cycloalkyl groups and fused rings, such as, but not limited to, bicyclo[2.1.1]hexane, adamantyl, or decalinyl. Substituted cycloalkyl groups may be substituted one or more times with non-hydrogen and non-carbon groups as defined above. However, substituted cycloalkyl groups also include rings that may be substituted with straight or branched chain alkyl groups as defined above. Representative substituted cycloalkyl groups may be mono-substituted or substituted more than once, such as, but not limited to, 2,2-, 2,3-, 2,4- 2,5- or 2,6-disubstituted cyclohexyl groups, which may be substituted with substituents such as those listed above.

Aryl groups may be cyclic aromatic hydrocarbons that do not contain heteroatoms. Aryl groups herein include monocyclic, bicyclic and tricyclic ring systems. Aryl groups include, but are not limited to, phenyl, azulenyl, heptalenyl, biphenyl, fluorenyl, phenanthrenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. In some embodiments, the aryl groups may be phenyl or naphthyl. Although the phrase "aryl groups" may include groups containing fused rings, such as fused aromatic-aliphatic ring systems (e.g., indanyl or tetrahydronaphthyl), "aryl groups" does not include aryl groups that have other groups, such as alkyl or halo groups, bonded to one of the ring members. Rather, groups such as tolyl may be referred to as substituted aryl groups. Representative substituted aryl groups may be mono-substituted or substituted more than once. For example, monosubstituted aryl groups include, but are not limited to, 2-, 3-, 4-, 5-, or 6-substituted phenyl or naphthyl groups, which may be substituted with substituents such as those listed above.

Aralkyl groups may be alkyl groups as defined above in which a hydrogen or carbon bond of an alkyl group may be replaced with a bond to an aryl group as defined above. In some embodiments, aralkyl groups contain 7 to 16 carbon atoms, 7 to 14 carbon atoms, or 7 to 10 carbon atoms. Substituted aralkyl groups may be substituted at the alkyl, the aryl or both the alkyl and aryl portions of the group. Representative aralkyl groups include but are not limited to benzyl and phenethyl groups and fused (cycloalkylaryl)alkyl groups such as 4-indanylethyl. Representative substituted aralkyl groups may be substituted one or more times with substituents such as those listed above.

Heterocyclyl groups include aromatic (also referred to as heteroaryl) and non-aromatic ring compounds containing 3 or more ring members of which one or more may be a heteroatom such as, but not limited to, N, O, and S. In some embodiments, the heterocyclyl group contains 1, 2, 3 or 4 heteroatoms. In some embodiments, heterocyclyl groups include mono-, bi- and tricyclic rings having 3 to 16 ring members, whereas other such groups have 3 to 6, 3 to 10, 3 to 12, or 3 to 14 ring members. Heterocyclyl groups encompass aromatic, partially unsaturated and saturated ring systems, such as, for example, imidazolyl, imidazolinyl and imidazolidinyl groups. The phrase "heterocyclyl group" includes fused ring species including those comprising fused aromatic and non-aromatic groups, such as, for example, benzotriazolyl, 2,3-dihydrobenzo[1,4]dioxinyl, and benzo[1,3]dioxolyl. The phrase also includes bridged polycyclic ring systems containing a heteroatom such as, but not limited to, quinuclidyl. However, the phrase does not include heterocyclyl groups that have other groups, such as alkyl, oxo or halo groups, bonded to one of the ring members. Rather, these may be referred to as "substituted heterocyclyl groups." Heterocyclyl groups include, but are not limited to, aziridinyl, azetidinyl, pyrrolidinyl, imidazolidinyl, pyrazolidinyl, thiazolidinyl, tetrahydrothiophenyl, tetrahydrofuranyl, dioxolyl, furanyl, thiophenyl, pyrrolyl, pyrrolinyl, imidazolyl, imidazolinyl, pyrazolyl, pyrazolinyl, triazolyl, tetrazolyl, oxazolyl, isoxazolyl, thiazolyl, thiazolinyl, isothiazolyl, thiadiazolyl, oxadiazolyl, piperidyl, piperazinyl, morpholinyl, thiomorpholinyl, tetrahydropyranyl, tetrahydrothiopyranyl, oxathiane, dioxyl, dithianyl, pyranyl, pyridyl, pyrimidinyl, pyridazinyl, pyrazinyl, triazinyl, dihydropyridyl, dihydrodithiinyl, dihydrodithionyl, homopiperazinyl, quinuclidyl, indolyl, indolinyl, isoindolyl,azaindolyl (pyrrolopyridyl), indazolyl, indolizinyl, benzotriazolyl, benzimidazolyl, benzofuranyl, benzothiophenyl, benzthiazolyl, benzoxadiazolyl, benzoxazinyl, benzodithiinyl, benzoxathiinyl, benzothiazinyl, benzoxazolyl, benzothiazolyl, benzothiadiazolyl, benzo[1,3]dioxolyl, pyrazolopyridyl, imidazopyridyl (azabenzimidazolyl), triazolopyridyl, isoxazolopyridyl, purinyl, xanthinyl, adeninyl, guaninyl, quinolinyl, isoquinolinyl, quinolizinyl, quinoxalinyl, quinazolinyl, cinnolinyl, phthalazinyl, naphthyridinyl, pteridinyl, thianaphthyl, dihydrobenzothiazinyl, dihydrobenzofuranyl, dihydroindolyl, dihydrobenzodioxinyl, tetrahydroindolyl, tetrahydroindazolyl, tetrahydrobenzimidazolyl, tetrahydrobenzotriazolyl, tetrahydropyrrolopyridyl, tetrahydropyrazolopyridyl, tetrahydroimidazopyridyl, tetrahydrotriazolopyridyl, and tetrahydroquinolinyl groups. Representative substituted heterocyclyl groups may be mono-substituted or substituted more than once, such as, but not limited to, pyridyl or morpholinyl groups, which may be 2 , 3-, 4-, 5-, or 6-substituted, or disubstituted with various substituents such as those listed above.

Heteroaryl groups may be aromatic ring compounds containing 5 or more ring members, of which one or more may be a heteroatom such as, but not limited to, N, O, and S. Heteroaryl groups include, but are not limited to, groups such as pyrrolyl, pyrazolyl, triazolyl, tetrazolyl, oxazolyl, isoxazolyl, thiazolyl, pyridinyl, pyridazinyl, pyrimidinyl, pyrazinyl, thiophenyl, benzothiophenyl, furanyl, benzofuranyl, indolyl, azaindolyl (pyrrolopyridinyl), indazolyl, benzimidazolyl, imidazopyridinyl (azabenzimidazolyl), pyrazolopyridinyl, triazolopyridinyl, benzotriazolyl, benzoxazolyl, benzothiazolyl, benzothiadiazolyl, imidazopyridinyl, isoxazolopyridinyl, thianaphthyl, purinyl, xanthinyl, adeninyl, guaninyl, quinolinyl, isoquinolinyl, tetrahydroquinolinyl, quinoxalinyl, and quinazolinyl groups. Heteroaryl groups include fused ring compounds in which all rings may be aromatic such as indolyl groups and include fused ring compounds in which only one of the rings may be aromatic, such as 2,3-dihydro indolyl groups. Although the phrase "heteroaryl groups" includes fused ring compounds, the phrase does not include heteroaryl groups that have other groups bonded to one of the ring members, such as alkyl groups. Rather, heteroaryl groups with such substitution may be referred to as "substituted heteroaryl groups." Representative substituted heteroaryl groups may be substituted one or more times with various substituents such as those listed above.

Heteroaralkyl groups may be alkyl groups as defined above in which a hydrogen or carbon bond of an alkyl group may be replaced with a bond to a heteroaryl group as defined above. Substituted heteroaralkyl groups may be substituted at the alkyl, the heteroaryl or both the alkyl and heteroaryl portions of the group. Representative substituted heteroaralkyl groups may be substituted one or more times with substituents such as those listed above.

Groups described herein having two or more points of attachment (i.e., divalent, trivalent, or polyvalent) within the compound of the technology may be designated by use of the suffix, "ene." For example, divalent alkyl groups may be alkylene groups, divalent aryl groups may be arylene groups, divalent heteroaryl groups may be heteroarylene groups, and so forth. In particular, certain polymers may be described by use of the suffix "ene" in conjunction with a term describing the polymer repeat unit. For example, compound 310 in FIG. 3A may be referred to as "poly-para-phenylene" since the repeat unit phenyl may be linked at two points of attachment, located para with respect to each other on the ring. In another example, polymers generally may be referred to in the same manner, for example, a polyarylene is a polymer linked at two points of attachment through an aryl group (e.g., poly-para-phenylene). Other examples include polyheteroarylenes (e.g., compounds 302-306 in FIG. 3A), polyarylene vinylenes (e.g., compound 312 in FIG. 3A), polyheteroarylene vinylenes (e.g., compound 308 in FIG. 3A), and so on. Note that some common names in the art may not follow the above-described pattern. For example, compound 302 in FIG. 3A is a polyheteroarylene, but may be commonly known as "polypyrrole" without the "ene" suffix.

Alkoxy groups may be hydroxyl groups (—OH) in which the bond to the hydrogen atom may be replaced by a bond to a carbon atom of a substituted or unsubstituted alkyl group as defined above. Examples of linear alkoxy groups include, but are not limited to, methoxy, ethoxy, propoxy, butoxy, pentoxy, or hexoxy. Examples of branched alkoxy groups include, but are not limited to, isopropoxy, sec-butoxy, tert-butoxy, isopentoxy, or isohexoxy. Examples of cycloalkoxy groups include, but are not limited to, cyclopropyloxy, cyclobutyloxy, cyclopentyloxy, or cyclohexyloxy. Representative substituted alkoxy groups may be substituted one or more times with substituents such as those listed above.

The term "amine" (or "amino"), as used herein, refers to $NR_5R_6$ groups, wherein $R_5$ and $R_6$ may be independently hydrogen, or a substituted or unsubstituted alkyl, alkenyl, alkynyl, cycloalkyl, aryl, aralkyl, heterocyclylalkyl or heterocyclyl group as defined herein. In some embodiments, the amine may be alkylamino, dialkylamino, arylamino, or alkylarylamino. In other embodiments, the amine may be $NH_2$, methylamino, dimethylamino, ethylamino, diethylamino, propylamino, isopropylamino, phenylamino, or benzylamino The term "alkylamino" may be defined as $NR_7R_8$, wherein at least one of $R_7$ and $R_8$ may be alkyl and the other may be alkyl or hydrogen. The term "arylamino" may be defined as $NR_9R_{10}$, wherein at least one of $R_9$ and $R_{10}$ may be aryl and the other may be aryl or hydrogen.

The term "halogen" or "halo," as used herein, refers to bromine, chlorine, fluorine, or iodine. In some embodiments, the halogen may be fluorine. In other embodiments, the halogen may be chlorine or bromine.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

A typical manufacturing system may be implemented utilizing any suitable commercially available components, such as those typically found in data computing/communication and/or network computing/communication systems. The herein described subject matter sometimes illustrates different components contained within, or coupled together with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group. As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," include the number recited and refer to ranges which can be subsequently broken down into sub-ranges as discussed above. Finally, as will be understood by one skilled in the art, a range includes each individual member. For example, a group having 1-3 cells refers to groups having 1, 2, or 3 cells. Similarly, a group having 1-5 cells refers to groups having 1, 2, 3, 4, or 5 cells, and so forth. While various aspects and embodiments have been disclosed herein, other aspects and embodiments will be apparent to those skilled in the art.

The various aspects and embodiments disclosed herein are for purposes of illustration and are not intended to be limiting, with the true scope and spirit being indicated by the following claims.

What is claimed is:

1. An electrochemical capacitor, comprising:
   a first composite electrode having a first polymeric electrochemical layer in contact with a first electrode substrate;
   a second composite electrode having a second polymeric electrochemical layer in contact with a second electrode substrate;
   an electrolyte membrane disposed between the first and second composite electrodes, the electrolyte membrane having a first surface in contact with the first polymeric electrochemical layer and a second surface in contact with the second polymeric electrochemical layer, wherein each of the first and second polymeric electrochemical layers independently comprise:
      a plurality of conductive polymer molecules electrically coupled to the corresponding one of the first electrode substrate or the second electrode substrate;
      one or more electrolyte polymer molecules disposed among the conductive polymer molecules; and
      one or more unconjugated cross-links corresponding to each of the conductive polymer molecules, each of the conductive polymer molecules being covalently bonded to at least one of the one or more electrolyte polymer molecules by at least one of the one or more unconjugated cross-links; and
   a fluid electrolyte in contact with the electrolyte membrane, the first polymeric electrochemical layer, and the second polymeric electrochemical layer.

2. The electrochemical capacitor of claim 1, wherein the first polymeric electrochemical layer and the second polymeric electrochemical layer are of substantially similar composition.

3. The electrochemical capacitor of claim 1, wherein each of the plurality of conductive polymer molecules comprises one of: a polyacetylene, a polyarylene, a polyheteroarylene, a polyvinylarylene, a polyvinylheteroarylene, a polyarylene vinylene, a polyheteroarylene vinylene, a polyarylene ethynylene, a polyheteroarylene ethynylene, or a copolymer thereof.

4. The electrochemical capacitor of claim 1, wherein each of the plurality of conductive polymer molecules includes between 2 monomer repeat units and 2000 monomer repeat units.

5. The electrochemical capacitor of claim 4, wherein at least about 50% of the monomer repeat units included in the plurality of conductive polymers are each covalently bonded by one of the one or more unconjugated cross-links to at least one of the one or more electrolyte polymer molecules.

6. The electrochemical capacitor of claim 1, wherein the plurality of conductive polymer molecules, the one or more electrolyte polymer molecules, and the one or more unconjugated cross-links together form an interpenetrating polymer network in each of the first and second polymeric electrochemical layers.

7. The electrochemical capacitor of claim 1, wherein the plurality of conductive polymer molecules, the one or more electrolyte polymer molecules, and the one or more unconjugated cross-links together form a single polymeric phase in each of the first and second polymeric electrochemical layers.

8. The electrochemical capacitor of claim 1, wherein at least a portion of the plurality of conductive polymer molecules are covalently bonded to the corresponding first or second electrode.

9. The electrochemical capacitor of claim 1, wherein each unconjugated cross-link is a branched or unbranched $C_2$-$C_{20}$ alkylene, a branched or unbranched $C_2$-$C_{20}$ alkylene ester, a branched or unbranched $C_2$-$C_{20}$ perfluoroalkylene, or a branched or unbranched $C_2$-$C_{20}$ perfluoroalkylene ester.

10. The electrochemical capacitor of claim 1, wherein
the one or more polymer electrolyte molecules comprise one of: a poly(oxy)alkylene, a polytetrafluoroethylene-perfluorosulfonic acid copolymer, a sulfonated arylene, a sulfonated polystyrene, a sulfonated poly(tetrafluoroethylene-hexafluoropropylene), a poly(vinylidene fluoride), a sulfonated poly(aryl)siloxane, a sulfonated poly(alkyl)siloxane, a sulfonated polyetheretherketone, a sulfonated polysulfone, a sulfonated polyethersulfone, a polybenzimidazole, a polyimide, a polyphenylene, a poly(4-phenoxybenzoyl-1,4-phenylene), a polybenzimidazole, a polyvinyl alcohol, a polyacrylamide, a polyethylenimine, or a combination thereof;
the electrolyte membrane comprises one of: a poly(oxy)alkylene, a polytetrafluoroethylene:perfluorosulfonic acid copolymer, a sulfonated arylene, a sulfonated polystyrene, a sulfonated poly(tetrafluoroethylene-hexafluoropropylene), a poly(vinylidene fluoride), a sulfonated poly(aryl)siloxane, a sulfonated poly(alkyl)siloxane, a sulfonated polyetheretherketone, a sulfonated polysulfone, a sulfonated polyethersulfone, a polybenzimidazole, a polyimide, a polyphenylene, a poly(4-phenoxybenzoyl-1,4-phenylene), a polybenzimidazole, a polyvinyl alcohol, a polyacrylamide, a polyethylenimine, or a combination thereof;
the fluid electrolyte comprises one of: a polyoxyalkylene, a polyoxyalkylene alcohol, an alkyl ether, a cycloalkyl ether, an alkylene carbonate, a cycloalkylene carbonate, an alkanone, a cycloalkanone, a lactone, an ionic liquid, or a combination thereof;
the fluid electrolyte comprises an anion of fluoride, chloride, bromide, iodide, carboxylate, trifluoromethanesulfonate, bistrifluoromethanesulfonimidate, fluorosulfate, hexafluorophosphate, perchlorate, tetrafluoroborate, p-toluenesulfonate, nitrate, or a combination thereof; and
each of the first and second electrode substrates comprises one or more of aluminum, copper, gold, silver, nickel, platinum, or palladium.

11. A method of making an electrochemical capacitor, comprising:
forming a first composite electrode having a first polymeric electrochemical layer in contact with a first electrode substrate;
forming a second composite electrode having a second polymeric electrochemical layer in contact with a second electrode substrate;
contacting a first surface of an electrolyte membrane to the first polymeric electrochemical layer and contacting a second surface of the electrolyte membrane to the second polymeric electrochemical layer such that the electrolyte membrane is disposed between the first and second composite electrodes, wherein each of the first and second polymeric electrochemical layers independently comprise:
a plurality of conductive polymer molecules electrically coupled to the corresponding one of the first electrode substrate or the second electrode substrate;
one or more electrolyte polymer molecules disposed among the conductive polymer molecules; and
one or more unconjugated cross-links corresponding to each of the conductive polymer molecules, each of the conductive polymer molecules being covalently bonded to at least one of the one or more electrolyte polymer molecules by at least one of the one or more unconjugated cross-links; and;
contacting the electrolyte membrane, the first polymeric electrochemical layer, and the second polymeric electrochemical layer with a fluid electrolyte.

12. The method of claim 11, wherein said forming the first composite electrode and the second composite electrode includes:
electrochemically polymerizing one or more conductive polymer monomers at the first electrode substrate or the second electrode substrate to form a plurality of precursor conductive polymer molecules electrically coupled to the corresponding one of the first electrode substrate or the second electrode substrate;
reacting a cross-link precursor, one or more precursor electrolyte polymer molecules, and the plurality of precursor conductive polymer molecules to covalently bond each of the conductive polymer molecules to at least one of the one or more electrolyte polymer molecules by at least one of the one or more unconjugated cross-links.

13. The method of claim 12, wherein the one or more conductive polymer monomers are represented by Q-$RG^1$, wherein:
Q is aryl, heteroaryl, aryl vinylene, heteroaryl vinylene, alkylene, aryl sulfide, or aryl amine; and
$RG^1$ is a terminal alkyne, an alkynyl halide, F, Cl, Br, I, mesylate, triflate, nonaflate, nosylate, brosylate, tosylate, borane, boronic acid, a boronic acid ester, boronic acid, a boronic acid ester, potassium trifluoroborane, a stannane, an organosilane, a fluorosilane, an alkoxysilane, a hydroxysilane, a ketone, an aldehyde, a carboxylate, —OH, magnesium halide, zinc halide, a thioester, a primary or secondary amine, a hydroxylamine, or a protected derivative thereof 14. The method of claim 12 wherein the one or more precursor electrolyte polymer molecules are each represented by P'—$RG^{1'}$, wherein:
P' is a monomer of poly(oxy)alkylene, polytetrafluoroethylene: perfluorosulfonic acid copolymer, sulfonated arylene, sulfonated polystyrene, sulfonated poly(tetrafluoroethylene-hexafluoropropylene), poly(vinylidene fluoride), sulfonated poly(aryl)siloxane, sulfonated poly(alkyl)siloxane, sulfonated polyetheretherketone, sulfonated polysulfone, sulfonated polyethersulfone, polybenzimidazole, polyimide, polyphenylene, poly(4-phenoxybenzoyl-1,4-phenylene), polybenzimidazole, polyvinyl alcohol, polyacrylamide, or polyethylenimine, or a copolymer thereof; and
$RG^{1'}$ is an alkene, an ethylene oxide, a glycidyl, a terminal alkyne, an alkynyl halide, F, Cl, Br, I, mesylate, triflate, nonaflate, nosylate, brosylate, tosylate, borane, boronic acid, a boronic acid ester, boronic acid, a boronic acid ester, potassium trifluoroborane, a stannane, an organosilane, a fluorosilane, an alkoxysilane, a hydroxysilane, a ketone, an aldehyde, a carboxylate, —OH, magnesium halide, zinc halide, a thioester, a primary or secondary amine, a hydroxylamine, or a protected derivative thereof 15. The method of claim 12 wherein the cross-link precursor is represented by $RG^2$-X—$RG^3$, wherein:
X is an unconjugated cross-link comprising a branched or unbranched $C_2$-$C_{20}$ alkylene, a branched or unbranched $C_2$-$C_{20}$ alkylene ester, a branched or unbranched $C_2$-$C_{20}$ perfluoroalkylene, or a branched or unbranched $C_2$-$C_{20}$ perfluoroalkylene ester;

RG² is a terminal alkyne, an alkynyl halide, F, Cl, Br, I, mesylate, triflate, nonaflate, nosylate, brosylate, tosylate, borane, boronic acid, a boronic acid ester, boronic acid, a boronic acid ester, potassium trifluoroborane, a stannane, an organosilane, a fluorosilane, an alkoxysilane, a hydroxysilane, a ketone, an aldehyde, a carboxylate, —OH, magnesium halide, zinc halide, a thioester, a primary or secondary amine, a hydroxylamine, or a protected derivative thereof; and RG³ is an alkene, an ethylene oxide, a glycidyl, a terminal alkyne, an alkynyl halide, F, Cl, Br, I, mesylate, triflate, nonaflate, nosylate, brosylate, tosylate, borane, boronic acid, a boronic acid ester, boronic acid, a boronic acid ester, potassium trifluoroborane, a stannane, an organosilane, a fluorosilane, an alkoxysilane, a hydroxysilane, a ketone, an aldehyde, a carboxylate, —OH, magnesium halide, zinc halide, a thioester, a primary or secondary amine, a hydroxylamine, or a protected derivative thereof 16. The method of claim 11, wherein said forming the first composite electrode and the second composite electrode includes:
electrochemically polymerizing one or more conductive polymer monomers, each substituted with a cross-link precursor, to form a plurality of precursor conductive polymer molecules that are electrically coupled to the corresponding one of the first electrode substrate or the second electrode substrate, and substituted with the cross-link precursor; and
polymerizing one or more monomer precursors of the one or more electrolyte polymer molecules in the presence of the precursor conductive polymer molecules substituted with the cross-link precursor such that each of the conductive polymer molecules is covalently bonded to at least one of the one or more electrolyte polymer molecules by at least one of the one or more unconjugated cross-links.

17. The method of claim 16, wherein each of the one or more conductive polymer monomers substituted with the cross-link precursor is represented by Q-X—RG³, wherein;
Q is aryl, heteroaryl, aryl vinylene, heteroaryl vinylene, alkylene, aryl sulfide, or aryl amine;
X is an unconjugated cross-link comprising a branched or unbranched $C_2$-$C_{20}$ alkylene, a branched or unbranched $C_2$-$C_{20}$ alkylene ester, a branched or unbranched $C_2$-$C_{20}$ perfluoroalkylene, or a branched or unbranched $C_2$-$C_{20}$ perfluoroalkylene ester; and
RG³ is an alkene, an ethylene oxide, a glycidyl, a terminal alkyne, an alkynyl halide, F, Cl, Br, I, mesylate, triflate, nonaflate, nosylate, brosylate, tosylate, borane, boronic acid, a boronic acid ester, boronic acid, a boronic acid ester, potassium trifluoroborane, a stannane, an organosilane, a fluorosilane, an alkoxysilane, a hydroxysilane, a ketone, an aldehyde, a carboxylate, —OH, magnesium halide, zinc halide, a thioester, a primary or secondary amine, a hydroxylamine, or a protected derivative thereof 18. The method of claim 11, wherein each of the plurality of conductive polymer molecules comprises one of a polyacetylene, a polyarylene, a polyheteroarylene, a polyvinylarylene, a polyvinylheteroarylene, a polyarylene vinylene, a polyheteroarylene vinylene, a polyarylene ethynylene, a polyheteroarylene ethynylene, or a copolymer thereof.

19. The method of claim 11, wherein each of the plurality of conductive polymer molecules includes between 2 monomer repeat units and 2000 monomer repeat units.

20. The method of claim 11, wherein at least about 50% of the monomer repeat units included in the plurality of conductive polymers are each covalently bonded by one of the one or more unconjugated cross-links to at least one of the one or more electrolyte polymer molecules.

21. The method of claim 11, wherein the plurality of conductive polymer molecules, the one or more electrolyte polymer molecules, and the one or more unconjugated cross-links together form an interpenetrating polymer network in each of the first and second polymeric electrochemical layers.

22. The method of claim 11, wherein the plurality of conductive polymer molecules, the one or more electrolyte polymer molecules, and the one or more unconjugated cross-links together form a single polymeric phase in each of the first and second polymeric electrochemical layers.

23. The method of claim 11, wherein at least a portion of the plurality of conductive polymer molecules are covalently bonded to the corresponding one of the first electrode substrate or the second electrode substrate.

24. The method of claim 11, wherein
the electrolyte membrane comprises one of a poly(oxy)alkylene, a polytetrafluoroethylene:perfluorosulfonic acid copolymer, a sulfonated arylene, a sulfonated polystyrene, a sulfonated poly(tetrafluoroethylene-hexafluoropropylene), a poly(vinylidene fluoride), a sulfonated poly(aryl)siloxane, a sulfonated poly(alkyl)siloxane, a sulfonated polyetheretherketone, a sulfonated polysulfone, a sulfonated polyethersulfone, a polybenzimidazole, a polyimide, a polyphenylene, a poly(4-phenoxybenzoyl-1,4-phenylene), a polybenzimidazole, a polyvinyl alcohol, a polyacrylamide, a polyethylenimine, or a combination thereof;
the fluid electrolyte comprises one of a polyoxyalkylene, a polyoxyalkylene alcohol, an alkyl ether, a cycloalkyl ether, an alkylene carbonate, a cycloalkylene carbonate, an alkanone, a cycloalkanone, a lactone, an ionic liquid, or a combination thereof;
the fluid electrolyte comprises an anion that is one of fluoride, chloride, bromide, iodide, carboxylate, trifluoromethanesulfonate, bistrifluoromethanesulfonimidate, fluorosulfate, hexafluorophosphate, perchlorate, tetrafluoroborate, p-toluenesulfonate, nitrate, or a combination thereof; and
each of the first and second electrode substrates comprise one or more of aluminum, copper, gold, silver, nickel, platinum, or palladium.

25. A system for preparing an electrochemical capacitor, the system comprising:
a mixing chamber configured to mix solids and liquids;
a reagent source coupled to the mixing chamber;
an electrochemical apparatus coupled to the mixing chamber;
a sample manipulator coupled to the mixing chamber;
an electrolyte applicator coupled to the mixing chamber; and
a controller coupled to the mixing chamber, the reagent source, the
electrochemical apparatus, the sample manipulator, and the electrolyte applicator,
wherein the controller is configured via executable instructions to:
control the reagent source to contact one or more conductive polymer monomers to an electrode substrate in the mixing chamber;
control the electrochemical apparatus to electrochemically polymerize the one or more conductive polymer monomers at the electrode substrate sufficient to form a plurality of precursor conductive polymer molecules, wherein each of the plurality of precursor conductive polymer molecules is electrically coupled to the electrode substrate;

control the reagent source to provide a cross-link precursor with the one or more conductive polymer monomers or to the plurality of precursor conductive polymer molecules;

control the polymer applicator to contact one or more precursor electrolyte polymer molecules to the plurality of precursor conductive polymer molecules and the cross-link precursor sufficient to form a cross-linked polymer at the electrode substrate, wherein the cross-linked polymer includes:
- a plurality of conductive polymer molecules electrically coupled to the electrode substrate;
- one or more electrolyte polymer molecules disposed among the conductive polymer molecules; and
- one or more unconjugated cross-links corresponding to each of the conductive polymer molecules, each of the conductive polymer molecules being covalently bonded to at least one of the one or more electrolyte polymer molecules by at least one of the one or more unconjugated cross-links; and;

control the sample manipulator to form the cross-linked polymer together with the electrode substrate into a first composite electrode that includes a first polymeric electrochemical layer and a second composite electrode that includes a second polymeric electrochemical layer;

control the sample manipulator to contact a first surface of an electrolyte membrane to the first polymeric electrochemical layer;

control the sample manipulator to contact a second surface of the electrolyte membrane to the second polymeric electrochemical layer such that the electrolyte membrane is disposed between the first composite electrode and the second composite electrode; and control the electrolyte applicator to contact the electrolyte membrane, the first electrochemical layer, and the second electrochemical layer with a fluid electrolyte to form the electrochemical capacitor.

26. The system of claim 25, wherein the one or more conductive polymer monomers are substituted with the cross-link precursor and the controller is further configured via the executable instructions to:
- control the reagent source to contact the one or more conductive polymer monomers substituted with the cross-link precursor to the electrode substrate;
- control the electrochemical apparatus to electrochemically polymerize the one or more conductive polymer monomers substituted with the cross-link precursor such that the plurality of precursor conductive polymer molecules are substituted with the cross-link precursor; and
- control the polymer applicator to contact the one or more precursor electrolyte polymer molecules to the plurality of precursor conductive polymer molecules substituted with the cross-link precursor such that the cross-linked polymer is formed at the electrode substrate.

27. The system of claim 25, wherein the controller is further configured via the executable instructions to:
- control the reagent source to contact a cross-link catalyst to the cross-link precursor; and
- control the polymer applicator to contact the one or more precursor electrolyte polymer molecules to the conductive polymer, the cross-link precursor, and the cross-link catalyst sufficient to catalytically form the cross-linked polymer at the electrode substrate.

* * * * *

UNITED STATES PATENT AND TRADEMARK OFFICE
CERTIFICATE OF CORRECTION

PATENT NO.       : 8,947,855 B2
APPLICATION NO.  : 13/814504
DATED            : February 3, 2015
INVENTOR(S)      : Casasanta, III Page 1 of 4

It is certified that error appears in the above-identified patent and that said Letters Patent is hereby corrected as shown below:

On the title page,

On Page 2, item (56), under "OTHER PUBLICATIONS", in Column 2, Line 7, delete "an Biological" and insert -- and Biological --, therefor.

On Page 2, item (56), under "OTHER PUBLICATIONS", in Column 2, Line 22, delete "Solkid-State" and insert -- Solid-State --, therefor.

In the drawings,

In Fig. 3, Sheet 4 of 18, for Tag "318", in Line 2, delete "phenylenesulfide)" and insert -- phenylenesulfide --, therefor.

In Fig. 4G, Sheet 11 of 18, in Line 2, delete "Pd(dba)$_2$" and insert -- Pd(dba)$_2$] --, therefor.

In Fig. 4G, Sheet 11 of 18, in Line 4, delete "phosphine)" and insert -- phosphine --, therefor.

In Fig. 6, Sheet 15 of 18, delete " " and insert -- --, therefor.

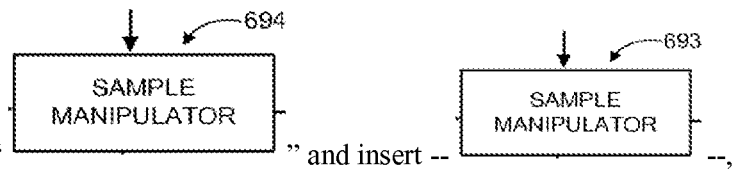

In Fig. 6, Sheet 15 of 18, delete " " and insert -- --, therefor.

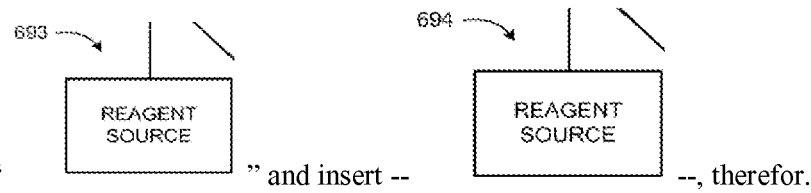

Signed and Sealed this
Twelfth Day of January, 2016

Michelle K. Lee
*Director of the United States Patent and Trademark Office*

In the drawings,

In Fig. 8, Sheet 17 of 18, second row 3rd line, delete "UP/UC/ DSP" and insert -- µP/µC/ DSP --, therefor.

In the specification,

In Column 1, Line 22, delete "ELDCs" and insert -- EDLCs --, therefor.

In Column 1, Line 26, delete "ELDCs" and insert -- EDLCs --, therefor.

In Column 1, Line 29, delete "ELDCs" and insert -- EDLCs --, therefor.

In Column 5, Line 55, delete "hereof" and insert -- hereof. --, therefor.

In Column 6, Line 62, delete "FIGs.," and insert -- FIGS., --, therefor.

In Column 7, Line 31, delete "f and g," and insert -- f, and g, --, therefor.

In Column 8, Line 11, delete "f and g" and insert -- f, and g --, therefor.

In Column 8, Line 16, delete "thef-instances" and insert -- the f-instances --, therefor.

In Column 9, Line 12, delete "ofpara-phenylene" and insert -- of para-phenylene --, therefor.

In Column 11, Line 36, delete "trifluoromethansulfonate" and insert -- trifluoromethanesulfonate --, therefor.

In Column 12, Line 7, delete "trifluoromethansulfonate" and insert -- trifluoromethanesulfonate --, therefor.

In Column 13, Line 21, delete "psuedohalides" and insert -- pseudohalides --, therefor.

In Column 17, Line 52, delete "source 693, a sample manipulator 694," and insert -- source 694, a sample manipulator 693, --, therefor.

In Column 19, Line 15, delete "polymerization" and insert -- polymerization. --, therefor.

In Column 21, Line 38, delete "(e.g.," and insert -- e.g., --, therefor.

In Column 21, Line 44, delete "AN" and insert -- A/V --, therefor.

In Column 25, Line 61, delete "f and g" and insert -- f, and g --, therefor.

In Column 26, Line 6, delete "f and g" and insert -- f, and g --, therefor.

CERTIFICATE OF CORRECTION (continued)

U.S. Pat. No. 8,947,855 B2

In the specification,

In Column 27, Line 15, delete "amine" and insert -- amine. --, therefor.

In Column 27, Lines 58-59, delete "boronic acid, a boronic acid ester, boronic acid, a boronic acid ester," and insert -- boronic acid, a boronic acid ester, --, therefor.

In Column 28, Line 31, delete "amine" and insert -- amine. --, therefor.

In Column 28, Lines 39-40, delete "boronic acid, a boronic acid ester, boronic acid, a boronic acid ester," and insert -- boronic acid, a boronic acid ester, --, therefor.

In Column 28, Line 60, delete "C2-C20" and insert -- $C_2$-$C_{20}$ --, therefor.

In Column 29, Lines 7-8, delete "boronic acid, a boronic acid ester, boronic acid, a boronic acid ester," and insert -- boronic acid, a boronic acid ester, --, therefor.

In Column 30, Line 22, delete "f and g" and insert -- f, and g --, therefor.

In Column 30, Line 34, delete "f and g" and insert -- f, and g --, therefor.

In Column 36, Line 62, delete "benzylamino" and insert -- benzylamino. --, therefor.

In Column 37, Line 45, delete "and or" and insert -- and/or --, therefor.

In the claims,

In Column 42, Line 2, in Claim 11, delete "and;" and insert -- and --, therefor.

In Column 42, Lines 29-30, in Claim 13, delete "boronic acid, a boronic acid ester, boronic acid, a boronic acid ester," and insert -- boronic acid, a boronic acid ester, --, therefor.

In Column 42, Line 35, in Claim 13, delete "thereof" and insert -- thereof. --, therefor.

In Column 42, Line 51, in Claim 14, delete "$RG^{1'}$is" and insert -- $RG^{1'}$ is --, therefor.

In Column 42, Lines 53-55, in Claim 14, delete "boronic acid, a boronic acid ester, boronic acid, a boronic acid ester," and insert -- boronic acid, a boronic acid ester, --, therefor.

In Column 42, Line 60, in Claim 14, delete "thereof" and insert -- thereof. --, therefor.

In Column 43, Lines 3-4, in Claim 15, delete "boronic acid, a boronic acid ester, boronic acid, a boronic acid ester," and insert -- boronic acid, a boronic acid ester, --, therefor.

CERTIFICATE OF CORRECTION (continued)
U.S. Pat. No. 8,947,855 B2

In the claims,

In Column 43, Lines 13-15, in Claim 15, delete "boronic acid, a boronic acid ester, boronic acid, a boronic acid ester," and insert -- boronic acid, a boronic acid ester, --, therefor.

In Column 43, Line 20, in Claim 15, delete "thereof" and insert -- thereof. --, therefor.

In Column 43, Line 41, in Claim 17, delete "wherein;" and insert -- wherein: --, therefor.

In Column 43, Lines 51-53, in Claim 17, delete "boronic acid, a boronic acid ester, boronic acid, a boronic acid ester," and insert -- boronic acid, a boronic acid ester, --, therefor.

In Column 43, Line 58, in Claim 17, delete "thereof" and insert -- thereof. --, therefor.

In Column 44, Lines 58-59, in Claim 25, delete "electrochemical....applicator," and insert the same at Line 57, after "the" as a continuation subpoint.

In Column 45, Line 24, in Claim 25, delete "and;" and insert -- and --, therefor.